United States Patent [19]
Kobayashi et al.

[11] Patent Number: 6,035,065
[45] Date of Patent: Mar. 7, 2000

[54] IMAGE PROCESSING COEFFICIENT DETERMINATION METHOD, IMAGE PROCESSING COEFFICIENT CALCULATION SYSTEM, IMAGE PROCESSING SYSTEM, IMAGE PROCESSING METHOD, AND STORAGE MEDIUM

[75] Inventors: Yuji Kobayashi; Shingo Uchihashi; Nobuyuki Takeo; Hitoshi Ogatsu; Shinji Kita, all of Ashigarakami-gun, Japan

[73] Assignee: Fuji Xerox Co., Ltd., Tokyo, Japan

[21] Appl. No.: 08/871,757

[22] Filed: Jun. 9, 1997

[30] Foreign Application Priority Data

| Jun. 10, 1996 | [JP] | Japan | 8-147553 |
| Nov. 26, 1996 | [JP] | Japan | 8-315151 |
| May 13, 1997 | [JP] | Japan | 9-122483 |

[51] Int. Cl.$^7$ ........................ G06K 9/46
[52] U.S. Cl. .................. 382/201; 358/406; 358/504; 382/260
[58] Field of Search ........................ 382/201, 205, 382/260–265; 358/406, 504; 395/112, 106

[56] References Cited

U.S. PATENT DOCUMENTS

| 5,185,673 | 2/1993 | Sobol | 358/296 |
| 5,271,096 | 12/1993 | Cook | 395/131 |
| 5,649,073 | 7/1997 | Knox et al. | 395/109 |
| 5,696,850 | 12/1997 | Parulski et al. | 382/261 |
| 5,774,599 | 6/1998 | Muka et al. | 382/254 |

FOREIGN PATENT DOCUMENTS 2-289367  11/1990  Japan.

OTHER PUBLICATIONS

Russell, Dale D., "Application of Spatial Frequency Methods to evaluation of printed images", Hewlett–Packard Journal, vol. 43, No. 3, pp. 68–75, Jun. 30, 1992.

*Primary Examiner*—Amelia Au
*Assistant Examiner*—Martin E. Miller
*Attorney, Agent, or Firm*—Oliff & Berridge, PLC

[57] ABSTRACT

An image processing coefficient determination method of an image processing system comprising the steps of:

outputting test pattern image data having one or more image areas each containing a specific spatial frequency component by an image output device for preparing an output image, measuring a spatial frequency characteristic of the output image, and determining spatial frequency processing coefficients from a relationship between a spatial frequency characteristic of the test pattern image data and the measurement result of the spatial frequency characteristic of the output image.

49 Claims, 36 Drawing Sheets

INPUT DATA

| 0 | 0 | 0 | 0 | 0 |
|---|---|---|---|---|
| 0 | 1 | 2 | 1 | 0 |
| 0 | 0 | 3 | 0 | 0 |
| 0 | 0 | 2 | 0 | 0 |
| 0 | 0 | 0 | 0 | 0 |

ATTENTION PIXEL

FIG.3A

3x3 FILTER COEFFICIENT MATRIX

| -0.2 | -0.1 | -0.2 |
|------|------|------|
| -0.1 | 2.2  | -0.1 |
| -0.2 | -0.1 | -0.2 |

FIG.3B

OUTPUT DATA

| -0.2 | -0.5 | -0.6 | -0.5 | -0.2 |
|------|------|------|------|------|
| -0.2 | 1.4  | 3.9  | 1.4  | -0.1 |
| -0.2 | -1.2 | 5.8  | -1.2 | -0.2 |
| 0    | -0.8 | 4.1  | -0.8 | 0    |
| 0    | -0.4 | -0.2 | -0.4 | 0    |

FIG.3C

| | PATCH SYMBOL | SPATIAL FREQUENCY | BLACK PIXEL VALUE | WHITE PIXEL VALUE | DC COMPONENT VALUE | AC COMPONENT VALUE | SIGNAL CONTRAST VALUE |
|---|---|---|---|---|---|---|---|
| BASIC AC PATCH PIXEL GROUP | V1, H1 | 5 | 160 | 96 | 128 | ±32 | ±40.5 |
| | V2, H2 | 2.5 | ← | ← | ← | ← | ← |
| | V3, H3 | 1.67 | ← | ← | ← | ← | ← |
| | V4, H4 | 1.25 | ← | ← | ← | ← | ← |
| | V6, H6 | 0.833 | ← | ← | ← | ← | ← |
| | V8, H8 | 0.625 | ← | ← | ← | ← | ← |
| AUXILIARY AC PATCH PIXEL GROUP | V2.1, H2.1 | 2.5 | 96 | 32 | 64 | ±32 | ±40.5 |
| | V2.2, H2.2 | 2.5 | 224 | 160 | 192 | ±32 | ±40.5 |
| | V2.3, H2.3 | 2.5 | 144 | 112 | 128 | ±16 | ±20.5 |
| | V2.4, H2.4 | 2.5 | 192 | 64 | 128 | ±64 | ±81 |

FIG.9

| PATCH | STRIPE PERIOD | | SPATIAL FREQUENCY OF STRIPE (lp/mm) | WINDOW SIZE (NUMBER OF DATA PIECES) |
|---|---|---|---|---|
| | (MM) | (NUMBER OF DATA PIECES) | | |
| V1, H1 | 0.2 | 10 | 5 | 20 |
| V2, H2 | 0.4 | 20 | 2.5 | 40 |
| V3, H3 | 0.6 | 30 | 1.67 | 60 |
| V4, H4 | 0.8 | 40 | 1.25 | 80 |
| V6, H6 | 1.2 | 60 | 0.833 | 120 |
| V8, H8 | 1.6 | 80 | 0.625 | 160 |

| PATCH SYMBOL | SPATIAL FREQUENCY (lp/mm) | BLACK PIXEL VALUE | WHITE PIXEL VALUE | DC COMPONENT VALUE | AC COMPONENT VALUE | SIGNAL CONTRAST VALUE |
|---|---|---|---|---|---|---|
| V1.1, H1.1 | 5 | 160 | 96 | 128 | ±32 | ±40.5 |
| V1.2, H1.2 | 2.5 | ↑ | ↑ | ↑ | ↑ | ↑ |
| V1.4, H1.4 | 1.25 | ↑ | ↑ | ↑ | ↑ | ↑ |
| V1.8, H1.8 | 0.625 | ↑ | ↑ | ↑ | ↑ | ↑ |
| V2.1, H2.1 | 5 | 144 | 112 | 128 | ±16 | ±20.4 |
| V2.2, H2.2 | 2.5 | ↑ | ↑ | ↑ | ↑ | ↑ |
| V2.4, H2.4 | 1.25 | ↑ | ↑ | ↑ | ↑ | ↑ |
| V2.8, H2.8 | 0.625 | ↑ | ↑ | ↑ | ↑ | ↑ |
| V3.1, H3.1 | 5 | 192 | 64 | 128 | ±64 | ±81.5 |
| V3.2, H3.2 | 2.5 | ↑ | ↑ | ↑ | ↑ | ↑ |
| V3.4, H3.4 | 1.25 | ↑ | ↑ | ↑ | ↑ | ↑ |
| V3.8, H3.8 | 0.625 | ↑ | ↑ | ↑ | ↑ | ↑ |
| V4.1, H4.1 | 5 | 96 | 32 | 64 | ±32 | ±40.5 |
| V4.2, H4.2 | 2.5 | ↑ | ↑ | ↑ | ↑ | ↑ |
| V4.4, H4.4 | 1.25 | ↑ | ↑ | ↑ | ↑ | ↑ |
| V4.8, H4.8 | 0.625 | ↑ | ↑ | ↑ | ↑ | ↑ |
| V5.1, H5.1 | 5 | 80 | 48 | 64 | ±16 | ±20.4 |
| V5.2, H5.2 | 2.5 | ↑ | ↑ | ↑ | ↑ | ↑ |
| V5.4, H5.4 | 1.25 | ↑ | ↑ | ↑ | ↑ | ↑ |
| V5.8, H5.8 | 0.625 | ↑ | ↑ | ↑ | ↑ | ↑ |

FIG.26

| PATCH SYMBOL | SPATIAL FREQUENCY (lp/mm) | BLACK PIXEL VALUE | WHITE PIXEL VALUE | DC COMPONENT VALUE | AC COMPONENT VALUE | SIGNAL CONTRAST VALUE |
|---|---|---|---|---|---|---|
| V6.1, H6.1 | 5 | 128 | 0 | 64 | ±64 | ±81.5 |
| V6.2, H6.2 | 2.5 | ↑ | ↑ | ↑ | ↑ | ↑ |
| V6.4, H6.4 | 1.25 | ↑ | ↑ | ↑ | ↑ | ↑ |
| V6.8, H6.8 | 0.625 | ↑ | ↑ | ↑ | ↑ | ↑ |
| V7.1, H7.1 | 5 | 224 | 160 | 192 | ±32 | ±40.5 |
| V7.2, H7.2 | 2.5 | ↑ | ↑ | ↑ | ↑ | ↑ |
| V7.4, H7.4 | 1.25 | ↑ | ↑ | ↑ | ↑ | ↑ |
| V7.8, H7.8 | 0.625 | ↑ | ↑ | ↑ | ↑ | ↑ |
| V8.1, H8.1 | 5 | 208 | 176 | 192 | ±16 | ±20.4 |
| V8.2, H8.2 | 2.5 | ↑ | ↑ | ↑ | ↑ | ↑ |
| V8.4, H8.4 | 1.25 | ↑ | ↑ | ↑ | ↑ | ↑ |
| V8.8, H8.8 | 0.625 | ↑ | ↑ | ↑ | ↑ | ↑ |
| V9.1, H9.1 | 5 | 255 | 128 | 192 | ±64 | ±81.5 |
| V9.2, H9.2 | 2.5 | ↑ | ↑ | ↑ | ↑ | ↑ |
| V9.4, H9.4 | 1.25 | ↑ | ↑ | ↑ | ↑ | ↑ |
| V9.8, H9.8 | 0.625 | ↑ | ↑ | ↑ | ↑ | ↑ |

FIG.27

| PATCH | STRIPE PERIOD | | SPATIAL FREQUENCY OF STRIPE (lp/mm) | WINDOW SIZE (NUMBER OF DATA PIECES) |
|---|---|---|---|---|
| | (MM) | (NUMBER OF DATA PIECES) | | |
| V1.1, H1.1 | 0.2 | 10 | 5 | 20 |
| V1.2, H1.2 | 0.4 | 20 | 2.5 | 40 |
| V1.4, H1.4 | 0.8 | 40 | 1.25 | 80 |
| V1.8, H1.8 | 0.6 | 80 | 0.625 | 160 |

IMAGE PROCESSING COEFFICIENT DETERMINATION METHOD, IMAGE PROCESSING COEFFICIENT CALCULATION SYSTEM, IMAGE PROCESSING SYSTEM, IMAGE PROCESSING METHOD, AND STORAGE MEDIUM

BACKGROUND OF THE INVENTION

This invention relates to an image processing system for performing spatial frequency processing for image data and outputting the resultant data and an image processing coefficient determination method and an image processing coefficient calculation system for the image processing system.

It is demanded to provide the same output image independently of output devices under the present circumstances wherein color images are edited and output by using an image processing system such as a desktop publishing (DTP) system to which a number of output devices are connected. However, the reproduction characteristics of image output devices vary largely from one device to another, and output images having the same characteristic cannot be provided if the images are output as they are.

For the variations in the reproduction characteristics of image output devices, the same color reproduction output image can be provided independently of the image output devices with respect to color reproduction. For example, a color management system (CMS) is used to execute color conversion from device-independent color signals to color signals proper to each device, whereby the same color reproduction output image can be provided independently of the output devices. Color conversion coefficients used for the color conversion can be calculated by measuring colors of a number of color patch output images, for example, as described in the Unexamined Japanese Patent Application Publication No. Hei 2-289367. The calculated color conversion coefficients are described in the ICC profile format, for example, as device characteristic information and are held in the system.

However, if image data to which color conversion has been applied in response to each output device is prepared and output, output images different in sharpness are produced for each output device. In the image processing field, a CTF (contrast transfer function) indicating how much contrast can be transferred for each frequency is used as a sharpness comparison scale. In the description to follow, the CTF is adopted as the spatial frequency characteristic of each output device.

Under the present circumstances, output image change caused by the effect of the spatial frequency characteristic of each output device is predicted qualitatively by intuition and experience and image processing application software is used to repeat spatial frequency processing such as sharpness processing and smoothing for image data until a desired output image is provided.

At the development stage of a color printer containing a spatial frequency processing section, processing coefficients of the spatial frequency processing section are determined. At the time, while the processing coefficients are changed based on intuition and experience, output images of different kinds of reference image data are prepared on the color printer and sharpness of the output images is observed for determining the processing coefficients.

SUMMARY OF THE INVENTION

It is therefore an object of the invention to provide an image processing coefficient determination method and an image processing coefficient calculation system capable of determining processing coefficients independently of intuition or experience in spatial frequency processing for image data performed for correcting the spatial frequency transfer characteristic of an image output device and an image processing system that can use the spatial processing coefficients calculated for each image output device by such a processing coefficient calculation system to provide output images of the same sharpness independently of the image output devices.

According to the invention of aspect 1, there is provided an image processing coefficient determination method of an image processing system comprising the steps of providing an image output device, outputting test pattern image data having one or more image areas each containing a specific spatial frequency component by the image output device for preparing an output image, measuring a spatial frequency characteristic of the output image, and determining spatial frequency processing coefficients from a relationship between a spatial frequency characteristic of the test pattern image data and the measurement result of the spatial frequency characteristic of the output image.

In the invention of aspect 2, in the image processing coefficient determination method of aspect 1, the specific spatial frequency component contained in each image area in the test pattern image data comprises a single spatial frequency component or a single spatial frequency component and a harmonic component thereof.

In the invention of aspect 3, in the image processing coefficient determination method of aspect 1, the specific spatial frequency component contained in each image area in the test pattern image data comprises a plurality of spatial frequency components.

In the invention of aspect 4, in the image processing coefficient determination method of aspect 1, the specific spatial frequency component contained in each image area in the test pattern image data contains a DC component.

In the invention of aspect 5, in the image processing coefficient determination method of aspect 1, the spatial frequency processing coefficients are processing coefficients corresponding to spatial frequency processing making a different response to the same spatial frequency because of a DC component difference.

In the invention of aspect 6, in the image processing coefficient determination method of aspect 1, the spatial frequency processing coefficients are processing coefficients corresponding to spatial frequency processing making a different response to the same spatial frequency because of an AC component difference.

In the invention of aspect 7, in the image processing coefficient determination method of aspect 1, the spatial frequency processing coefficient determining step determines a target spatial frequency transfer characteristic from a range of input values effectively allowed by the image output device as well as the relationship between the spatial frequency characteristic of the test pattern image data and the measurement result of the spatial frequency characteristic of the output image and calculates the spatial frequency processing coefficient based on the target spatial frequency transfer characteristic.

According to the invention of aspect 8, there is provided an image processing coefficient calculation system comprising first recognition means for recognizing a spatial frequency characteristic of test pattern image data having one or more image areas each containing a specific spatial frequency component, second recognition means for recognizing a spatial frequency characteristic of an output image provided by an image output device for outputting the test pattern image data, and means for calculating spatial frequency processing coefficients from a relationship between the spatial frequency characteristic of the test pattern image data recognized by the first recognition means and the spatial frequency characteristic of the output image recognized by the second recognition means.

In the invention of aspect 9, in the image processing coefficient calculation system of aspect 8, the specific spatial frequency component contained in each image area in the test pattern image data comprises a single spatial frequency component or a single spatial frequency component and a harmonic component thereof.

In the invention of aspect 10, in the image processing coefficient calculation system of aspect 8, the specific spatial frequency component contained in each image area in the test pattern image data comprises a plurality of spatial frequency components.

In the invention of aspect 11, in the image processing coefficient calculation system of aspect 8, the specific spatial frequency component contained in each image area in the test pattern image data contains a DC component.

In the invention of aspect 12, in the image processing coefficient calculation system of aspect 8, the spatial frequency processing coefficients correspond to spatial frequency processing making a different response to the same spatial frequency because of a DC component difference.

In the invention of aspect 13, in the image processing coefficient calculation system of aspect 8, the spatial frequency processing coefficients correspond to spatial frequency processing making a different response to the same spatial frequency because of an AC component difference.

In the invention of aspect 14, in the image processing coefficient calculation system of aspect 8, the coefficient calculation means determines a target spatial frequency transfer characteristic from a range of input values effectively allowed by the image output device as well as the relationship between the spatial frequency characteristic of the test pattern image data recognized by the first recognition means and the spatial frequency characteristic of the output image recognized by the second recognition means and calculates the spatial frequency processing coefficient based on the target spatial frequency transfer characteristic.

According to the invention of aspect 15, there is provided an image processing system comprising image output means for outputting image data, means for calculating spatial frequency processing coefficients from a relationship between a spatial frequency characteristic of test pattern image data having one or more image areas each containing a specific spatial frequency component and a spatial frequency characteristic of an output image provided by the image output means for outputting the test pattern image data, and process operation means for using the spatial frequency processing coefficients calculated by the coefficient calculation means to change a spatial frequency characteristic of input image data.

According to the invention of aspect 16, there is provided an image processing system comprising image output means for outputting image data, means for holding test pattern image data having one or more image areas each containing a specific spatial frequency component, means for measuring a spatial frequency characteristic of an output image provided by the image output means for outputting the test pattern image data held in the test pattern holding means, means for calculating spatial frequency processing coefficients from a relationship between spatial frequency characteristic information of the test pattern image data held in the test pattern holding means and spatial frequency characteristic information of the output image measured by the measurement means, and process operation means for using the spatial frequency processing coefficients calculated by the coefficient calculation means to change a spatial frequency characteristic of input image data.

In the invention of aspect 17, in the image processing system of aspect 15 or 16, the specific spatial frequency component contained in each image area in the test pattern image data comprises a single spatial frequency component or a single spatial frequency component and a harmonic component thereof.

In the invention of aspect 18, in the image processing system of aspect 15 or 16, the specific spatial frequency component contained in each image area in the test pattern image data comprises a plurality of spatial frequency components.

In the invention of aspect 19, in the image processing system of aspect 15 or 16, the specific spatial frequency component contained in each image area in the test pattern image data contains a DC component.

In the invention of aspect 20, in the image processing system of aspect 15 or 16, the coefficient calculation means determines a target spatial frequency transfer characteristic from a range of input values effectively allowed by the image output means as well as the relationship between the spatial frequency characteristic of the test pattern image data and that of the output image and calculates the spatial frequency processing coefficient based on the target spatial frequency transfer characteristic.

In the invention of aspect 21, in the image processing system of aspect 15 or 16, the process operation means performs different spatial frequency characteristic change processing for the same spatial frequency because of a DC component difference.

In the invention of aspect 22, in the image processing system of aspect 15 or 16, the process operation means performs different spatial frequency characteristic change processing for the same spatial frequency because of an AC component difference.

According to the invention of aspect 23, there is provided an image processing system comprising means for inputting an image processing signal containing image signal values of an attention pixel and peripheral pixels of the attention pixel, processing means for changing the value of the attention pixel based on the image processing signal input to the input means and predetermined coefficients, means for outputting an image of the image processing signal having the attention pixel value changed by the processing means, and coefficient determination means for determining the predetermined coefficients for the processing means based on an image reproduction characteristic of the output means found from test pattern image data containing an area having a plurality of specific spatial frequency components, characterized in that the coefficient determination means comprises means for measuring actual spatial frequency components of a test pattern image prepared by the output means based on the test pattern image data, means for comparing the measurement result of the spatial frequency components of the area measured by the measurement means with the spatial frequency components of the test pattern image data, and predetermined coefficient determination means for determining the predetermined coefficients for the processing means from the comparison result of the comparison means.

In the invention of aspect 24, in the image processing system of aspect 23, the coefficient determination means further determines the predetermined coefficients based on an image reproduction characteristic for each feature of the image processing signal in the output means and the processing means changes a degree of changing of the attention pixel value for each feature of the image processing signal based on the predetermined coefficients.

In the invention of aspect 25, in the image processing system of aspect 24, the predetermined characteristic to be given for each feature of the image processing signal is provided for making the image reproduction characteristic of the output means an ideal characteristic not changing for each feature of the image processing signal.

In the invention of aspect 26, in the image processing system of aspect 23, the predetermined coefficients contain basic processing coefficients and auxiliary processing coefficients and the coefficient determination means further includes basic processing coefficient determination means for determining the basic processing coefficients in order to give a predetermined characteristic to a spatial frequency characteristic of the image processing signal input to the output device and auxiliary processing coefficient determination means for determining the auxiliary processing coefficients to give a processing characteristic to be furthermore added to the spatial frequency characteristic of the image processing signal changing according to the basic processing coefficients determined by the basic processing coefficient determination means.

In the invention of aspect 27, in the image processing system of aspect 26, the auxiliary processing coefficients contain an auxiliary spatial frequency processing coefficient and an auxiliary gain coefficient and the processing coefficient determination means comprises auxiliary spatial frequency processing coefficient determination means for determining the auxiliary spatial frequency processing coefficient to give a predetermined characteristic to the spatial frequency characteristic of the image processing signal and gain determination means for determining an auxiliary gain coefficient by which the image processing signal changed based on the auxiliary spatial frequency processing coefficient determined by the auxiliary spatial frequency processing coefficient determination means is to be multiplied, In the invention of aspect 28, in the image processing system of aspect 26, the basic processing coefficients contain a basic spatial frequency processing coefficient and a basic gain coefficient and the processing coefficient determination means comprises basic spatial frequency processing coefficient determination means for determining the basic spatial frequency processing coefficient to give a predetermined characteristic to the spatial frequency characteristic of the image processing signal and gain determination means for determining a basic gain coefficient by which the image processing signal changed based on the basic spatial frequency processing coefficient determined by the basic spatial frequency processing coefficient determination means is to be multiplied.

In the invention of aspect 29, in the image processing system of aspect 27 or 28, the gain determination means determines a gain corresponding to the feature of the image processing signal.

In the invention of aspect 30, in the image processing system of aspect 29, the feature of the image processing signal is a local contrast of the image processing signal.

In the invention of aspect 31, in the image processing system of aspect 29, the feature of the image processing signal is a local average value of the image processing signal.

In the invention of aspect 32, in the image processing system of aspect 23, the predetermined coefficient determination means determines a target spatial frequency transfer characteristic from a range of input values effectively allowed by the image output means as well as the comparison result of the comparison means and calculates the predetermined coefficient based on the target spatial frequency transfer characteristic.

According to the invention of aspect 33, there is provided an image processing system comprising means for inputting an image processing signal containing image signal values of an attention pixel and peripheral pixels of the attention pixel, feature amount extraction means for finding a feature of the image processing signal from the image signal values of the attention pixel and peripheral pixels of the image processing signal input to the input means, processing means for changing the value of the attention pixel based on the image processing signal input to the input means, predetermined coefficients, and the feature found by the feature amount extraction means, and means for outputting an image of the image processing signal having the attention pixel value changed by the processing means, wherein the predetermined coefficients are determined by measuring actual spatial frequency components of a test pattern image prepared by the output means based on test pattern image data and comparing the measured spatial frequency components of the test pattern image with the spatial frequency components of the test pattern image data.

In the invention of aspect 34, in the image processing system of aspect 33, the predetermined coefficients contain basic processing coefficients and auxiliary processing coefficients, the basic processing coefficients being provided for giving a predetermined characteristic to a spatial frequency characteristic of the image processing signal input to the output device and the auxiliary processing coefficients being provided for giving a processing characteristic to be furthermore added to the spatial frequency characteristic of the image processing signal changing according to the basic processing coefficients, and the processing means comprises basic processing means for changing the value of the attention pixel of the image processing signal based on the basic processing coefficients and auxiliary processing means for changing the value of the attention pixel based on the auxiliary processing coefficients and generates an image processing signal fed into the output means based on the changed values of the attention pixel.

In the invention of aspect 35, in the image processing system of aspect 34, the auxiliary processing coefficients contain an auxiliary spatial frequency processing coefficient and an auxiliary gain coefficient and the auxiliary processing means changes the image processing signal based on the auxiliary spatial frequency processing coefficient and further changes the image processing signal based on the feature found by the feature amount extraction means and the auxiliary gain coefficient.

In the invention of aspect 36, in the image processing system of aspect 34, the basic processing coefficients contain a basic spatial frequency processing coefficient and a basic gain coefficient and the basic processing means changes the image processing signal based on the basic spatial frequency processing coefficient and further changes the image processing signal based on the feature found by the feature amount extraction means and the basic gain coefficient.

In the invention of aspect 37, in the image processing system of aspect 33, the predetermined coefficients are calculated based on a target spatial frequency transfer characteristic determined from a range of input values effectively allowed by the image output means as well as the comparison result between the actually measured spatial frequency components of the test pattern image and the spatial frequency components of the test pattern image data.

In the invention of aspect 38, in the image processing system of aspect 33, the feature amount extraction means extracts a local contrast of the image processing signal as the feature.

In the invention of aspect 39, in the image processing system of aspect 33, the feature amount extraction means extracts a local average value of the image processing signal as the feature.

According to the invention of aspect 40, there is provided an image processing system comprising means for inputting an image processing signal containing image signal values of an attention pixel and peripheral pixels of the attention pixel, feature amount extraction means for finding a feature of the image processing signal from the image signal values of the attention pixel and peripheral pixels of the image processing signal input to the input means, means for determining a gain for each of the spatial frequency components of the image processing signal based on the feature found by the feature amount extraction means, processing means for changing the value of the attention pixel based on the gain determined by the gain determination means for each of the spatial frequency components of the image processing signal input to the input means and changing the image processing signal based on the changed attention pixel values, and means for outputting an image of the image processing signal changed by the processing means, wherein the gain for each of the spatial frequency components of the image processing signal is determined by measuring actual spatial frequency components of a test pattern image prepared by the output means based on test pattern image data and comparing the measured spatial frequency components of the test pattern image with the spatial frequency components of the test pattern image data.

According to the invention of aspect 41, there is provided an image processing system comprising means for inputting an image processing signal containing image signal values of an attention pixel and peripheral pixels of the attention pixel, processing means for changing the value of the attention pixel based on the image processing signal input to the input means and predetermined coefficients, means for outputting an image of the image processing signal having the attention pixel value changed by the processing means, feature amount extraction means for finding a feature of the image processing signal from the image signal values of the attention pixel and peripheral pixels of the image processing signal input to the input means, and processing coefficient determination means for determining the predetermined coefficients for the processing means based on the feature found by the feature amount extraction means, wherein the predetermined coefficients are determined by measuring actual spatial frequency components of a test pattern image prepared by the output means based on test pattern image data and comparing the measured spatial frequency components of the test pattern image with the spatial frequency components of the test pattern image data.

According to the invention of aspect 42, there is provided an image processing system comprising first input means for inputting an image processing signal containing values represented by a color coordinate system of an equal color space, color conversion means for converting the image processing signal input to the first input means into a color coordinate system of a second color space different from the color space and appropriate for control of output means, second input means for inputting the image processing signal containing image signal values of an attention pixel and peripheral pixels of the attention pixel undergoing the color conversion of the color conversion means, feature amount extraction means for finding a feature of the image processing signal from the image signal values of the attention pixel and peripheral pixels of the image processing signal input to the second input means, processing means for changing the value of the attention pixel based on the image processing signal input to the second input means, predetermined coefficients, and the feature found by the feature amount extraction means, and means for outputting an image of the image processing signal having the attention pixel value changed by the processing means, wherein the predetermined coefficients are determined by measuring actual spatial frequency components of a test pattern image and comparing the measured spatial frequency components of the test pattern image with spatial frequency components of data of the test pattern image.

In the invention of aspect 43, in the image processing system of aspect 43, the predetermined coefficients are calculated based on a target spatial frequency transfer characteristic determined from a range of input values effectively allowed by the image output means as well as the comparison result between the actually measured spatial frequency components of the test pattern image and the spatial frequency components of the test pattern image data.

According to the invention of aspect 44, there is provided an image processing method comprising the steps of providing output means, outputting test pattern image data containing an area having a plurality of specific spatial frequency components by the output means for preparing an output image, measuring a spatial frequency characteristic of the output image, determining predetermined coefficients from a relationship between a spatial frequency characteristic of the test pattern image data and the measurement result of the spatial frequency characteristic of the output image, changing a value of an input attention pixel based on an image processing signal containing image signal values of the input attention pixel and peripheral pixels of the attention pixel and the predetermined coefficients, and outputting an image of the image processing signal having the value changed.

According to the invention of aspect 45, there is provided an image processing method comprising the steps of providing output means, outputting test pattern image data containing an area having a plurality of specific spatial frequency components by the output means for preparing an output image, measuring a spatial frequency characteristic of the output image, determining predetermined coefficients from a relationship between a spatial frequency characteristic of the test pattern image data and the measurement result of the spatial frequency characteristic of the output image, finding a feature of an image processing signal containing image signal values of an input attention pixel and peripheral pixels of the attention pixel, changing the value of the attention pixel based on the image processing signal, the feature of the image processing signal, and the predetermined coefficients, and outputting an image of the image processing signal having the attention pixel value changed.

In the invention of aspect 46, in the image processing method of aspect 44 or 45, the predetermined coefficient determination step determines a target spatial frequency transfer characteristic from a range of input values effectively allowed by the image output means as well as the relationship between the spatial frequency characteristic of the test pattern image data and the measurement result of the spatial frequency characteristic of the output image and calculates the predetermined coefficients based on the target spatial frequency transfer characteristic.

According to the invention of aspect 47, there is provided a storage medium storing a program for causing a computer to execute the steps of providing output means, outputting test pattern image data containing an area having a plurality of specific spatial frequency components by the output means for preparing an output image, measuring a spatial frequency characteristic of the output image, and determining predetermined coefficients from a relationship between a spatial frequency characteristic of the test pattern image data and the measurement result of the spatial frequency characteristic of the output image, the storage medium being able to be read by the computer.

In the invention of aspect 48, the storage medium of aspect 47 further stores a program for causing a computer to execute the additional steps of changing a value of an input attention pixel based on an image processing signal containing image signal values of the input attention pixel and peripheral pixels of the attention pixel and the predetermined coefficients and outputting an image of the image processing signal having the value changed, the storage medium being able to be read by the computer.

In the invention of aspect 49, the storage medium of aspect 47 further stores a program for causing a computer to execute the additional steps of finding a feature of an image processing signal containing image signal values of an input attention pixel and peripheral pixels of the attention pixel, changing the value of the attention pixel based on the image processing signal, the feature of the image processing signal, and the predetermined coefficients, and outputting an image of the image processing signal having the attention pixel value changed, the storage medium being able to be read by the computer.

BRIEF DESCRIPTION OF THE DRAWING

In the accompanying drawings:

FIGS. 3A to 3C are illustration of an example of digital filtering;

FIG. 9 is an illustration of characteristic value examples of the patch images in the basic AC patch image group and an auxiliary AC patch image group used in the first example of the spatial frequency processing section;

FIG. 26 is an illustration of characteristic value examples of the patch images in the AC patch image group used in the second example of the spatial frequency processing section;

FIG. 27 is an illustration of characteristic value examples of the patch images in the AC patch image group used in the second example of the spatial frequency processing section (continued);

DETAILED DESCRIPTION OF THE PREFERRED EMBODIMENTS

Figure 1:
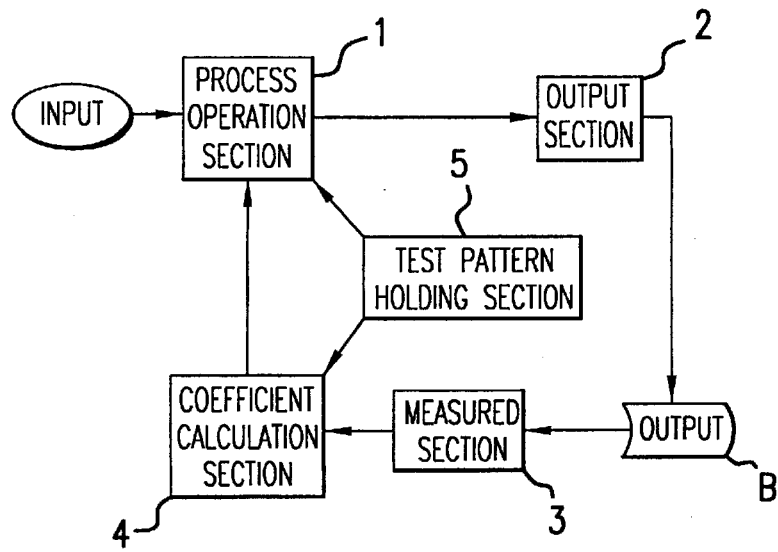
FIG. 1 is a block diagram to show one embodiment of the invention.

FIG. 1 is a block diagram to show one embodiment of the invention. In the figure, numeral 1 is a process operation section, numeral 2 is an output section, numeral 3 is a measurement section, numeral 4 is a coefficient calculation section, and numeral 5 is a test pattern holding section. The process operation section 1 performs various types of processing for input image data and prepares output image data. Here, it performs at least spatial frequency processing and conversion processing for input image data so as to provide spatial frequency responsive to a given image output device. The spatial frequency processing performed at the time uses processing coefficients calculated by the coefficient calculation section 4. When the processing coefficients are calculated, necessary processing other than the spatial frequency processing is applied to test pattern image data held in the test pattern holding section 5 for preparing output image data. The output section 2 outputs the output image data prepared by the process operation section 1.

When the processing coefficients used in the spatial frequency processing are calculated, the measurement section 3 measures the spatial frequency characteristic of a test pattern image output from the output section 2 based on the test pattern image data held in the test pattern holding section 5.

The coefficient calculation section 4 finds a spatial frequency characteristic of the test pattern image data held in the test pattern holding section 5 and gets the spatial frequency characteristic of the test pattern image measured by the measurement section 3, then calculates processing coefficients used in the spatial frequency processing from the relationship between the spatial frequency characteristics.

The test pattern holding section 5 holds test pattern image data. The test pattern image data can be made up of two or more patch images different in spatial frequency, for example. A patch image with a DC component, namely, spatial frequency 0 can be included as one of the patch images.

To calculate processing coefficients used in the spatial frequency processing, the process operation section 1 performs necessary processing other than the spatial frequency processing, such as color processing, for the test pattern image data held in the test pattern holding section 5, then outputs a test pattern image through the output section 2. The measurement section 3 measures the spatial frequency characteristic of the output test pattern image. The coefficient calculation section 4 relates the spatial frequency characteristic measured by the measurement section 3 to the spatial frequency characteristic of the test pattern image data held in the test pattern holding section 5 and calculates processing coefficients required for performing such spatial frequency processing of making the two spatial frequency characteristics close to each other. It passes the calculated processing coefficients to the process operation section 1.

Image data output processing is performed after the processing coefficients required for performing the spatial frequency processing are thus found. The process operation section 1 performs various types of image processing including the spatial frequency processing using the processing coefficients calculated by the coefficient calculation section 4 for an input image for preparing output image data and outputs the output image data through the output section 2. At this time, the processing coefficients for the spatial frequency processing are already calculated and are set in the process operation section 1, thus the operation can be performed only with the process operation section 1 and the output section 2 and the measurement section 3, the coefficient calculation section 4, and the test pattern holding section 5 may be nonexistent.

Figure 2:
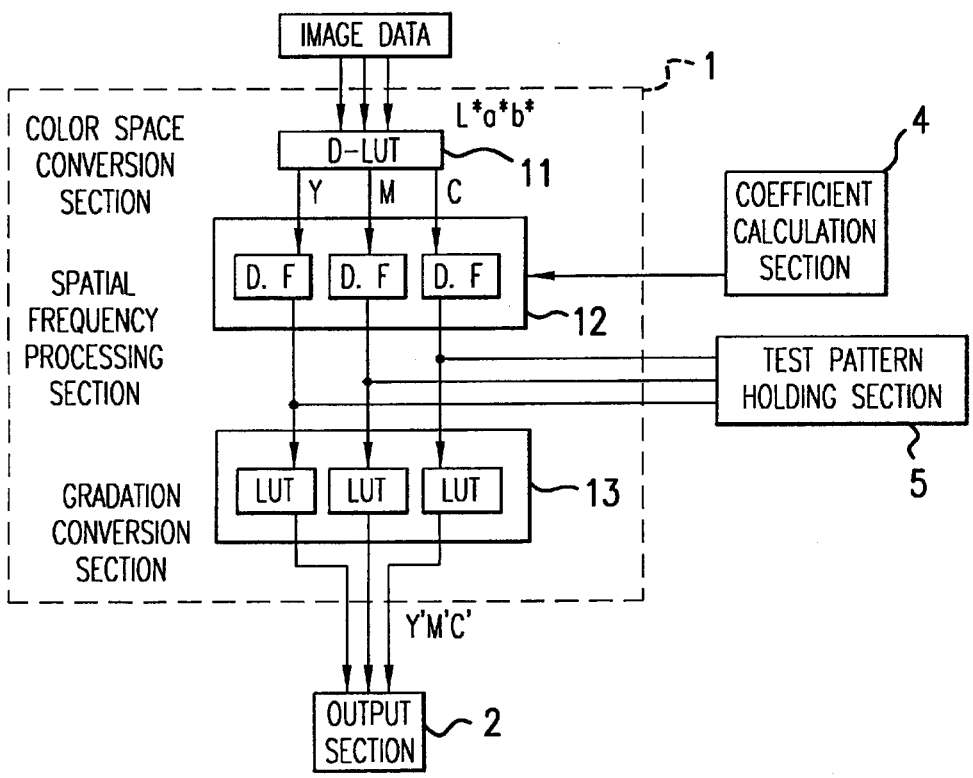
FIG. 2 is a block diagram to show a configuration example of the process operation section.

FIG. 2 is a block diagram to show a configuration example of the process operation section. In the figure, numeral 11 is a color space conversion section, numeral 12 is a spatial frequency processing section, and numeral 13 is a gradation conversion section. Here, color image data processing is shown as a specific example. Assume that input color image data is data of L*, a*, and b* each consisting of eight bits independent of input/output devices as an example. Assume that the output section 2 receives a color image of Y, M, and C each consisting of eight bits and outputs an image. Of course, any other color system may be used and a different number of bits may be used in both input and output.

The color space conversion section 11 converts image data of L*, a*, and b* each consisting of eight bits into image data of Y, M, and C each consisting of eight bits. For the YMC color signals, gradation is set so that when a*=b*=0, Y=M=C, that when a*=b*=0 and L*=100, Y, M, C=0, that when a*=b*=0 and L*=0, Y, M, C=255, and that when a*=b*=0, the Y, M, and C values become linear relation to the L* value. Such color conversion processing can be performed by using a direct look-up table, for example.

Next, the spatial frequency processing section 12 performs spatial frequency processing for color image data of Y, M, and C. Generally, digital filtering is performed as the spatial frequency processing. FIGS. 3A to 3C are illustration of an example of digital filtering. Now, a 3×3 filter coefficient matrix as shown in FIG. 3B is considered. For the spatial frequency processing, the 3×3 filter coefficient matrix is set so that the sum of the coefficients in the matrix becomes one. When image data shown in FIG. 3A is input, arithmetic of sum of products is performed for the 3×3 pixels together with the pixels surrounding an attention pixel with each pixel as the attention pixel in order. In the example shown in FIG. 3A, the central pixel having a value of 3 is set to the attention pixel and the 3×3 pixels with the attention pixel as the center are used for performing arithmetic. For example, 1×(−0.2)+2×(−0.1)+1×(−0.2)+3×2.2+2×(−0.2) is calculated and the result 5.8 is returned. The returned value is set to a new value of the attention pixel. Such arithmetic processing is performed with each pixel as the attention pixel, thereby providing image data resulting from the spatial frequency processing, as shown in FIG. 3C.

Here, the coefficient calculation section 4 calculates the filter coefficient matrix shown in FIG. 3B in response to the reproduction characteristic of the output section 2 and sets the calculated matrix. One or more filter coefficient matrixes are set for each of the Y, M, and C axes. A number of filter coefficient matrixes responsive to the average value, contrast, etc., of input image data can be set and be changed in response to the spatial frequency characteristic of input image data, as described later.

Last, the gradation conversion section 13 adjusts a gradation characteristic according to the look-up tables. In a color image formation system for forming an image by area modulation, the gradation conversion section 13 converts the image data into Y', M', and C' each consisting of eight bits, image signals linear to output coverage and outputs the image signals to the output section 2. The gradation conversion section 13 can be made up of look-up tables in a one-to-one correspondence with the Y, M, and C axes.

Assume that the processing coefficients of the direct look-up table in the color space conversion section 11 and those of the look-up tables in the gradation conversion section 13 described above are previously held for each output device in the output section 2 as output device color conversion information. The output device color conversion information corresponding to the output device to be used is used for processing, whereby the same color reproduction output image can be provided independently of output devices from image data represented in the format independent of input/output units. Digital filtering coefficients in the spatial frequency processing section 12 are also previously calculated by the coefficient calculation section 4 in relation to the output devices, whereby output images having the same spatial frequency characteristic can be provided independently of the input/output units. The digital filtering coefficients in the spatial frequency processing section 12 may also be held for each output device after they are calculated by the coefficient calculation section 4.

The configuration shown in FIG. 2 assumes that the test pattern image data held in the test pattern holding section 5 is held as image data of Y, M, and C each consisting of eight bits. Thus, to calculate processing coefficients used in the spatial frequency processing section 12, processing of the gradation conversion section 13 is performed and a test pattern image is output from the output section 2. If the test pattern image data is color space data other than the YMC color space, color space conversion is executed before the image data is input to the gradation conversion section 13. For example, if the data is data of L*, a*, and b* each consisting of eight bits, processing of the gradation conversion section 13 may be performed without performing processing of the spatial frequency processing section 12 after processing of the color space conversion section 11.

Figure 4A:
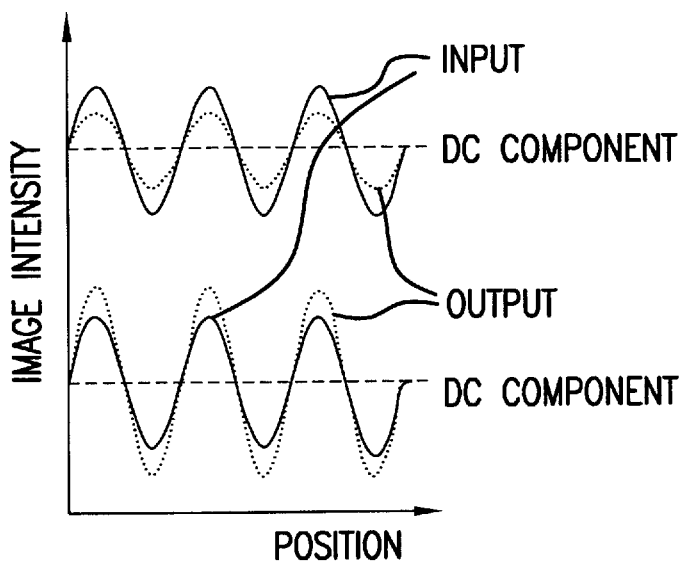
FIGS. 4A and 4B are illustration of examples of spatial frequency response characteristics in various output devices.
Figure 4B:
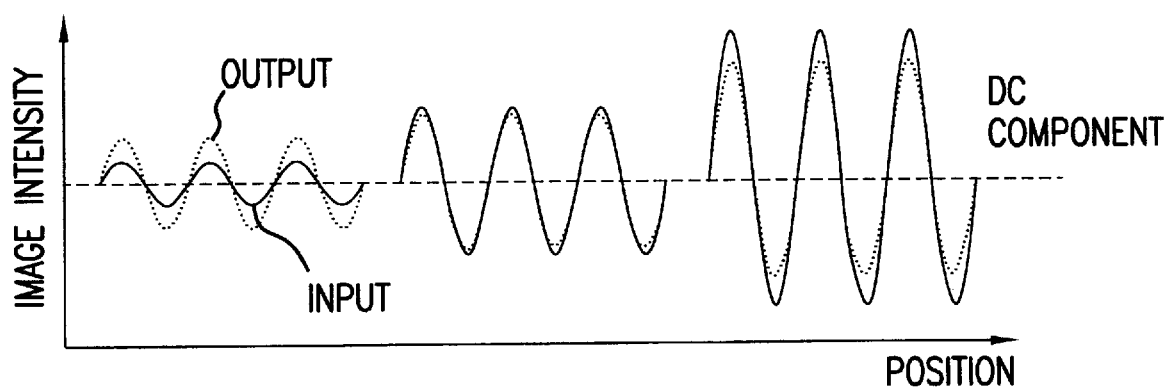

The spatial frequency processing section 12 will be described in more detail. FIGS. 4A and 4B are illustration of examples of spatial frequency response characteristics in various output devices. In the figure, the solid lines indicate input image data signals and the broken lines indicates output image signals. The spatial frequency characteristic of input image data may not linearly correspond to that of an output image depending on the output system features of the output devices, the device configuration, etc. For example, as shown in FIG. 4A, the amplitude of an output image may differ from that of input image data different in average lightness, which will be hereinafter called DC component, even with the same spatial frequency and the same amplitude. As shown in FIG. 4B, for different amplitudes with the same spatial frequency and the same DC component, input image data having a small amplitude may result in an output image of a large amplitude or input image data having a large amplitude may result in an output image of a small amplitude, for example. At this time, the input image data amplitude and the output image amplitude do not always change linearly. In the description to follow, a signal resulting from removing DC component from an image signal will be called AC component.

Since such output devices making different spatial frequency responses exist, it is effective to perform spatial frequency processing corresponding to them. To cope with the case shown in FIG. 4A, a correction amount may be adjusted in response to input image data with the same spatial frequency and different DC component; to cope with the case shown in FIG. 4B, a correction amount may be adjusted in response to input signal with the same spatial frequency and different AC component.

Figure 5:
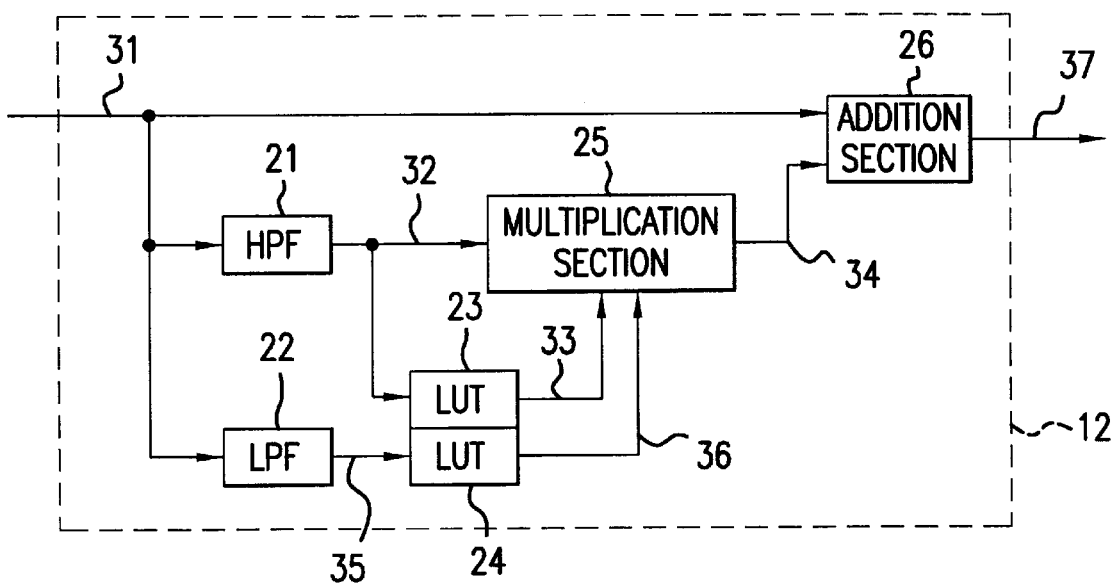
FIG. 5 is a block diagram to show a first configuration example of a spatial frequency processing section.

FIG. 5 is a block diagram to show a first configuration example of the spatial frequency processing section. In the figure, numeral 21 is a high-pass filter, numeral 22 is a low-pass filter, numerals 23 and 24 are look-up tables, numeral 25 is a multiplication section, numeral 26 is an addition section, numeral 31 is an input image signal, numeral 32 is a correction amount signal, numeral 33 is an AC component gain signal, numeral 34 is an adjustment correction amount signal, numeral 35 is a DC component signal, numeral 36 is a DC component gain signal, and numeral 37 is an output image signal. For example, the configuration shown in FIG. 5 can be applied to the spatial frequency processing section 12 shown in FIG. 2 as a configuration for performing digital filtering for Y, M, and C image signals.

Each of the high-pass filter 21 and the low-pass filter 22 can be made of a two-dimensional finite impulse response (FIR) filter, for example. The two-dimensional FIR filter converts each attention pixel in image data into a value calculated by weighting the attention pixel value and its peripheral pixel values. For example, a 3×3 filter performs the operation as shown in FIG. 3A for input data. Of course, the filter size may be made larger. The high-pass filter 21, which is a two-dimensional FIR filter with the filter coefficient sum 0, performs spatial frequency processing for the input image signal 31 and outputs the correction amount signal 32 to be corrected for the attention pixel. The low-pass filter 22, which is a two-dimensional FIR filter with the filter coefficient sum 1 and the coefficients equal to each other, performs spatial frequency processing for the input image signal 31 and outputs the DC component signal 35.

The look-up table 23 is a look-up table for receiving the correction amount signal 32 from the high-pass filter 21 and generating and outputting the AC component gain signal 33. The look-up table 24 is a look-up table for receiving the DC component signal 35 from the low-pass filter 22 and generating and outputting the DC component gain signal 36.

The multiplication section 25 amplifies and adjusts the correction amount signal 32 input through the high-pass filter 21 according to the AC component gain signal 33 input from the look-up table 23 and the DC component gain signal 36 input from the look-up table 24, and outputs the resultant signal as the adjustment correction amount signal 34.

The addition section 26 adds the input image signal 31 and the adjustment correction amount signal 34 together and outputs the output image signal 37 to which the spatial frequency processing has been applied.

In the configuration, the input image signal 31 input to the spatial frequency processing section 12 is input to the addition section 26, the high-pass filter 21, and the low-pass filter 22. The high-pass filter 21, which is a two-dimensional FIR filter with the filter coefficient sum 0, takes out only the correction amount in the AC component from the input image signal 31 and outputs the correction amount as the correction amount signal 32. The AC component gain signal 33 for making gain adjustment of the AC component is generated from the correction amount signal 32 through the look-up table 23 and is output to the multiplication section 25. The operation performed in the look-up table 23 is a correction for dealing with the input signal with the same spatial frequency and different AC component shown in FIG. 4B.

On the other hand, the low-pass filter 22 extracts a DC component from the input image signal 31 and outputs the DC component as the DC component signal 35. The DC component gain signal 36 for making gain adjustment of the DC component is generated from the DC component signal 35 through the look-up table 24 and is output to the multiplication section 25. The operation performed in the look-up table 24 is a correction for dealing with the input signal with the same spatial frequency and different DC component shown in FIG. 4A.

The multiplication section 25 multiplies the correction amount signal 32 provided through the high-pass filter 21 by the AC component gain signal 33 of the adjustment amount applied due to the AC component difference and the DC component gain signal 35 of the adjustment amount applied due to the DC component difference for generating the adjustment correction amount signal 34 representing the final adjustment amount. The addition section 26 adds the input image signal 31 and the adjustment correction amount signal 34 together and outputs the output image signal 37.

In such a configuration, the processing coefficients to be determined are the filter coefficients of the two-dimensional FIR filter of the high-pass filter 21 and the conversion tables of the look-up tables 23 and 24. These values are determined in accordance with the output device characteristics. The determination method of the values will be described. If only output devices where spatial frequency characteristic change caused by the DC component, AC component difference as shown in FIGS. 4A and 4B can be ignored are connected to the system, the low-pass filter 22, the look-up tables 23 and 24, and the multiplication section 25 are not required and if the addition section 26 adds output of the high-pass filter 21 directly to the input image signal 31, a correction can be made. In this case, in the description that follows, only the filter coefficient of the high-pass filter 21 may be found. Of course, a configuration not considering the DC or AC component difference is also possible.

Figure 6:
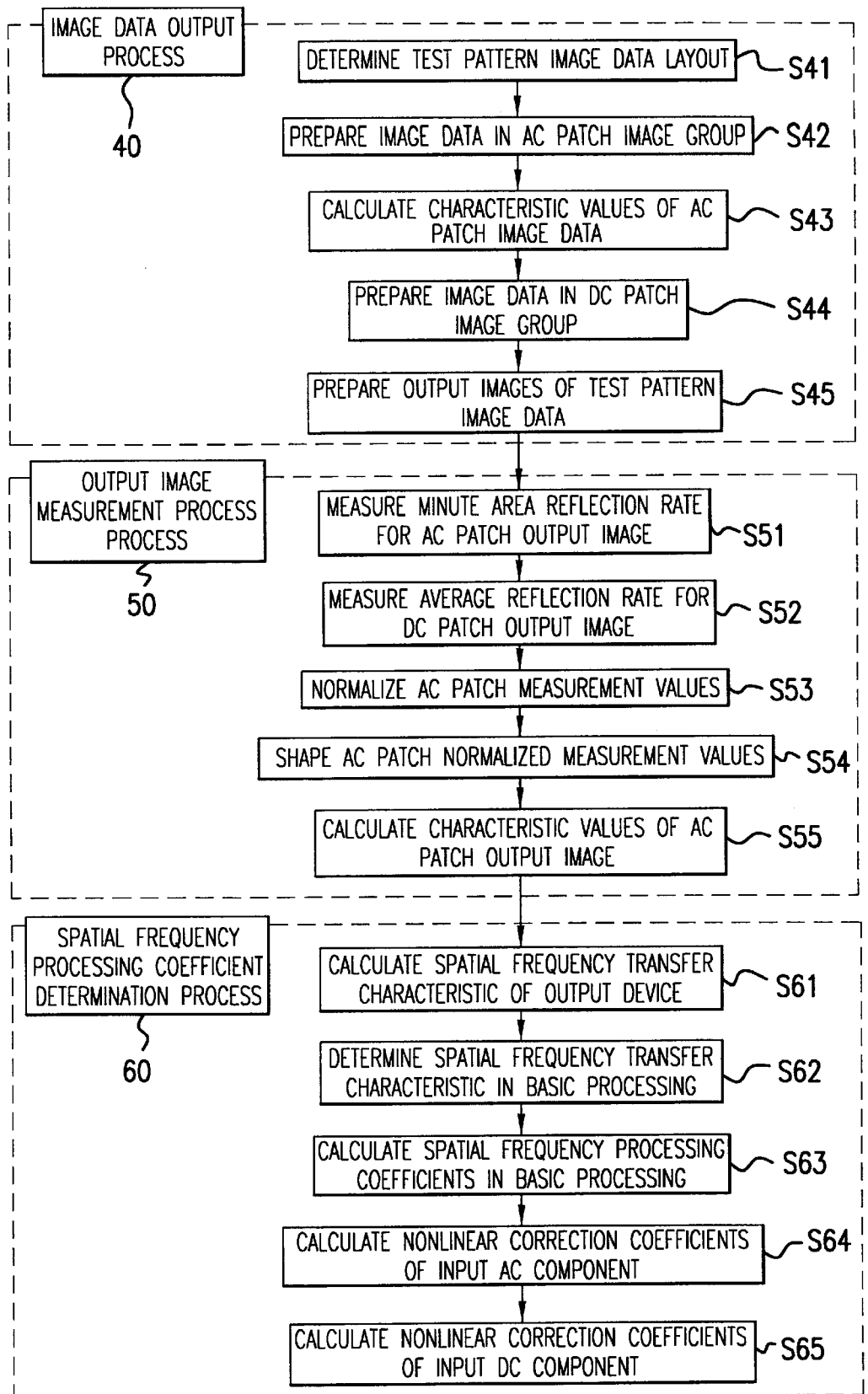
FIG. 6 is a flowchart to show a processing example of determining processing coefficients used in the first example of the spatial frequency processing section.

FIG. 6 is a flowchart to show a processing example of determining processing coefficients used in the first example of the spatial frequency processing section. The processing of determining processing coefficients used in the spatial frequency processing shown in FIG. 6 consists of three processes of image data output process 40, output image measurement process 50, and spatial frequency processing coefficient determination process 60. First, in the image data output process 40, test pattern image data containing a specific spatial frequency component is output on an output device for which processing coefficients are to be determined, and an output image is prepared. Next, in the output image measurement process 50, the spatial frequency characteristic of the output image is measured. Last, in the spatial frequency processing coefficient determination process 60, a spatial frequency transfer characteristic of the output device is found from the relationship between the spatial frequency component of the test pattern image data and the spatial frequency characteristic of the test pattern output image measured in the output image measurement process 50, and spatial frequency processing coefficients for correcting the spatial frequency transfer characteristic are calculated.

The processing coefficient determination processing shown in FIG. 6 will be described in more detail with a specific example. The description to follow assumes a color printer having an input data resolution of 10 dots/mm as a specific output device example.

Figure 7:
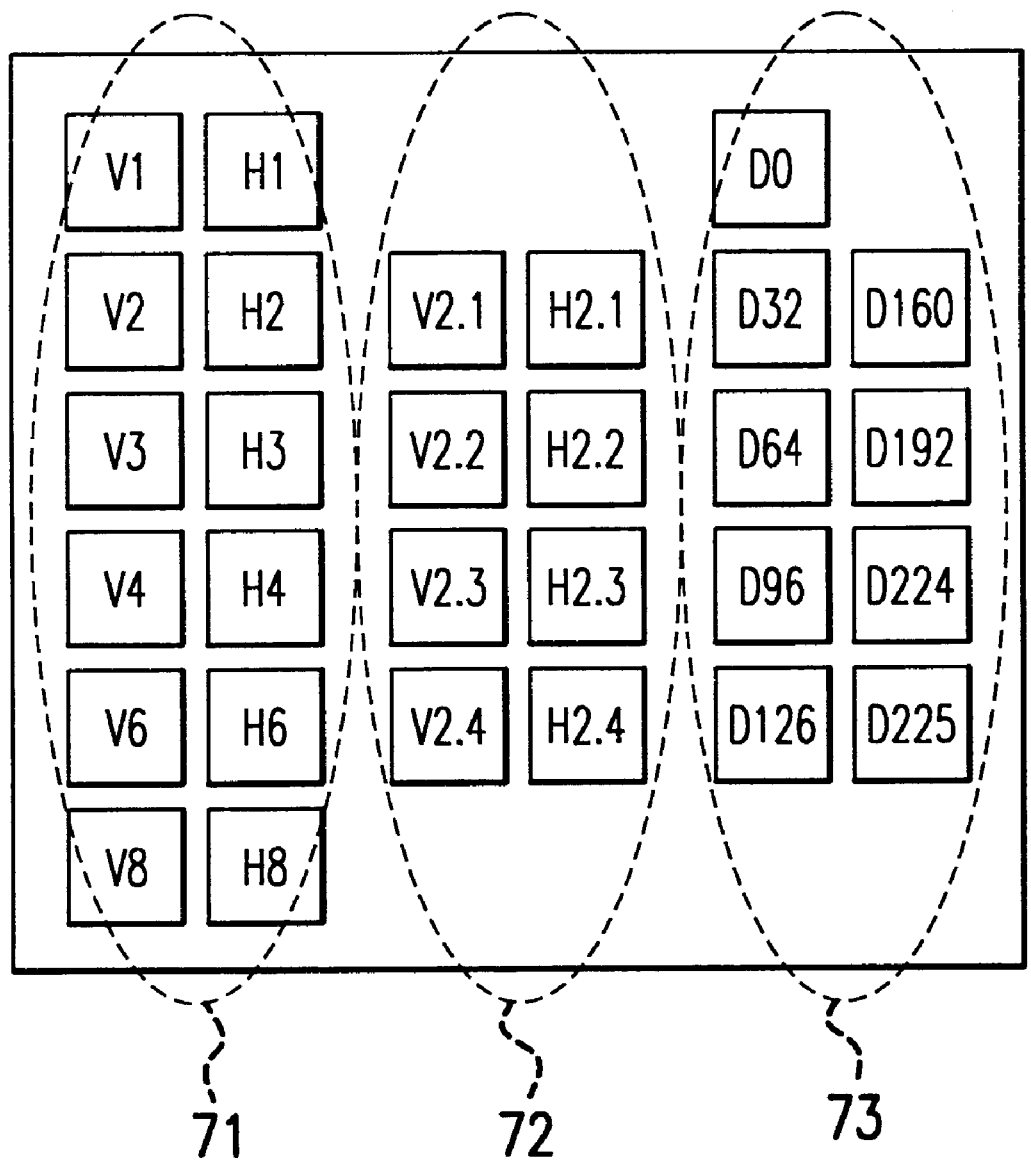
FIG. 7 is an illustration to show a layout example of test pattern image data used in the first example of the spatial frequency processing section.

First, at step S41, a layout of test pattern image data is determined. FIG. 7 is an illustration to show a layout example of test pattern image data used in the first example of the spatial frequency processing section. In the figure, numeral 71 is a basic AC patch image group, numeral 72 is an auxiliary AC patch image group, and numeral 73 is a DC patch image group. The test pattern image data layout shown in FIG. 7 is made up of the basic AC patch image group 71, the auxiliary AC patch image group 72, and the DC patch image group 73. Each patch image group contains patch images. FIG. 7 shows a total of 29 patch images. The size of each patch image is 200 pixels×200 pixels so that it becomes an area 20 mm square when the patch image is output on the printer having a resolution of 10 dots/mm.

Here, the patch images in the basic AC patch image group 71 and the auxiliary AC patch image group 72 are patch images each having a spatial frequency component other than 0 lp/mm, namely, patch images varying in tone. The basic AC patch image group 71 is provided for finding a basic spatial frequency transfer characteristic of the output device and determining the filter coefficient of the high-pass filter 21 shown in FIG. 5. The patch images in the basic AC patch image group 71 consist of patch images of vertical stripes indicated by V1–V8 and those of horizontal stripes indicated by H1–H8. V1 and H1, V2 and H2, . . . , and V8 and H8 are patch images having the same spatial frequency and differing in stripe direction.

The auxiliary AC patch image group 72 is provided for determining the coefficients of the conversion tables of the look-up tables 23 and 24 shown in FIG. 5. Like the patch images in the basic AC patch image group 71, the patch images indicated by V2.1–V2.4 are vertical stripes and those indicated by H2.1–H2.4 are horizontal stripes. Here, patch images different in DC component as shown in FIG. 4A are laid out on V2.1, V2.2, H2.1, and H2.2 based on the V2 and H2 patch images in the basic AC patch image group 71. V2.3, V2.4, H2.3, and H2.4 are laid out as patch images different in AC component as shown in FIG. 4B. V2.1 and H2.1, . . . , and V2.4 and H2.4 are patch images having the same AC component and DC component and differing only in direction.

The patch images in the DC patch image group 73 are patch images not containing a spatial frequency component other than 0 lp/mm, namely, patch images at flat density with no density change; they are provided for normalizing the measurement values of the basic AC patch image group 71 and the auxiliary AC patch image group 72, as described later. D0–D255 are patch images different in density.

The test pattern image data layout shown in FIG. 7 is an example; any other layout may be adopted if what patch images are placed at which positions is seen. Each patch image group may be formed as separate test pattern images. The number, characteristics, sizes, etc., of the patch images contained in the patch image groups are arbitrary. Particularly in the example, the auxiliary AC patch image group 72 is prepared based on the patch images V2 and H2 in the basic AC patch image group 71, but precision can be improved by adding patch images prepared based on other patch images in the basic AC patch image group 71.

For example, the test pattern image data layout as shown in FIG. 7 may be previously prepared and stored in the test pattern holding section 5, etc. A plurality of test pattern image data layouts can also be stored for selective use.

Figure 8A:
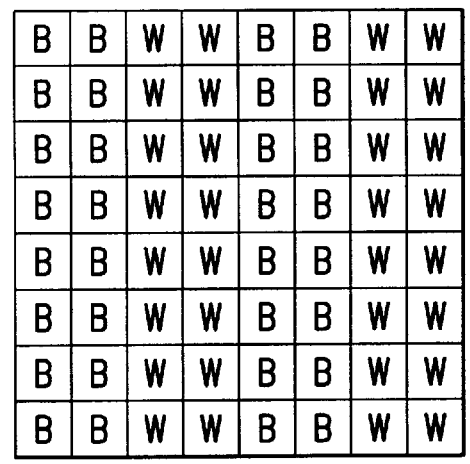
FIGS. 8A and 8B are illustration of patch image examples in a basic AC patch image group used in the first example of the spatial frequency processing section.
Figure 8B:
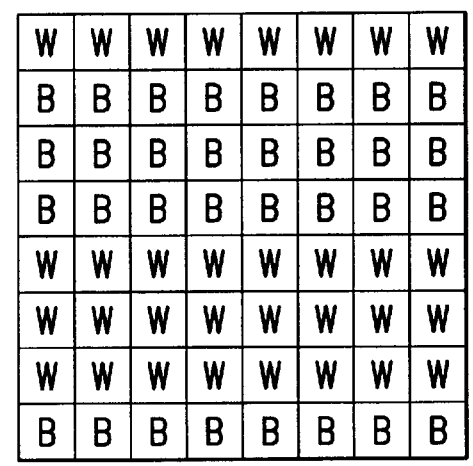

At step S42, for example, image data of the patch images in the basic AC patch image group 71 and the auxiliary AC patch image group 72 in the test pattern image data as shown in FIG. 7 is prepared. As described above, in FIG. 7, the symbols V1–V8 given to the patch images in the basic AC patch image group 71 represent vertical line, H1–H8 represent horizontal lines, and the digit following the symbol V or H represents the width of the line in terms of the number of pixels. FIGS. 8A and 8B are illustration of patch image examples in the basic AC patch image group used in the first example of the spatial frequency processing section. In the figure, B represents a black pixel and W represents a white pixel. FIG. 8A shows a part of the V2 patch image, wherein white and black vertical lines each two pixels wide are arranged alternately. FIG. 8B shows a part of the H3 patch image, wherein white and black horizontal lines each three pixels wide are arranged alternately. Here, the data value of each black pixel is 160 and that of each white pixel is 96.

Next, image data of the patch images V2.1–V2.4 and H2.1–H2.4 in the auxiliary AC patch image group 72 in the test pattern image data as shown in FIG. 7 is prepared. The patch images V2.1, V2.2, H2.1, and H2.2 different in DC component and the patch images V2.3, V2.4, H2.3, and H2.4 different in AC component are prepared based on the patch images V2 and H2 in the basic AC patch image group 71, as described above.

FIG. 9 is an illustration of characteristic value examples of the patch images in the basic AC patch image group and the auxiliary AC patch image group used in the first example of the spatial frequency processing section. It lists the spatial frequencies, black pixel data values, white pixel data values, DC component values, AC component values, and signal contrast values of the patch images contained in the basic AC patch image group 71 and the auxiliary AC patch image group 72. The spatial frequency indicates how many lines per mm are contained; if the patch image is V1 or H1, white and black lines appear alternately every other pixel, thus the spatial frequency of V1, H1 indicates that five lines are contained in 10 dots per mm, the assumed printer resolution. The DC component value indicates average density and the AC component value indicates the difference between the black pixel data value and the white pixel data value and the DC component value. The density is represented as 255 for a black portion at the highest black density and 0 for a white portion at the lowest black density. The signal contrast values will be described later.

Also as shown in FIG. 9, the patch images in the basic AC patch image group 71 have the same black pixel data values, the same white pixel data values, the same DC component values, and the same AC component values and differ only in spatial frequency. The patch images in the auxiliary AC patch image group 72 are constant in spatial frequency and have different black pixel data values and different white pixel data values, as shown in FIG. 9.

Image data of the patch images is prepared, for example, according to the parameters shown in FIG. 9 and the prepared patch image data is embedded, for example, in accordance with the test pattern image data layout as shown in FIG. 7.

Next, at step S43, characteristic values are calculated from the image data of the patch images in the basic AC patch image group 71 and the auxiliary AC patch image group 72. The data values of the pixels of the patch images in the basic AC patch image group 71 and the auxiliary AC patch image group 72 are set like black pixel value=160 and white pixel value=96, for example, in the basic AC patch image group 71. In other words, they can be represented as DC component value=128 and AC component value=±32. The setup values of the patch images represented by the DC and AC component values are listed in FIG. 9.

Here, the DC component values and the signal contrast values are considered as the characteristic values of the image data of the patch images in the basic AC patch image group 71 and the auxiliary AC patch image group 72. The DC component values are those shown in FIG. 9. The signal contrast values are corrected based on the above-described AC component values. Since an image signal is a rectangular wave rather than a sine wave, the effective contrast value is improved as compared with that when the signal is a sine wave. This fact is considered to correct the contrast value. Actual correction can be calculated according to signal contrast value=AC component value×(4/3.14) The contrast values of the patch images found by making such a correction are listed under the signal contrast value column of FIG. 9.

At step S44, image data of the patch images in the DC patch image group 73 is prepared. In FIG. 7, D of symbols D0–D255 given to the patch images in the DC patch image group 73 indicates that the patch image contains DC component, namely, spatial frequency component of only 0 lp/mm, and the digits following the letter D represent the DC component data value. For example, the D64 patch image means a uniform patch image with 64 as the data value of every pixel of 200 pixels×200 pixels.

Here, data value=0 to data value=255 are almost equally divided for providing nine patch images. Image data of the patch images is prepared and the prepared image data of the patch images is embedded, for example, in accordance with the test pattern image data layout as shown in FIG. 7, whereby test pattern image data is complete. The complete test pattern image data is held in the test pattern holding section 5. The same test pattern image data is provided separately for three colors of Y, M, and C or is used common to the three colors.

At step S45, the last step of the image data output process 40, the test pattern image data is output from the output device and a test pattern image is prepared. To output the test pattern image, first the output device is set to a single color mode and the test pattern image is output. For example, when the output device is set to a Y single color mode, test pattern image data as Y image signal is output from the test pattern holding section 5. The gradation conversion section 13 shown in FIG. 2 uses the look-up table to apply gradation conversion processing to the test pattern image data output from the test pattern holding section 5, then outputs the resultant data through the output section 2 to the output device. The output device receives the test pattern image data to which the Y gradation conversion processing has been applied and outputs the output image of the data in the Y single color mode. For M and C, likewise the output device-is set to M and C single color modes and M and C test pattern images are provided, a total of three test pattern images being provided.

The provided test pattern images are images laid out as shown in FIG. 7, for example. However, the patch images reflect the characteristics of the output device and are not always images faithfully reflecting the test pattern image data. Then, the output image measurement process 50 and the spatial frequency processing coefficient determination process 60 are executed for each of the three provided test pattern images. For convenience, a description will be given only to one of the colors; similar processing is performed for the three colors.

Figure 10:
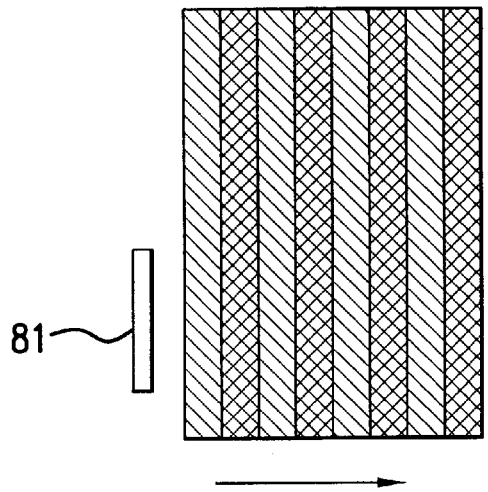
FIG. 10 is an illustration of a specific example of reflection rate measurement.

In the output image measurement process 50, the test pattern image of the test pattern image data output from the output device is measured and the measurement result is analyzed. First, at step S51, a reflection rate is measured for each minute area about the basic AC patch image group and the auxiliary AC patch image group in the test pattern image. To measure the reflection rate, a microreflectometer, etc., can be used, for example. FIG. 10 is an illustration of a specific example of reflection rate measurement. In the figure, numeral 81 is an aperture and numeral 82 is a patch image. As a specific example of reflection rate measurement, as shown in FIG. 10, a 0.1 mm×0.02 mm aperture 81 is used and is set so that the long side of the aperture becomes parallel with the line structure in the patch image 82. While the measurement position is moved 0.02 mm at a time in the short side direction of the aperture (the arrow direction in FIG. 10), the reflected light amount at each position is measured for providing the measurement result. At the time, a complementary color filter may be used for the measurement.

Subsequently, at step S52, a reflection rate is also measured for each minute area about the patch images in the DC patch image group in the test pattern image and an average reflection rate is found. Also in this case, a microreflectometer, etc., can be used, for example. Since the DC patch image group contains uniform patch images of DC components only as described above, an aperture is set in any direction and while the measurement position is moved in the short side direction of the aperture, the reflected light amount at each position is measured at more than one point for each patch image and an average value of the measurement results is found. If a filter is used for measurement of the basic AC patch image group and the auxiliary AC patch image group, the identical filter is also used here.

Figure 11:
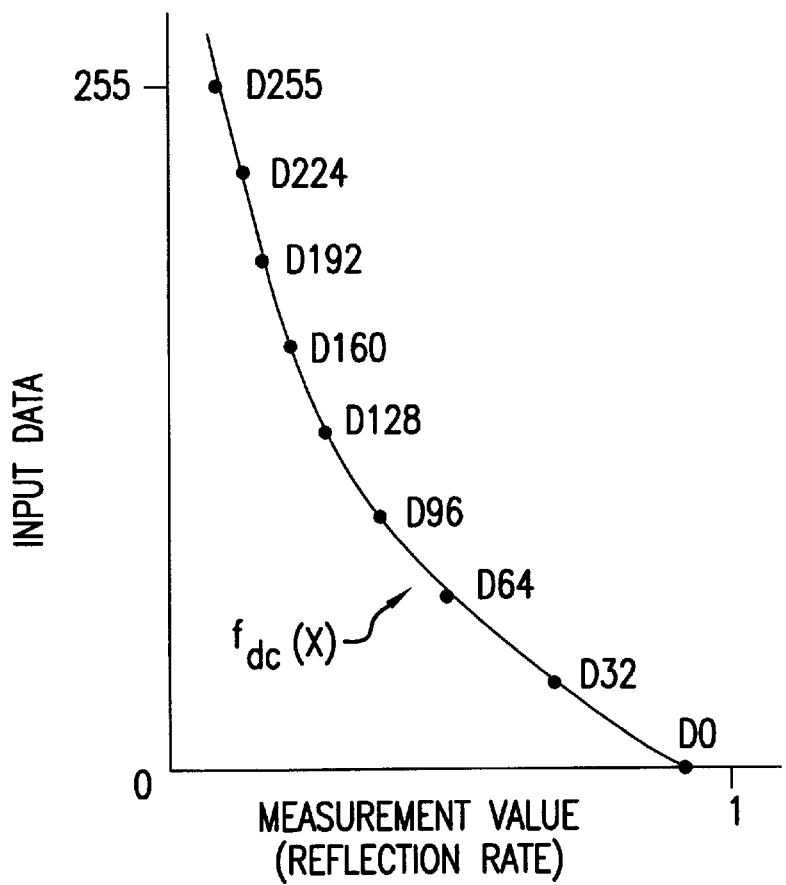
FIG. 11 is a graph to show an example of the relationship between the average reflection rate data of the patch images in a DC patch image group and the data values of the patch images in the DC patch image group in the test pattern image data.

An analysis is performed on the measurement values thus provided. First, at step S53, the measurement values in the patch images in the basic AC patch image group and the auxiliary AC patch image group are normalized. FIG. 11 is a graph to show an example of the relationship between the average reflection rate data of the patch images in the DC patch image group and the data values of the patch images in the DC patch image group in the test pattern image data. When the average reflection rate data of the patch images in the DC patch image group provided by the measurement at step S52 is related to the data values of the patch images in the DC patch image group in the test pattern image data, the relationship, for example, as shown in FIG. 11 is produced. First, the relationship $f_{dc}(x)$ is found by an approximate value. The measurement values with the microreflectometer for the patch images in the basic AC patch image group and the auxiliary AC patch image group are converted by using the relationship $f_{dc}(x)$, whereby the measurement results can be handled like the YMC image signals handled by the process operation section 1.

Figure 12A:
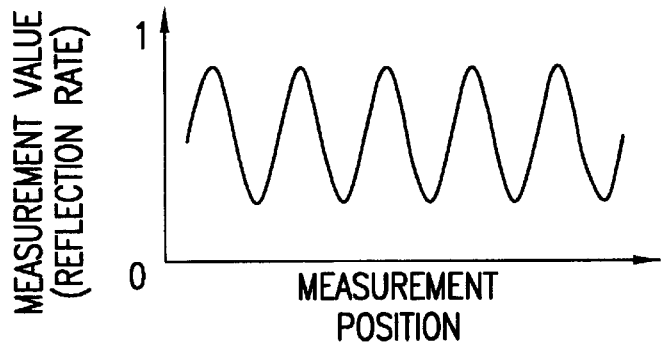
FIGS. 12A to 12C are illustration of waveform change examples caused by normalization and shaping of AC patch image measurement values.
Figure 12B:
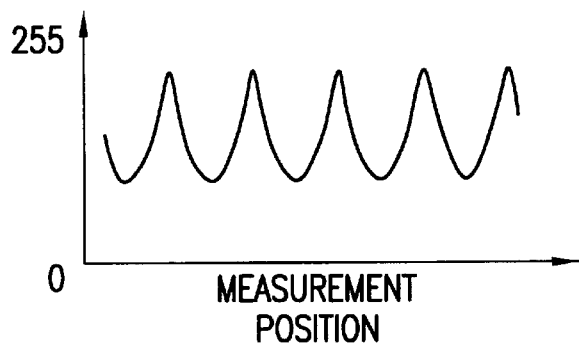
Figure 12C:
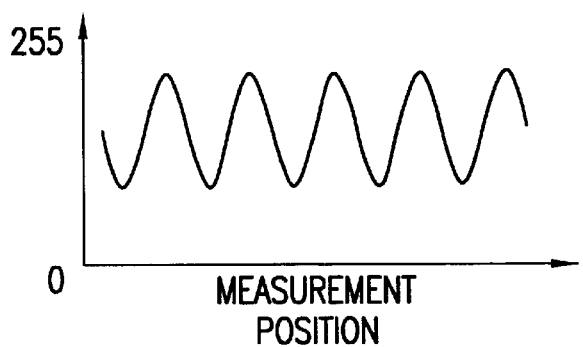

FIGS. 12A to 12C are illustration of waveform change examples caused by normalization and shaping of the AC patch image measurement values. FIG. 12A shows a measurement data string for one patch image in the basic AC patch image group or the auxiliary AC patch image group. The measurement data string is converted into image signal values dependent on the output device by using the relationship $f_{dc}(x)$ provided as shown in FIG. 11, for example, and a normalized data string is prepared. The prepared normalized data string is shown in FIG. 12B. It is equivalent to the YMC signals output from the color space conversion section 11 in FIG. 2. Here, the YMC signals are eight bits, 256 gray levels, but the invention is not limited to them. In the normalized data string, a smaller value is close to white and a greater value indicates higher color density, as described above. Thus, the values are opposite to the reflection rate values in magnitude.

Figure 13:
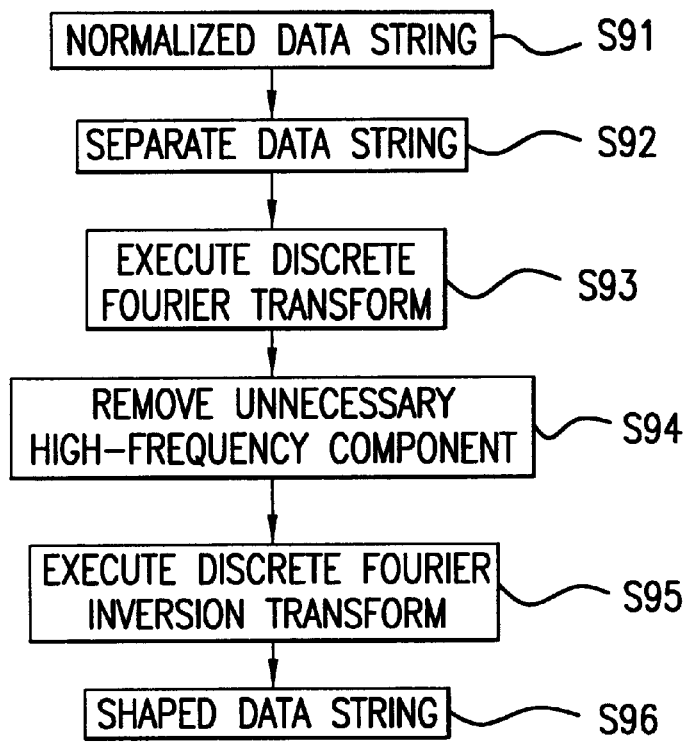
FIG. 13 is a flowchart to show a shaping example for a normalized data string.

Next, at step S54, shaping is performed for the measurement values normalized at step S53 for preparing a shaped data string. FIG. 13 is a flowchart to show a shaping example for the normalized data string. For example, a normalized data string of a waveform as shown in FIG. 12B consists of 1000 measurement data pieces if a patch image 20 mm square is measured at 0.02-mm intervals as described above. At step S91 in FIG. 13, 512 data pieces are separated from the center of the normalized data string consisting of 1000 data pieces. Next, at step S92, discrete Fourier transform (DFT) processing is performed for the 512 data pieces separated at step S91, whereby a spatial frequency component is calculated. At step S93, unnecessary harmonic component is removed from the spatial frequency component calculated at step S92, then inverse discrete Fourier transform processing is performed at step S94. When such shaping is performed, the harmonic component produced due to noise, etc., is removed and a shaped data string based on a sine waveform, for example, as shown in FIG. 12C is provided.

Figure 14:
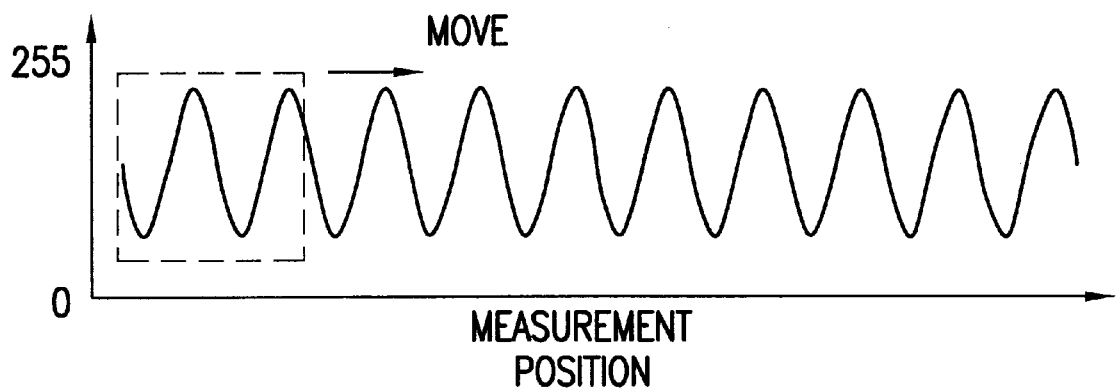
FIG. 14 is an illustration of a measurement method example of the characteristic values for a shaped data string in the first example of the spatial frequency processing section.

At step S55, contrast values are calculated as the characteristic values based on the shaped data string corresponding to the patch images in the basic AC patch image group and the auxiliary AC patch image group. FIG. 14 is an illustration of a measurement method example of the characteristic values for the shaped data string in the first example of the spatial frequency processing section. As shown here, a window area as indicated by the broken line is set for the shaped data string, the maximum and minimum values in the window area are detected, and (maximum value−minimum value) is calculated. While the window area is moved, (maximum value−minimum value) is calculated repeatedly and an average value of the subtraction results is adopted as the contrast value. Period can be found by counting the number of data pieces between feature points, such as between the maximum values or between the minimum values. Since the measurement pitch is 0.2 mm, the period is found by 0.2×the number of data pieces. Spatial frequency can be found by calculating the reciprocal of the period. The window size may be set to a size as large as about two to three stripes contained in each patch image in the basic AC patch image group and the auxiliary AC patch image group.

Figures 15, 16:
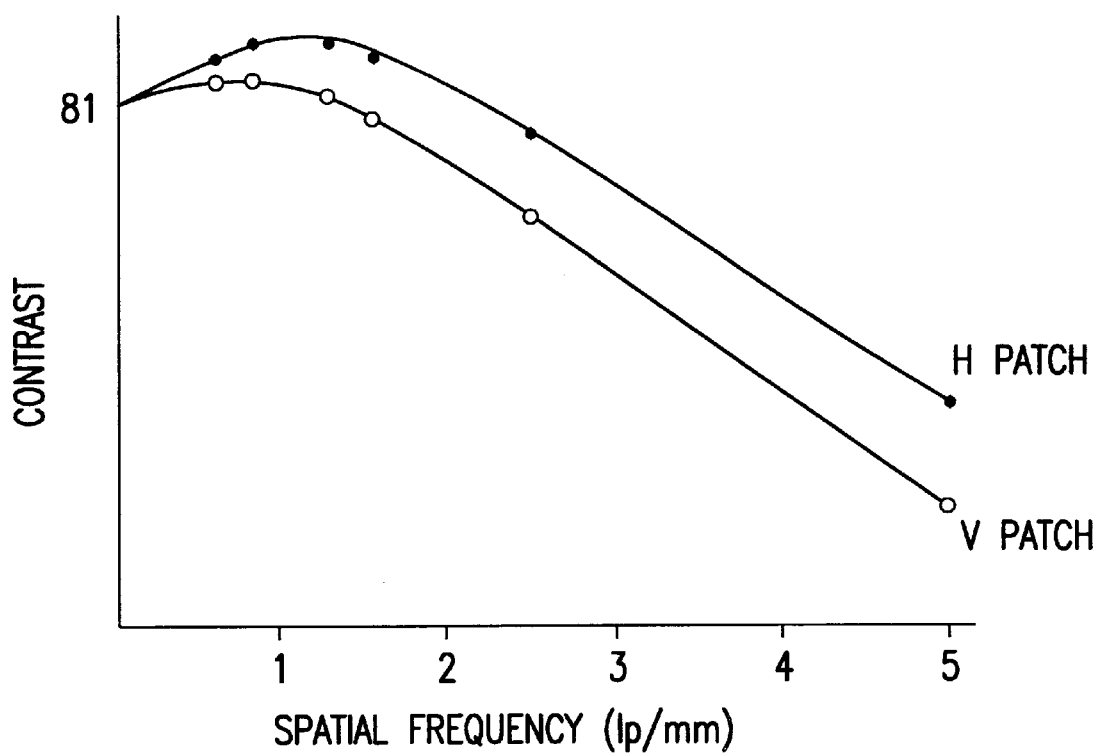
FIG. 15 is an illustration of period and spatial frequency examples of the patch images in the basic AC patch image group and the auxiliary AC patch image group provided from the test pattern image in the first example of the spatial frequency processing section.
FIG. 16 is a graph to show contrast value examples provided from the basic AC patch image group of the test pattern image in the first example of the spatial frequency processing section.

FIG. 15 is an illustration of period and spatial frequency examples of the patch images in the basic AC patch image group and the auxiliary AC patch image group provided from the test pattern image in the first example of the spatial frequency processing section. FIG. 16 is a graph to show contrast value examples provided from the basic AC patch image group of the test pattern image in the first example of the spatial frequency processing section. FIG. 15 shows the period of stripes contained in each patch image in the basic AC patch image group calculated as described above by the length and the number of data pieces, the calculated spatial frequency, and the used window area size by the number of data pieces. FIG. 16 shows an example of the relationship between the spatial frequency and the contrast calculated for each patch image. In FIG. 16, the black dots indicate the relationship between the spatial frequency and the contrast in each patch image of H1–H8 and the white dots indicate the relationship between the spatial frequency and the contrast in each patch image of V1–V8.

FIGS. 15 and 16 list the periods, the spatial frequencies, contrasts, etc., for the patch images in the basic AC patch image group. However, likewise, the period is found and the spatial frequency is calculated and the contrast is calculated for each patch image in the auxiliary AC patch image group.

In the spatial frequency processing coefficient determination process 60, a spatial frequency transfer characteristic of the output device is found from the relationship between the contrast value of the data of each patch image in the basic AC patch image group of the test pattern image data and the contrast value of the test pattern image corresponding thereto, and the processing coefficients in the spatial frequency processing section 12 for correcting the spatial frequency transfer characteristic are calculated.

At step S61, the spatial frequency transfer characteristic of the output device is calculated. The contrast transfer rate at each spatial frequency is considered as the spatial frequency transfer characteristic. The spatial frequency transfer rate of the output device is found by (output image contrast value/input data contrast value). Here, from each patch image consisting of vertical stripes indicated by the symbol letter V in the basic AC patch image group, the spatial frequency transfer rate in the horizontal direction orthogonal to the patch image is found. Likewise, from each patch image consisting of horizontal stripes indicated by the symbol letter H, the spatial frequency transfer rate in the vertical direction orthogonal to the patch image is found. The spatial frequency transfer rate is calculated for both basic and auxiliary AC patch image groups.

Figure 17:
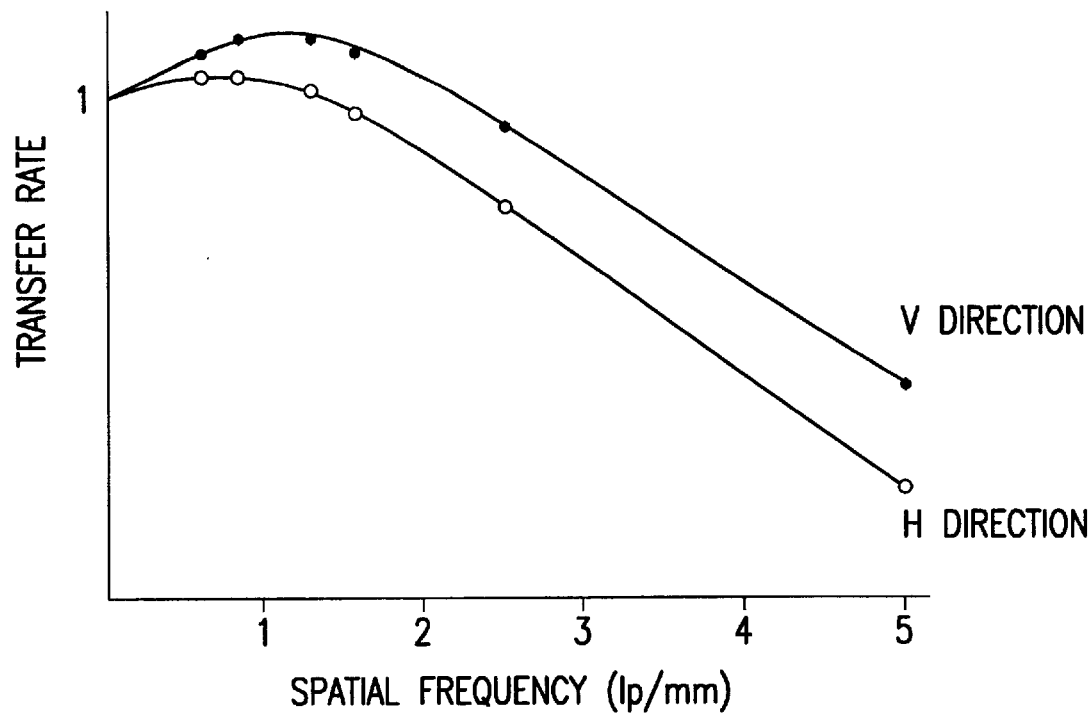
FIG. 17 is a graph to show an example of a calculated spatial frequency transfer characteristic in the basic AC patch image group.

FIG. 17 is a graph to show an example of the calculated spatial frequency transfer characteristic in the basic AC patch image group. In the example, the output image contrast value is a value on the graph shown in FIG. 16 and the input data contrast value is a signal contrast value listed in FIG. 9. However, since the signal contrast value listed in FIG. 9 is indicated as the difference from the DC component, it needs to be doubled to the value of (maximum value−minimum value) or the output image contrast value needs to be halved before the calculation is again made from the beginning.

In FIG. 17, the black dot represents the spatial frequency transfer rate in the vertical direction found from the contrast in the horizontal stripe patch image indicated by the black dot in FIG. 16 and the white dot represents the spatial frequency transfer rate in the horizontal direction found from the contrast in the vertical stripe patch image indicated by the white dot in FIG. 16.

Next, at step S62, a basic spatial frequency transfer characteristic is determined. The basic spatial frequency transfer characteristic refers to a spatial frequency transfer characteristic not considering the DC or AC component difference described with reference to FIGS. 4A and 4B.

As shown in FIG. 2, spatial frequency processing with spatial frequency transfer rate F1 is performed for the image data input to the process operation section 1 by the spatial frequency processing section 12, then the resultant data is sent to the output section 2 and undergoes an image formation process with spatial frequency transfer rate F2 and an output image is prepared. Therefore, assuming that the spatial frequency component that the input image data has is S1 and that the spatial frequency component that the output image has is S2, S2=S1×F1×F2.

To provide the same sharpness independently of the output devices, the spatial frequency transfer rate F1 in the spatial frequency processing section 12 may be a transfer rate for correcting the spatial frequency transfer rate F2 of the image formation process, as described above. That is, the processing coefficients set in the spatial frequency processing section 12 may be designed so that the spatial frequency transfer rate F1 in the spatial frequency processing section 12 becomes equal to 1/F2.

Figure 18:
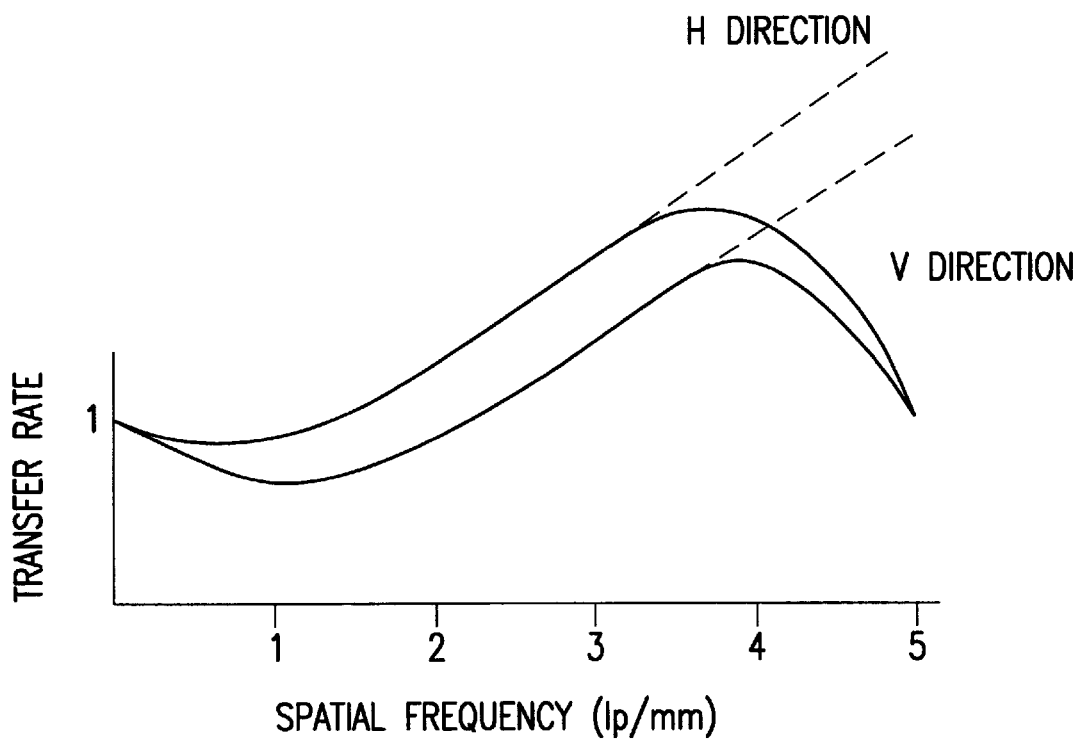
FIG. 18 is a graph to show an example of the spatial frequency transfer rates in the first example of the spatial frequency processing section designed based on the spatial frequency transfer characteristic found from each patch image in the basic AC patch image group.

FIG. 18 is a graph to show an example of the spatial frequency transfer rates in the first example of the spatial frequency processing section designed based on the spatial frequency transfer characteristic found from each patch image in the basic AC patch image group. In the figure, the broken lines are a graph of ideal spatial frequency transfer rates of the output section 2 shown in FIG. 17 and the solid lines are a graph of the spatial frequency transfer rates of the spatial frequency processing section designed actually. For example, when the spatial frequency transfer characteristic of the output section 2 found from each patch image in the basic AC patch image group is that shown in FIG. 17, the spatial frequency transfer rate target values of the spatial frequency processing section 12 become the values indicated by the broken lines in FIG. 18. As they are, noise is extremely emphasized in a high spatial frequency band. To suppress emphasis of the noise component, a color printer having a resolution of 10 dots/mm is set so that the transfer rate becomes 1 at 5 lp/mm, the Nyquist frequency.

At step S63, the processing coefficients in basic spatial frequency processing are calculated so as to realize the spatial frequency transfer rates of the spatial frequency processing section 12 thus designed. To use the configuration shown in FIG. 5, for example, as the spatial frequency processing section 12, the high-pass filter 21 performs the basic spatial frequency processing. At step S63, the filter coefficient of the high-pass filter 21 is determined.

First, based on design values of the vertical and horizontal spatial frequency transfer rates previously found from the basic AC patch image group, two-dimensional plane interpolation is performed for design values and inverse Fourier transform is applied. Next, the inverse Fourier transform result is normalized so that the sum total becomes 1, whereby the filter coefficients of the target spatial frequency transfer characteristic are calculated. Various filter coefficient calculation methods are developed and any one of the methods may be used appropriately. However, the high-pass filter 21 is a filter for outputting only correction signals, as described above. Thus, one is subtracted from the coefficient for the center pixel among the calculated filter coefficients and the result is determined as the filter coefficient of the high-pass filter 21.

Next, at step S64, nonlinear correction coefficients based on AC component, for example, as shown in FIG. 4B are calculated. The filter coefficient of the high-pass filter 21 is calculated based on the basic AC patch image group with the image signal contrast ±40.5, as described above. Now, response of the high-pass filter 21 to input image data with spatial frequency 2.5 lp/mm in a horizontal stripe patch image is considered.

As shown in FIG. 9, the patch image V2 in the test pattern image data has DC component=128, signal contrast=±40.5, and spatial frequency=2.5 lp/mm. Assuming that the spatial frequency transfer rate of the output device calculated for the patch image is T0, contrast Ch0 of the correction amount signal 32 output from the high-pass filter 21 in response to an input signal with signal contrast=C1 becomes C1×(1/T0−1).

Here, assuming that the spatial frequency transfer rate of the output device in response to the input signal with signal contrast=C1 is T1, essentially desired signal contrast Cw1 after correction becomes C1×(1/T1−1). Therefore, if the signal contrast of the input signal is C1, the correction amount signal 32 output from the high-pass filter 21 needs to be amplified. Amplification rate Gain1 is $$Gain1 = Cw1/Ch0 = (1/T1-1)/(1/T0-1)$$

The look-up table 23 is used to find the amplification rate Gain1; the look-up table is referenced according to the correction amount signal 32 and the corresponding amplification rate Gain1 is output. The spatial frequency transfer rates of the output device corresponding to the V2 and H2 patch images in the basic AC patch image group and the V2.3, H2.3, V2.4, and H2.4 patch images in the auxiliary AC patch image group are calculated and the results are used to determine the processing coefficients of the look-up table 23.

As a specific example, assume that the spatial frequency transfer rate T0 corresponding to the V2 patch image with signal contrast C0 ±40.5 is 0.8, that the spatial frequency transfer rate T1 corresponding to the V2.3 patch image with signal contrast C1 ±20.5 is 0.9, and that the spatial frequency transfer rate T2 corresponding to the V2.4 patch image with signal contrast C2 ±81 is 0.7. At this time, assuming that contrasts of the correction amount signals 32 output through the high-pass filter 21 in response to input signals with signal contrasts=C0, C1, and C2 are Ch0, Ch1, and Ch2, $$Ch0 = C0 \times (1/T0-1) = \pm 10.1$$

$$Ch1 = C1 \times (1/T0-1) = \pm 5.1$$

$$Ch2 = C2 \times (1/T0-1) = \pm 20.3$$

Assuming the amplification rates in the look-up table 23 are G0, G1, and G2, $$G0 = (1/T0-1)/(1/T0-1) = 1$$

$$G1 = (1/T1-1)/(1/T0-1) = 0.44$$

$$G2 = (1/T2-1)/(1/T0-1) = 1.71$$

Figure 19:
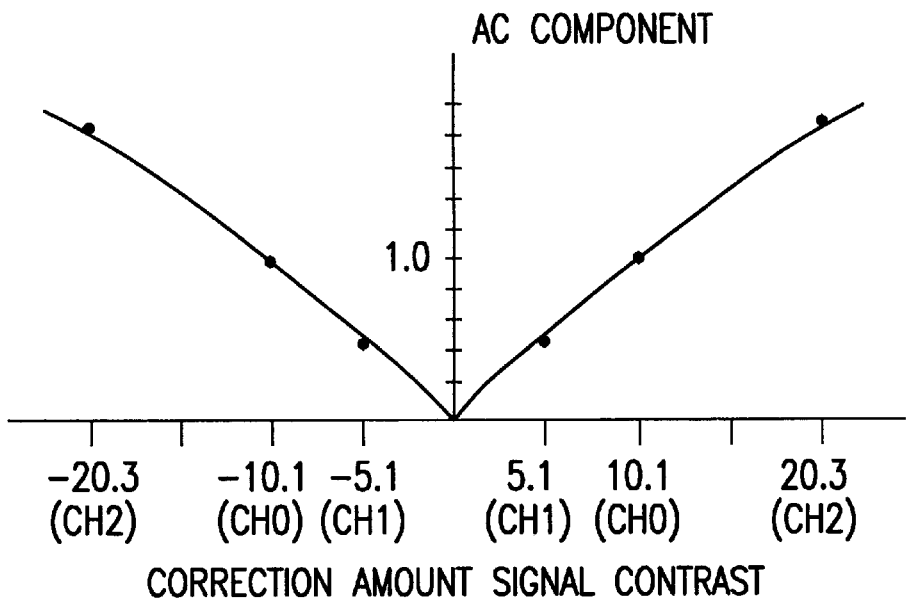
FIG. 19 is a graph to show the relationship between correction amount signal contrasts and amplification rates.

FIG. 19 is a graph to show the relationship between correction amount signal contrasts and amplification rates. The values of the pairs of Ch0 and G0, Ch1 and G1, and Ch2 and G2 are found as described above. They are plotted on a graph and the points are interpolated, whereby a graph as shown in FIG. 19 is provided. A conversion table equivalent to the graph is prepared. Likewise, the H2, H2.3, and H2.4 patch images are used to prepare a conversion table and average values of both the tables may be adopted as the coefficients of the look-up table 23.

Next, at step S65, nonlinear correction coefficients based on DC component, for example, as shown in FIG. 4A are calculated. As the processing coefficients of the look-up table 23 are calculated, response of the high-pass filter 21 is considered. As a specific example, assuming that the spatial frequency transfer rate of the output device calculated for the V2 patch image (DC component=123, data contrast=±40.5, and spatial frequency=2.5 lp/mm) is T0, contrast Ch0 of the correction amount signal 32 output from the high-pass filter 21 in response to an input signal with data contrast=C0 is $$C1 \times (1/T0-1).$$

Here, assuming that the spatial frequency transfer rate of the output device in response to an input signal with DC component=d1 is T'1, essentially desired signal contrast Cw'1 after correction is $$Cw'1 = C0 \times (1/T'1-1)$$

Therefore, if the DC component of the input signal is d1, the correction amount signal 32 output from the high-pass filter 21 needs to be amplified. Amplification rate Gain2 is $$Gain2 = Cw'1/Ch0 = (1/T'1-1)/(1/T0-1)$$

The look-up table 24 is used to find the amplification rate Gain2; the look-up table is referenced according to the input DC component signal 35 and the corresponding amplification rate Gain2 is output. The spatial frequency transfer rates of the output device corresponding to the V2 and H2 patch images in the basic AC patch image group 71 and the V2.1, H2.1, V2.2, and H2.2 patch images in the auxiliary AC patch image group 72 are calculated and the results are used to determine the processing coefficients of the look-up table 24.

As a specific example, assume that the spatial frequency transfer rate T0 corresponding to the V2 patch image with DC component d0 128 is 0.8, that the spatial frequency transfer rate T1 corresponding to the V2.1 patch image with DC component d1 64 is 0.7, and that the spatial frequency transfer rate T2 corresponding to the V2.2 patch image with DC component d2 192 is 0.9. Assuming the amplification rates in the look-up table 24 corresponding to the input signals with DC components=d0, d1, and d2 are G'0, G'1, and G'2, $$G'0=(1/T0-1)/(1/T0-1)=1$$

$$G'1=(1/T1-1)/(1/T0-1)=1.71$$

$$G'2=(1/T2-1)/(1/T0-1)=0.44$$

Figure 20:
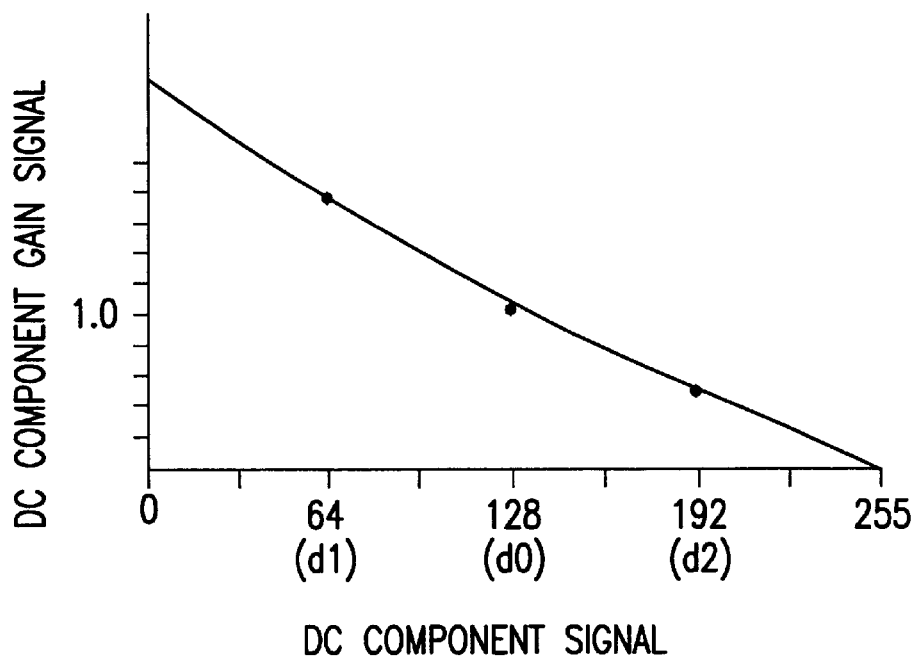
FIG. 20 is a graph to show the relationship between DC component signal values and amplification rates.

FIG. 20 is a graph to show the relationship between DC component signal values and amplification rates. The values of the pairs of d0 and G'0, d1 and G'1, and d2 and G'2 are found as described above. They are plotted on a graph and the points are interpolated, whereby a graph as shown in FIG. 20 is provided. A conversion table equivalent to the graph is prepared. Likewise, the H2, H2.1, and H2.2 patch images are used to prepare a conversion table and average values of both the tables may be adopted as the coefficients of the look-up table 24.

The filter coefficient of the high-pass filter 21 and the coefficients of the look-up tables 23 and 24 are thus provided. These coefficients are set and the spatial frequency processing section 12 performs spatial frequency processing according to the processing coefficients set in response to the output section 2, thereby providing an output image having a spatial frequency characteristic independent of the characteristics of the output section 2.

Figure 21A:
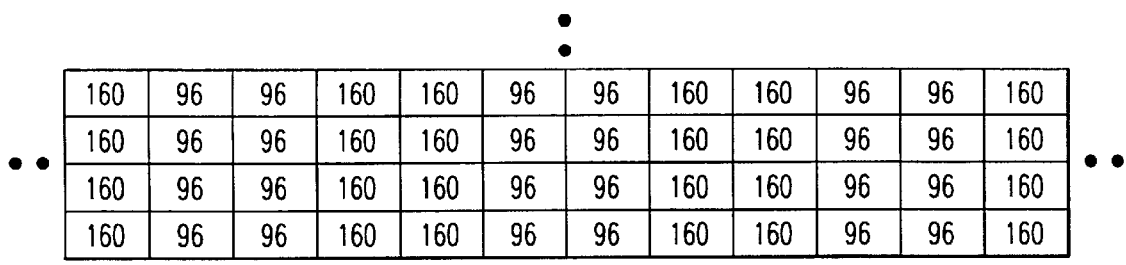
FIGS. 21A to 21C are illustration of other examples of patch images in the AC patch image groups.
Figure 21B:
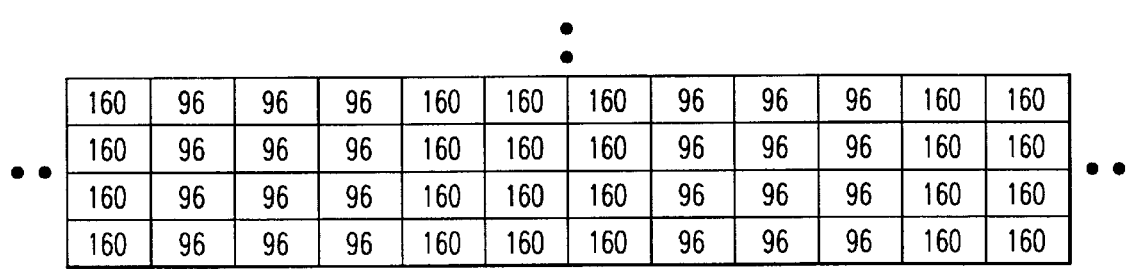
Figure 21C:
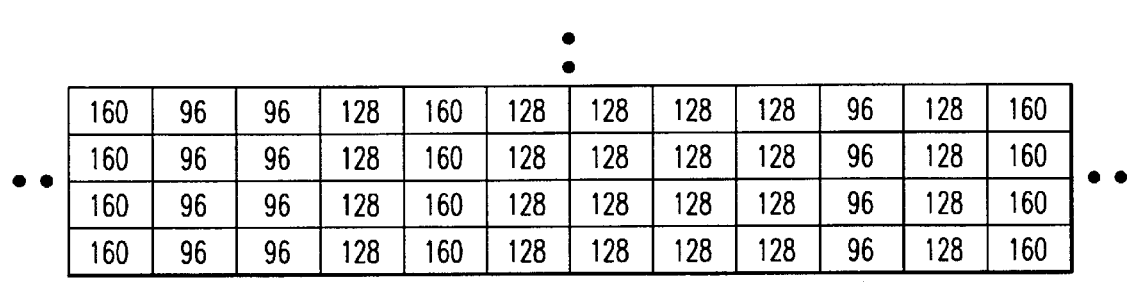

The spatial frequency component contained in each patch image in the basic AC patch image group and the auxiliary AC patch image group of the test pattern image data is a single spatial frequency component and its harmonic component. However, the spatial frequency component contained in each patch image may be a plurality of spatial frequency components. FIGS. 21A to 21C are illustration of other examples of patch images in the AC patch image groups. The patch image example shown in FIG. 21A provides a vertical stripe pattern as an alternating pattern of two black pixels each=160 and two white pixels each=96 in the lateral direction. The patch image example shown in FIG. 21B provides a vertical stripe pattern as an alternating pattern of three black pixels each=160 and three white pixels each=96 in the lateral direction. For example, the patch image patterns shown in FIGS. 21A and 21B are composed and a pattern as shown in FIG. 21C can also be used as a patch image of test pattern image data. In this case, when unnecessary harmonic component is removed at step S93 in FIG. 13 in AC patch normalization measurement value shaping described at step S54 in FIG. 6, spatial frequency data is decomposed into DC component and spatial frequency component corresponding to each image data pattern before the composing and inverse discrete Fourier transform is executed for each component at step S94, whereby the processing coefficients for spatial frequency processing can be calculated.

In the example, only the patch images having the same spatial frequencies as the V2 and H2 patch images are provided as the auxiliary AC patch images, but auxiliary AC patch images corresponding to various spatial frequencies may be provided. At this time, conversion tables as shown in FIGS. 19 and 20 are provided for each spatial frequency. To reference the look-up table 23, spatial frequency together with the contrast of the correction amount signal 32 may be used; to reference the look-up table 24, AC component spatial frequency together with the DC component signal 35 may be used. In this case, the AC, DC component correction amount difference caused by the spatial frequency difference can be corrected.

Figure 22:
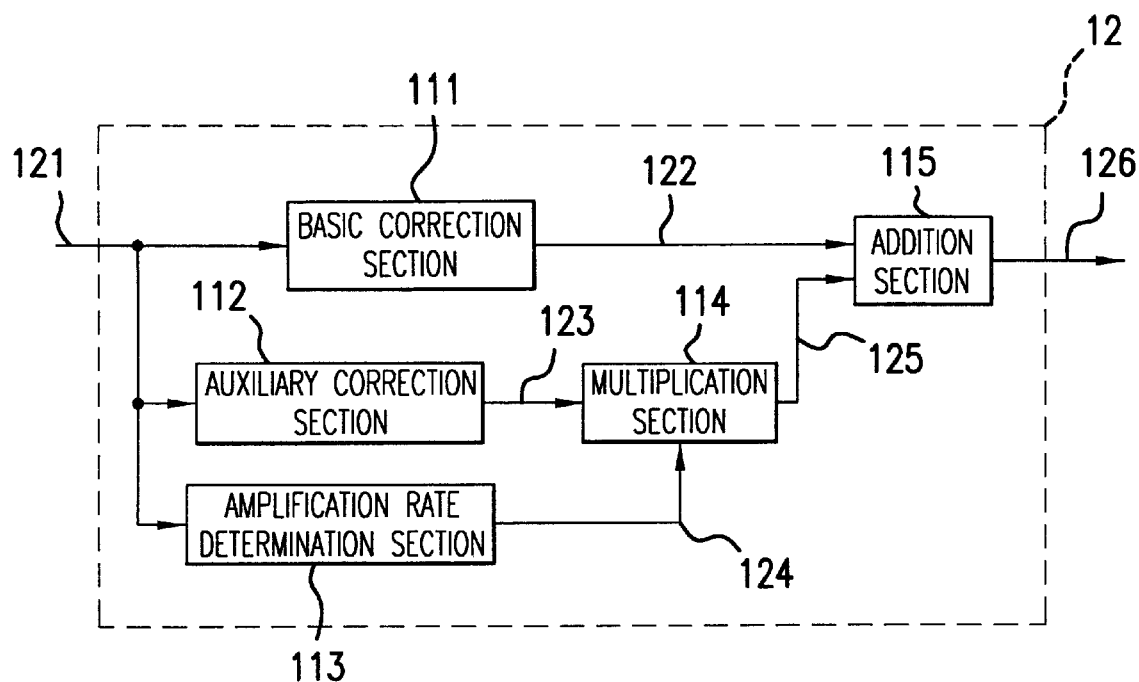
FIG. 22 is a block diagram to show a second configuration example of the spatial frequency processing section.

FIG. 22 is a block diagram to show a second configuration example of the spatial frequency processing section. In the figure, numeral 111 is a basic correction section, numeral 112 is an auxiliary correction section, numeral 113 is an amplification rate determination section, numeral 114 is a multiplication section, numeral 115 is an addition section, numeral 121 is an input image signal, numeral 122 is a basic correction signal, numeral 123 is an auxiliary correction basic signal, numeral 124 is an auxiliary correction amplification rate signal, numeral 125 is an auxiliary correction signal, and numeral 126 is an output image signal.

The basic correction section 111 and the auxiliary correction section 112 are provided for changing the spatial frequency characteristic of the input image signal 121. For example, digital filters such as two-dimensional FIR filters can be used as the basic correction section 111 and the auxiliary correction section 112. The digital filters facilitate design of a processing system having high reproducibility. High-speed processing can be carried out at low costs by using already existing dedicated chips. The processing system can be easily stabilized for the input image signal 121 by using FIR filters. The basic correction section 111, which can be a two-dimensional filter with the filter coefficient sum 1, for example, performs spatial frequency processing for the input image signal 121 and outputs the basic correction signal 122. The auxiliary correction section 112, which can be a two-dimensional filter with the filter coefficient sum 0, for example, performs spatial frequency processing for the input image signal 121 and outputs the auxiliary correction basic signal 123.

The amplification rate determination section 113 determines an amplification rate of the auxiliary correction basic signal 123 from the input image signal 121 and outputs the determined amplification rate as the auxiliary correction amplification rate signal 124. The detailed internal operation will be described later.

The multiplication section 114 amplifies and adjusts the auxiliary correction basic signal 123 input from the auxiliary correction section 112 according to the auxiliary correction amplification rate signal 124 input from the amplification rate determination section 113 and outputs the resultant signal as the auxiliary correction signal 125.

The addition section 115 adds the basic correction signal 122 and the auxiliary correction signal 125 together and outputs the output image signal 126 subjected to spatial frequency processing.

In the configuration, the input image signal 121 input to the spatial frequency processing section 12 is input to the basic correction section 111, the auxiliary correction section 112, and the amplification rate determination section 113. The basic correction section 111 applies a basic correction to the input image signal 121 and outputs the resultant signal to the addition section 115 as the basic correction signal 122.

On the other hand, the auxiliary correction section 112 calculates the auxiliary correction basic signal 123, a preparatory signal for adjusting excess or shortage of the correction using the basic correction section 111 from the input image signal 121 and outputs the calculated signal to the multiplication section 114, which then amplifies and adjusts the auxiliary correction basic signal 123 based on the auxiliary correction amplification rate signal 124 calculated by the amplification rate determination section 113 and outputs the resultant signal to the addition section 115 as the auxiliary correction signal 125. The addition section 115 adds the basic correction signal 122 and the auxiliary correction signal 125 together and outputs the output image signal 126.

The operations performed by the auxiliary correction section 112, the amplification rate determination section 113, and the multiplication section 114 are correction to deal with input having the same spatial frequency and different DC component and/or AC component previously described with reference to FIGS. 4A and 4B.

Figure 23:
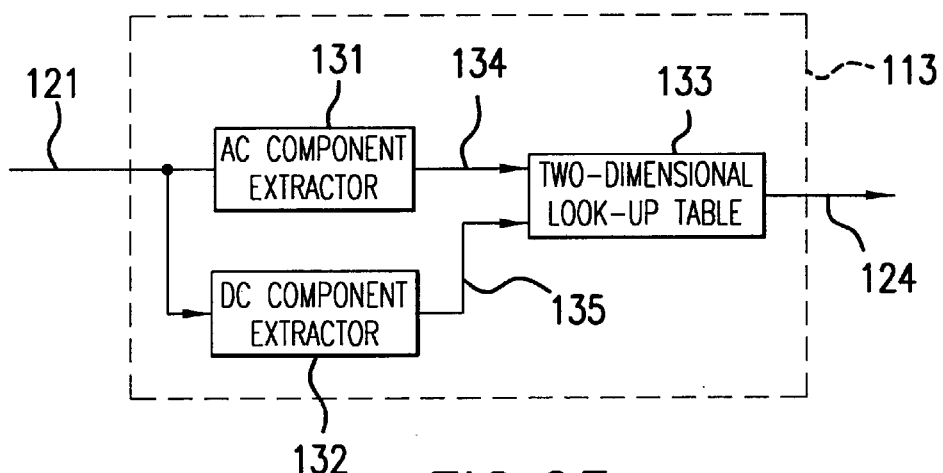
FIG. 23 is a block diagram to show a configuration example of an amplification rate determination section.

FIG. 23 is a block diagram to show a configuration example of the amplification rate determination section. In the figure, numeral 131 is an AC component extractor, numeral 132 is a DC component extractor, numeral 133 is a two-dimensional look-up table, numeral 134 is an AC component signal, and numeral 135 is a DC component signal. The AC component extractor 131, which is provided for extracting a local AC component surrounding an attention pixel, calculates the difference between the maximum and minimum values of the 11×11 area centering on the attention pixel, for example, for the input image signal 121, and outputs the difference as the AC component signal 134. The AC component extractor 131 can efficiently deal with the input image signal 121 having different AC components.

The DC component extractor 132, which is provided for extracting a local DC component surrounding an attention pixel, calculates an average value of the 11×11 area centering on the attention pixel, for example, for the input image signal 121, and outputs the average value as the DC component signal 135. The DC component extractor 132 can efficiently deal with the input image signal 121 having different DC components.

The two-dimensional look-up table 133 receives the AC component signal 134 input from the AC component extractor 131 and the DC component signal 135 input from the DC component extractor 132 and generates and outputs the auxiliary correction amplification rate signal 124. The two-dimensional look-up table 133 can be used to provide any desired output responsive to an input signal. It can also be used to provide an output signal flexibly responsive to any combination of input AC and DC component signals.

In such a configuration, the processing coefficients to be determined are filter coefficients of two-dimensional FIR filters, for example, of the basic correction section 111 and the auxiliary correction section 112 and a conversion table of the two-dimensional look-up table 133. These values are determined in accordance with the output device characteristics. The determination method of the values will be described. If only output devices where spatial frequency characteristic change caused by the DC component, AC component difference as shown in FIGS. 4A and 4B can be ignored are connected to the system, the auxiliary correction section 112, the amplification rate determination section 113, the multiplication section 114, and the addition section 115 are not required and output of the basic correction section 111 can be made directly an output image signal. In this case, either or both of the filter coefficient of the auxiliary correction section 112 and the coefficients in the conversion table of the two-dimensional look-up table 133 in the amplification rate determination section 113 may be set to all 0. In this case, in the description that follows, only the filter coefficient of the basic correction section 111 may be found. Of course, a configuration not considering the DC or AC component difference is also possible.

Figure 24:
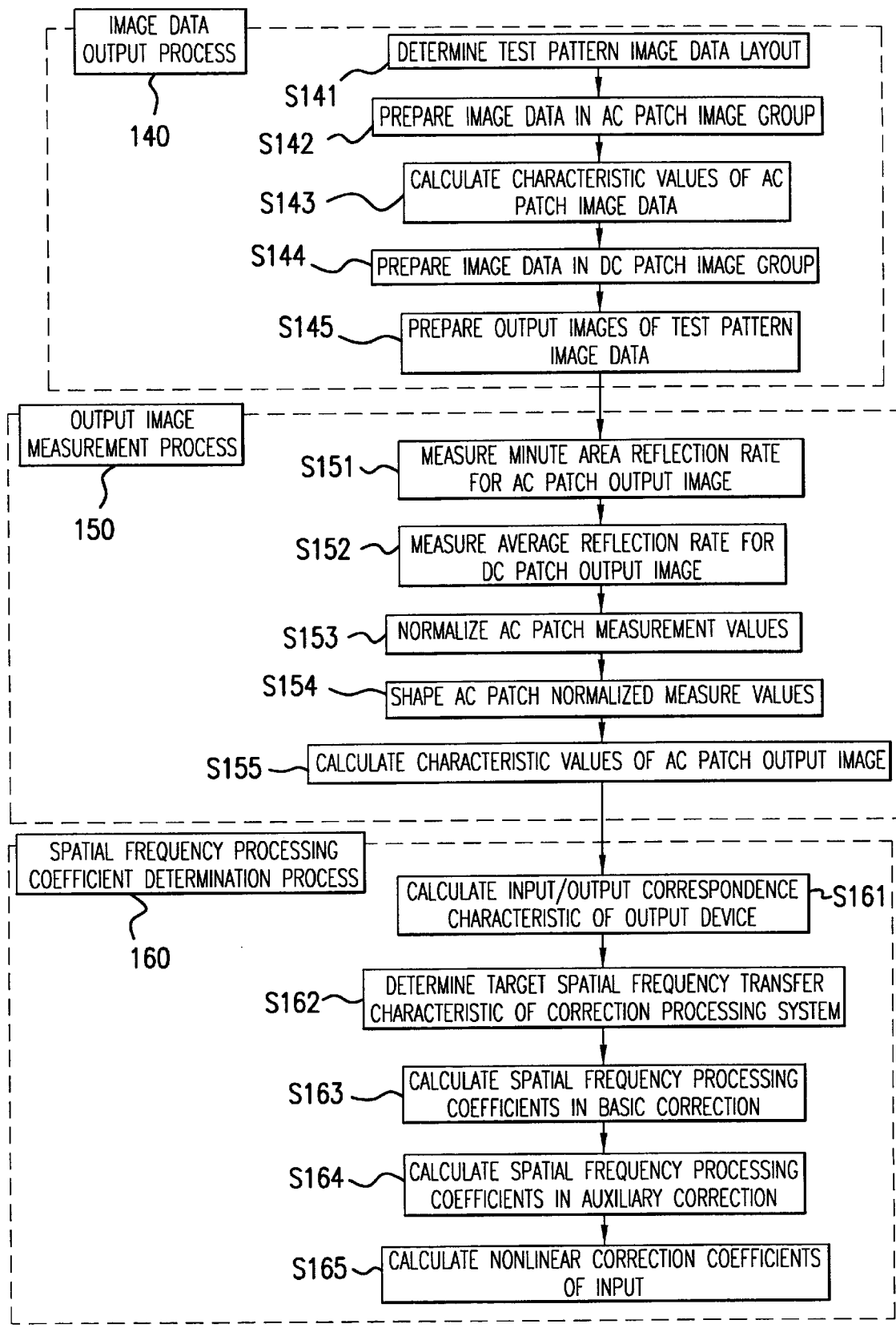
FIG. 24 is a flowchart to show a processing example of determining processing coefficients used in the second example of the spatial frequency processing section.

FIG. 24 is a flowchart to show a processing example of determining processing coefficients used in the second example of the spatial frequency processing section. An outline of the flowchart shown in FIG. 24 is almost similar to that of the flow shown in FIG. 6. An image data output process 140 in FIG. 24 corresponds to the image data output process 40 in FIG. 6, an output image measurement process 150 corresponds to the output image measurement process 50, and a spatial frequency processing coefficient determination process 160 corresponds to the spatial frequency processing coefficient determination process 60. The determination process flow of processing coefficients in the second example of the spatial frequency processing section 12 will be described although it overlaps the processing of the spatial frequency processing section 12 shown in FIG. 6. The description to follow assumes an output device having an input data resolution of 10 dots/mm as a specific output device example.

Figure 25:
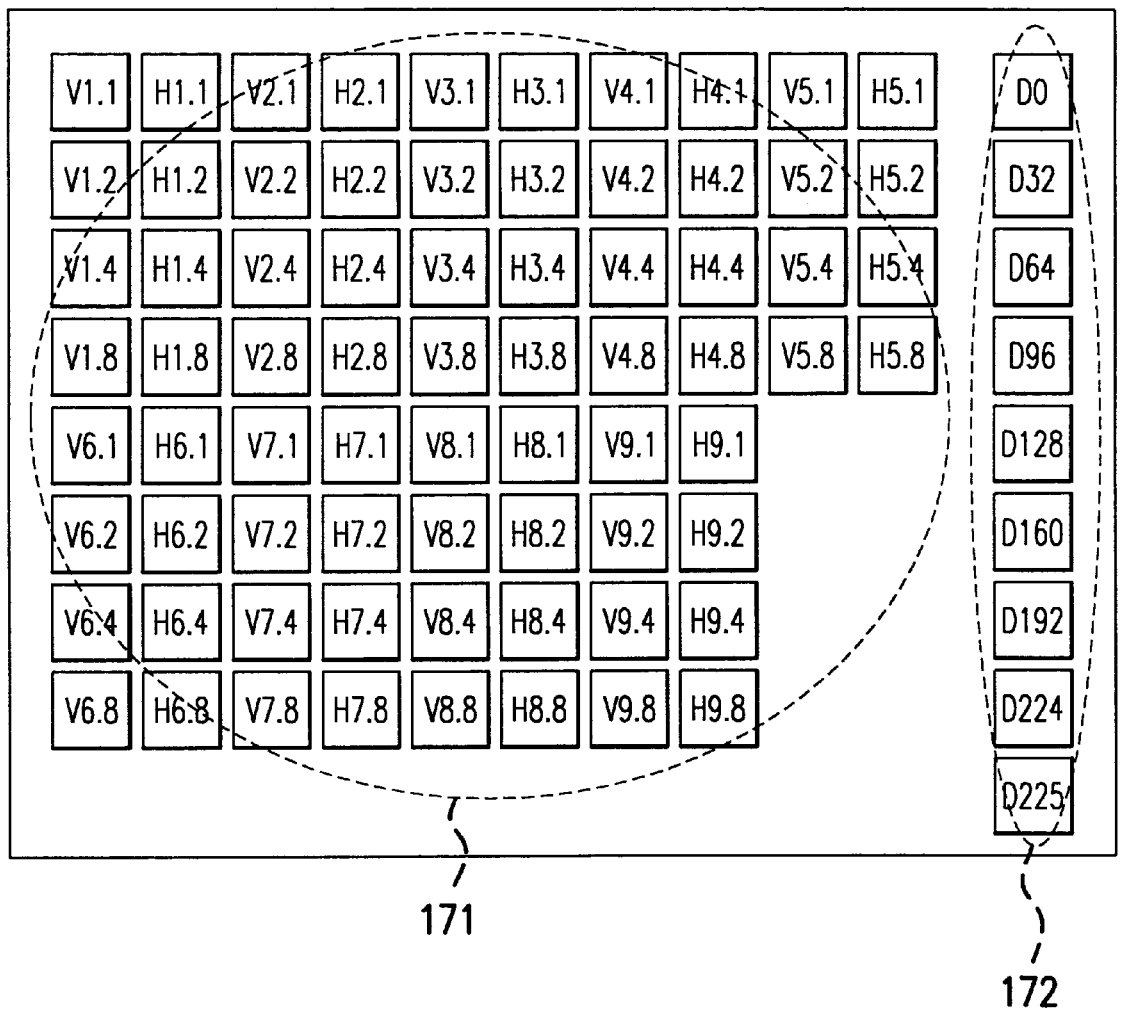
FIG. 25 is an illustration to show a layout example of test pattern image data used in the second example of the spatial frequency processing section.

First, at step S141, a layout of test pattern image data is determined. FIG. 25 is an illustration to show a layout example of test pattern image data used in the second example of the spatial frequency processing section. In the figure, numeral 171 is an AC patch image group and numeral 172 is a DC patch image group. The test pattern image data layout shown in FIG. 25 is made up of the AC patch image group 171 and the DC patch image group 172. Each patch image group contains patch images. FIG. 25 shows a total of 81 patch images. The size of each patch image is 200 pixels×200 pixels so that it becomes an area 20 $mm^2$ when the patch image is output on the printer having a resolution of 10 dots/mm.

Here, the patch images in the AC patch image group 171 are patch images each having a spatial frequency component other than 0 lp/mm, namely, patch images varying in tone. The AC patch image group 171 is provided for finding a spatial frequency transfer characteristic of the output device. The filter coefficients of the basic correction section 111 and the auxiliary correction section 112 shown in FIG. 22 and the conversion table of the two-dimensional look-up table 133 shown in FIG. 23 are determined based on the spatial frequency transfer characteristic of the output device found using the AC patch image group 171. The patch images in the AC patch image group 171 consist of patch images of vertical stripes indicated by V1.1–V9.8 and those of horizontal stripes indicated by H1.1–H9.8. Of the symbols indicating the patch images, V represents vertical stripes and H represents horizontal stripes. The first one of two digits following V or H is a serial number representing a combination condition of AC and DC components contained in each patch image and the second digit is a serial number representing spatial frequency of tone of each patch image. That is, H1.1–H1.8 are patch images having the same AC and DC components and differing only in spatial frequency of tone. This also applies to H2.1–H2.8, . . . , V9.1–V9.8. Each of pairs of V1.1 and H1.1, . . . , V9.8 and H9.8 is patch images having the same AC and DC components and the same spatial frequency of tone and differing only in stripe direction.

The patch images in the DC patch image group 172 are patch images not containing a spatial frequency component other than 0 lp/mm, namely, patch images at flat density with no density change; they are provided for normalizing the measurement values of the AC patch image group 171, as described later. D0–D255 are patch images different in density.

The test pattern image data layout shown in FIG. 25 is an example; any other layout may be adopted if what patch images are placed at which positions is seen. Each patch image group may be formed as separate test pattern images.

The number, characteristics, sizes, etc., of the patch images contained in the patch image groups are arbitrary. Particularly in the example, the AC patch images having nine AC component/DC component combinations are used, but precision can be improved by adding AC patch images.

For example, the test pattern image data layout as shown in FIG. 25 may be previously prepared and stored in the test pattern holding section 5, etc. A plurality of test pattern image data layouts can also be stored for selective use. The test pattern image data is stored in the test pattern holding section 5, whereby it may be laid out only once and output of the test pattern image can be speeded up at the second time and later, whereby the operation sequence time of the image data output process 140, the output image measurement process 150, and the spatial frequency processing coefficient determination process 160 can be shortened and the image output device can be corrected easily.

At step S142, for example, image data of the AC patch image group 171 in the test pattern image data as shown in FIG. 25 is prepared. As described above, in FIG. 25, the symbols V1.1–V1.8, V2.1–V2.8, . . . , V9.1–V9.8 given to the patch images in the AC patch image group 171 represent vertical line, H1.1H–1.8, H2.1–H2.8, . . . , H9.1–H9.8 represent horizontal lines, and the digits following the symbol V or H represent the AC and DC component combination condition type and the width of the line in terms of the number of pixels. The patch images can be formed as in the examples shown in FIGS. 8A and 8B described in the first example of the spatial frequency processing section. FIG. 8A corresponds to a part of the V1.2 patch image and FIG. 8B corresponds to a part of the H1.3 patch image. Here, the data value of each black pixel is 160 and that of each white pixel is 96. Of course, a patch image containing a plurality of spatial frequency components as shown in FIG. 21 may be used.

FIGS. 26 and 27 are each an illustration of characteristic value examples of the patch images in the AC patch image group used in the second example of the spatial frequency processing section. They list the spatial frequencies, black pixel data values, white pixel data values, DC component values, AC component values, and signal contrast values for the AC patch image group 171. The spatial frequency indicates how many line pair per mm are contained in lp/mm units. If the patch image is V1.1 or H1.1, white and black lines appear alternately every other pixel, thus the spatial frequency of V1.1, H1.1 indicates that five lines are contained in 10 dots per mm, the assumed printer resolution. The DC component value indicates average density and the AC component value indicates the difference between the black pixel data value and the white pixel data value and the DC component value. The density is represented as 255 for a black portion at the highest black density and 0 for a white portion at the lowest black density. The signal contrast values will be described later.

Image data of the patch images in the AC patch image group 171 is prepared, for example, according to the parameters shown in FIGS. 26 and 27 and the prepared patch image data is embedded, for example, in accordance with the test pattern image data layout as shown in FIG. 25.

Next, at step S143, characteristic values are calculated from the image data of the patch images in the AC patch image group 171. The data values of the pixels of the patch images in the AC patch image group 171 are set like black pixel value=160 and white pixel value=96, for example, in the V1.1 patch image. In other words, they can be represented as DC component value=123 and AC component value=±32. The setup values of the patch images represented by the DC and AC component values are listed in FIGS. 26 and 27.

Here, the DC component values and the signal contrast values are considered as the characteristic values of the image data of the patch images in the AC patch image group 171. The DC component values are those shown in FIGS. 26 and 27. The signal contrast values are corrected based on the above-described AC component values. Since an image signal is a rectangular wave rather than a sine wave, the effective contrast value is improved as compared with that when the signal is a sine wave. This fact is considered to correct the contrast value. Actual correction can be calculated according to signal contrast value AC component value×(4/3.14)

The contrast values of the patch images found by making such a correction are listed under the signal contrast value column of FIGS. 26 and 27.

At step S144, image data of the patch images in the DC patch image group 172 is prepared. In FIG. 25, D of symbols D0–D255 given to the patch images in the DC patch image group 172 indicates that the patch image contains DC component, namely, spatial frequency component of only 0 lp/mm, and the digits following the letter D represent the DC component data value. For example, the D064 patch image means a uniform patch image with 64 as the data value of every pixel of 200 pixels×200 pixels.

Here, data value=0 to data value=255 are almost equally divided for providing nine patch images. Image data of the patch images is prepared and the prepared image data of the patch images is embedded, for example, in accordance with the test pattern image data layout as shown in FIG. 25, whereby test pattern image data is complete. The complete test pattern image data is held in the test pattern holding section 5. For the color printer, the same test pattern image data is provided separately for three colors of Y, M, and C and additionally for color of K or is used common to the three or four colors.

At step S145, the last step of the image data output process 140, the test pattern image data is output from the output device and a test pattern image is prepared. To output the test pattern image, first the output device is set to a single color mode and the test pattern image is output. For example, when the output device is set to a Y single color mode, test pattern image data as Y image signal is output from the test pattern holding section 5. The gradation conversion section 13 shown in FIG. 2 uses the look-up table to apply gradation conversion processing to the test pattern image data output from the test pattern holding section 5, then outputs the resultant data through the output section 2 to the output device. The output device receives the test pattern image data to which the Y gradation conversion processing has been applied and outputs the output image of the data in the Y single color mode. For M and C, likewise the output device is set to M and C single color modes and M and C test pattern images are provided, a total of three test pattern images being provided.

The provided test pattern images are images laid out as shown in FIG. 25, for example. However, the patch images reflect the characteristics of the output device and are not always images faithfully reflecting the test pattern image data. Then, the output image measurement process 150 and the spatial frequency processing coefficient determination process 160 are executed for each of the three provided test pattern images. For convenience, a description will be given only to one of the colors; similar processing is performed for the three colors.

Figure 28:
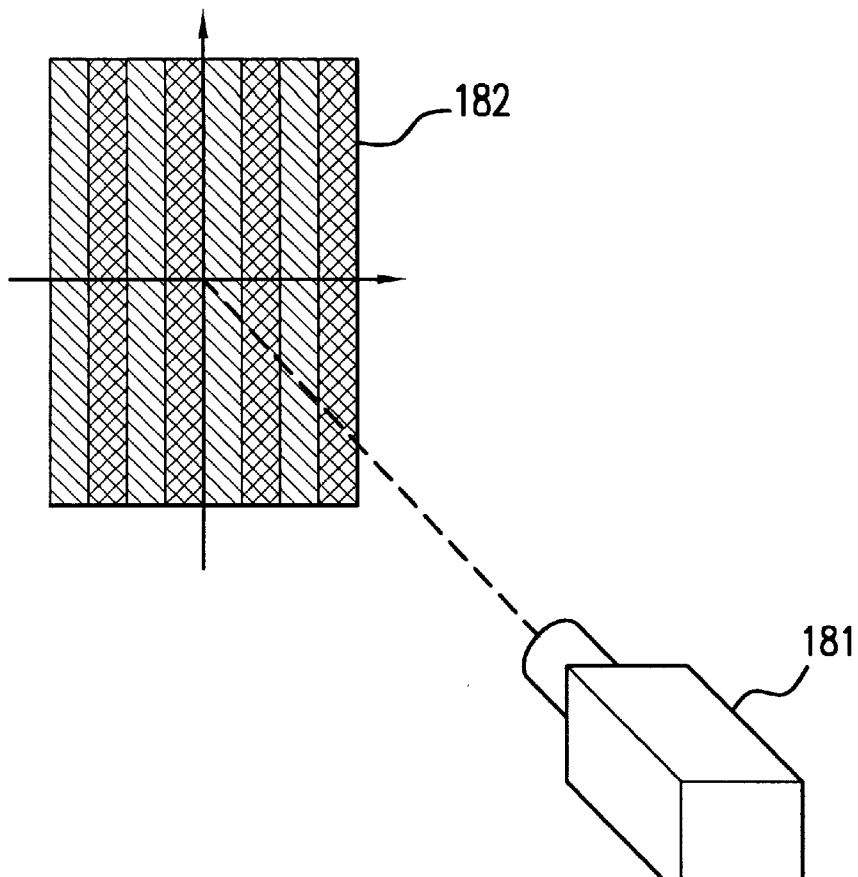
FIG. 28 is an illustration of another specific example of reflection rate measurement.

In the output image measurement process 150, the test pattern image of the test pattern image data output from the output device is measured and the measurement result is analyzed. First, at step S151, a reflection rate is measured for each minute area about the AC patch image group in the test pattern image. To measure the reflection rate, a digital camera, etc., can be used, for example. If a digital camera is used, simultaneous reflection rate measurement in a wide area is enabled. FIG. 28 is an illustration of another specific example of reflection rate measurement. In the figure, numeral 181 is a digital camera and numeral 182 is a patch image. For example, the position of the digital camera 181 is adjusted so that an area 20 mm square of the test pattern image can be input as image data of 1000 pixels×1000 pixels, and the test pattern image is picked up. This is equivalent to measuring of the reflection rate of the test pattern image at 0.02-mm intervals. When the test pattern image is picked up, the test pattern image should not be inclined with respect to the axis of the digital camera. A complementary color filter may be used for picking up the test pattern image. Of course, the scanning method with the aperture 81 as shown in FIG. 10 may be used or line-type image pick-up devices may be used for scanning. The method shown in FIG. 28 can also be used in the first example of the spatial frequency processing section.

Subsequently, at step S152, a reflection rate is also measured for each minute area about the patch images in the DC patch image group in the test pattern image and an average reflection rate is found. Also in this case, the digital camera 181 can be used as shown in FIG. 28 or the scanning method as shown in FIG. 10 can be used, for example. Since the DC patch image group contains uniform patch images of DC components only as described above, the DC patch images are picked up and an average value of the picked-up measurement data images is found. If a filter is used for measurement of the AC patch image group, the identical filter is also used here.

An analysis is performed on the measurement values thus provided. First, at step S153, the measurement values in the patch images in the AC patch image group are normalized. As in the first example of the spatial frequency processing section, when the average reflection rate data of the patch images in the DC patch image group provided by the measurement at step S152 is related to the data values of the patch images in the DC patch image group in the test pattern image data, the relationship, for example, as shown in FIG. 11 is produced. First, the relationship $f_{dc}(x)$ is found by an approximate value. The measurement values with the digital camera 181 for the patch images in the AC patch image group are converted by using the relationship $f_{dc}(x)$, whereby the measurement results can be handled like the YMC image signals handled by the process operation section 1.

Figures 29A, 29B:
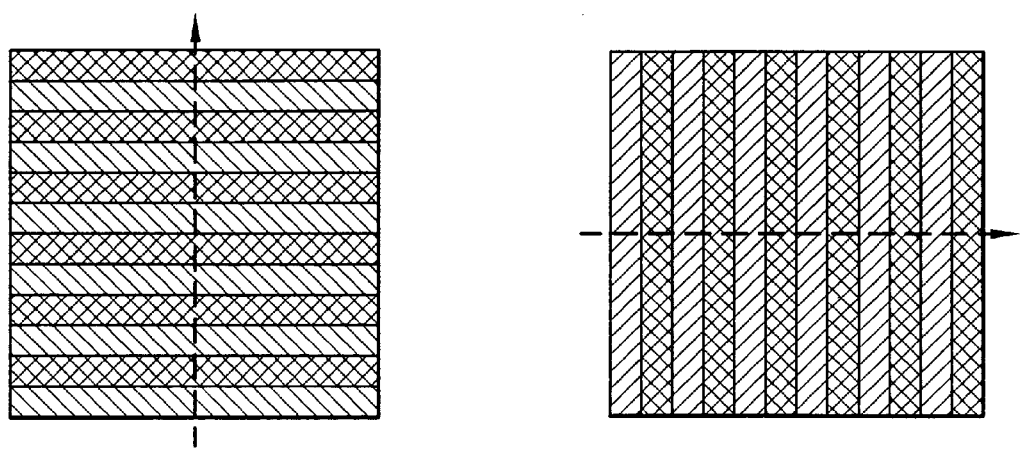
FIGS. 29A and 29B are illustration of orientations of measurement data strings measured in the second example of the spatial frequency processing section.

FIGS. 29A and 29B are illustration of orientations of measurement data strings measured in the second example of the spatial frequency processing section. For the measurement data image for horizontal stripe AC patch image, the measurement data string is a measurement data string of a vertical cross section as shown in FIG. 29A. Likewise, for the measurement data image for vertical stripe AC patch image, the measurement data string is a measurement data string of a horizontal cross section as shown in FIG. 29B. The measurement data string of a cross section of the measurement data image for AC patch image is, for example, as shown in FIG. 12A. The measurement data image is converted into image signal values dependent on the output device by using the relationship $f_{dc}(x)$ provided as shown in FIG. 11, for example, and a normalized data image is prepared. The normalized data string of the cross section of the normalized data image is, for example, as shown in FIG. 12B. The orientation of the cross section is similar to that for the measurement data image in FIG. 29. The normalized data image is equivalent to the YMC signals output from the color space conversion section 11 in FIG. 2. Here, the YMC signals are eight bits, 256 gray levels, but the invention is not limited to them. In the normalized data image, a smaller value is close to white and a greater value indicates higher color density, as described above. Thus, the values are opposite to the reflection rate values in magnitude.

Next, at step S154, shaping is performed for the measurement data image normalized at step S153 for preparing a shaped data image. This shaping step is basically the same as the process shown in FIG. 13 in the first example of the spatial frequency processing section. Here, assuming that a patch image 20 mm square is measured with the digital camera 181 at 0.02-mm intervals as shown in FIG. 28, two-dimensional processing will be described with reference to FIG. 13. In this case, normalized image data consists of measurement data pieces of 1000 pixels×1000 pixels, for example. At step S91 in FIG. 13, data pieces of 512 pixels×512 pixels are separated from the center of the normalized data image consisting of the data pieces of 1000 pixels×1000 pixels.

Next, at step S92, two-dimensional Fourier transform (2D-DFT) processing is performed for the data pieces of 512 pixels×512 pixels separated at step S91, whereby a spatial frequency component is calculated. At step S93, unnecessary harmonic component is removed from the spatial frequency component calculated at step S92, then two-dimensional inverse discrete Fourier transform processing (2D-IDFT) is performed at step S94. When such shaping is performed, noise and the harmonic component are removed and a shaped data image having a shaped data string based on a sine waveform on the cross section, for example, as shown in FIG. 12C is provided. Here, the orientation of the cross section is similar to that for the measurement data image in FIG. 29.

Figure 30A:
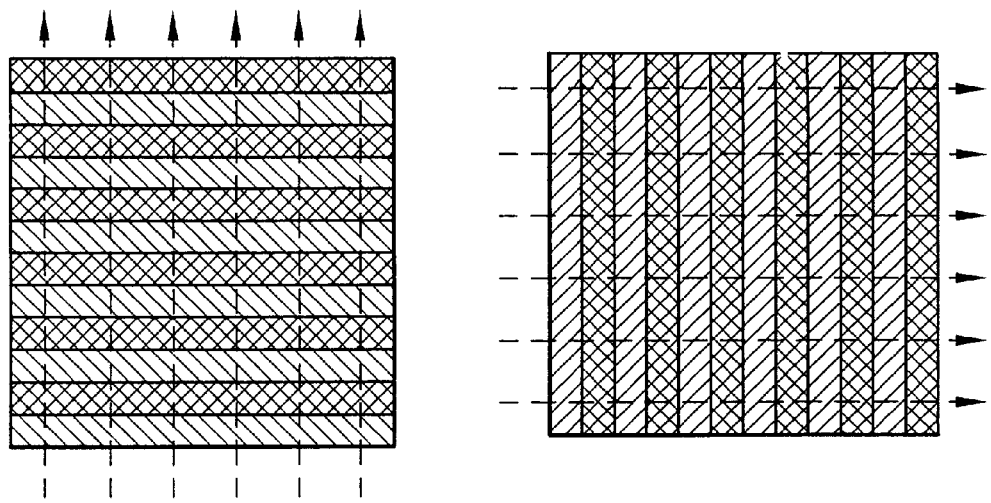
FIGS. 30A and 30B are illustration of a calculation method example of the characteristic values for a shaped data image in the second example of the spatial frequency processing section.
Figure 30B:
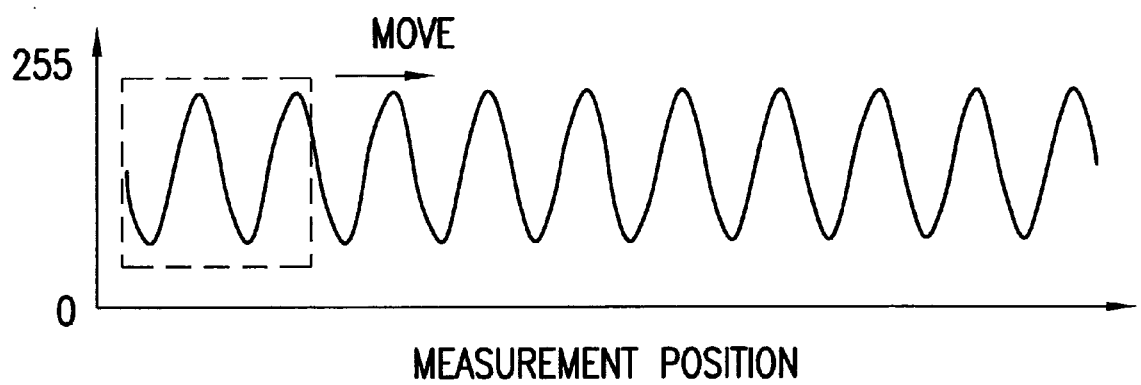

At step S155, contrast values are calculated as the characteristic values based on the shaped data images corresponding to the AC patch image group. FIG. 30 is an illustration of a calculation method example of the characteristic values for the shaped data image in the second example of the spatial frequency processing section. First, shaped data strings are taken out from the shaped data image along the direction orthogonal to the stripes as shown in FIG. 30A. The characteristic value calculation precision can be raised by taking out a plurality of the shaped data strings. In FIG. 30A, six shaped data strings are taken out from one shaped data image. The shaped data string is a data string based on a sine waveform as shown in FIG. 12C. As shown in FIG. 30B, a window area as indicated by the broken line is set for one shaped data string, the maximum and minimum values in the window area are detected, and (maximum value−minimum value) is calculated. While the window area is moved, (maximum value−minimum value) is calculated repeatedly. An average value of the subtraction results of (maximum value−minimum value) calculated for all shaped data strings-taken out from one shaped data image is adopted as the contrast value. From the shaped data strings, period can be found by counting the number of data pieces between features, such as between the maximum values or between the minimum values. Since the measurement pitch is 0.02 mm, the period is found by 0.02 mm×the number of data pieces. Spatial frequency can be found by calculating the reciprocal of the period. The window size may be set to a size as large as about two to three stripes contained in each patch image in the AC patch image group.

Figures 31, 32:
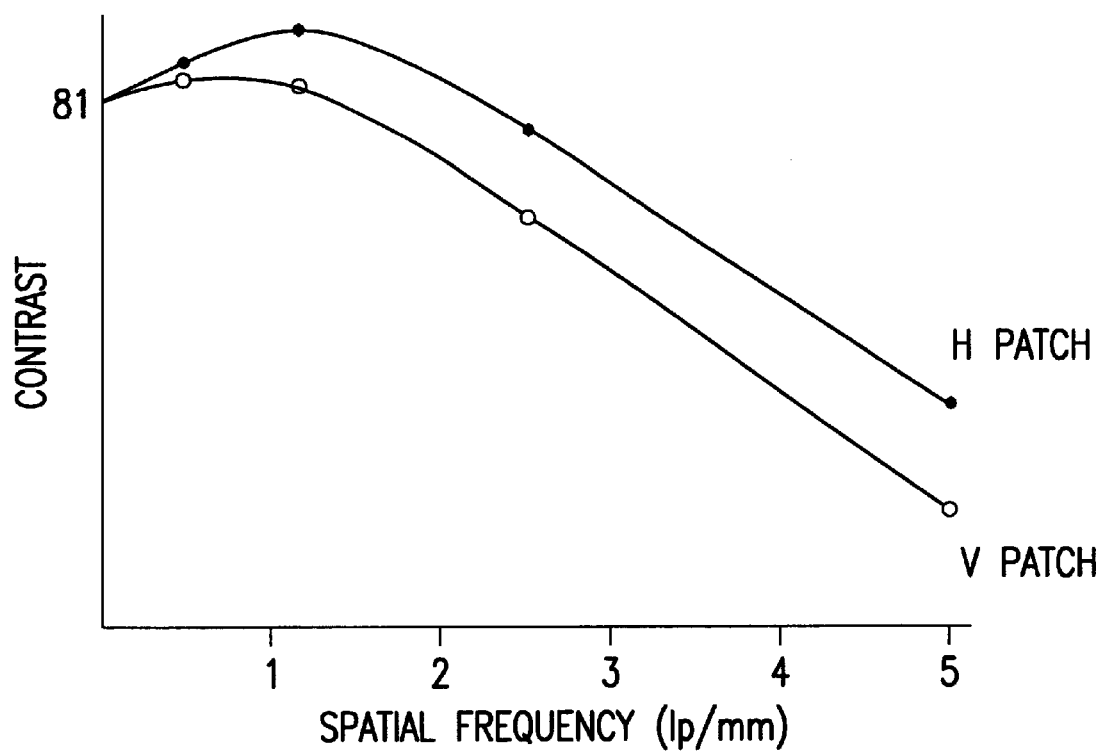
FIG. 31 is an illustration of period and spatial frequency examples of patch images V1.1–V1.8 and H1.1–H1.8 of the AC patch images provided from the test pattern image in the second example of the spatial frequency processing section.
FIG. 32 is a graph to show contrast value examples provided from the test pattern image in the second example of the spatial frequency processing section.

FIG. 31 is an illustration of period and spatial frequency examples of the patch images V1.1–V1.8 and H1.1–H1.8 of the AC patch images provided from the test pattern image in the second example of the spatial frequency processing section. FIG. 32 is a graph to show contrast value examples provided from the test pattern image in the second example of the spatial frequency processing section. FIG. 31 shows the period of stripes contained in each patch image in the AC patch image group calculated as described above by the length and the number of data pieces, the calculated spatial frequency, and the used window area size by the number of data pieces. FIG. 32 shows an example of the relationship between the spatial frequency and the contrast calculated for each patch image. In FIG. 32, the black dots indicate the relationship between the spatial frequency and the contrast in each patch image of H1.1–H1.8 and the white dots indicate the relationship between the spatial frequency and the contrast in each patch image of V1.1–V1.8.

FIGS. 31 and 32 list the periods, the spatial frequencies, contrasts, etc., for the patch images V1.1–V1.8 and H1.1–H1.8 in the AC patch image group. However, likewise, the contrast is also calculated for each of other patch images in the AC patch image group.

In the spatial frequency processing coefficient determination process 160, a spatial frequency transfer characteristic of the output device is found from the relationship between the contrast value of the data of each patch image in the AC patch image group of the test pattern image data and the contrast value of the test pattern image corresponding thereto, and the processing coefficients in the spatial frequency processing section 12 for correcting the spatial frequency transfer characteristic are calculated.

At step S161, the input/output correspondence characteristic of the output device is calculated. Although the spatial frequency transfer characteristic of the output device may be found for determining the target spatial frequency transfer characteristic of the correction processing system as described above, here an example of determining the target spatial frequency transfer characteristic of the correction processing system from the input/output contrast characteristic of the output device is given.

Figure 33:
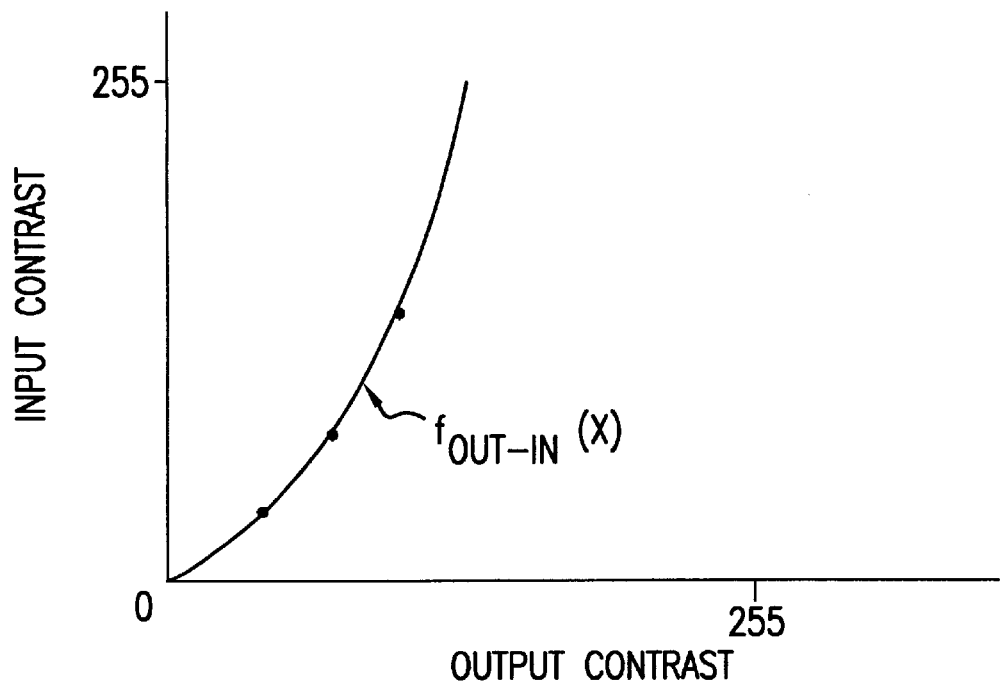
FIG. 33 is a graph to show an example of the relationship between input and output contrasts in an output device.

FIG. 33 is a graph to show an example of the relationship between input and output contrasts in the output device. For example, DC and spatial frequency are fixed and relating of input and output contrasts to each other is considered for AC components indicating the contrasts. For example, if the AC patch images H1.1 (input signal contrast value=±40.5), H2.1 (input signal contrast value=±20.4), and H3.1 (input signal contrast value=±81.5) having horizontal stripes and tone spatial frequency=5 lp/mm with DC=128 in the AC patch image group are used, relationship fout-in (X) shown in FIG. 33 is provided as an example. Such relationship fout-in (X) is found for each combination of DC components (=64, 128, 192) and spatial frequencies (=5, 2.5, 1.25, 0.625).

Next, at step S162, the target spatial frequency transfer characteristic for correcting the spatial frequency transfer characteristic of the output device under each AC and DC component combination condition is determined. The target spatial frequency transfer characteristic under each of nine combination conditions of AC and DC components contained in the AC patch image group is calculated from the relationship between the input and output contrasts, fout-in (X), when DC and spatial frequency are determined, as shown in FIG. 33.

As shown in FIG. 2, spatial frequency processing with spatial frequency transfer rate F1 is performed for the image data input to the process operation section 1 by the spatial frequency processing section 12, then the resultant data is sent to the output section 2 and undergoes an image formation process with spatial frequency transfer rate F2 and an output image is prepared. Therefore, assuming that the spatial frequency component that the input image data has is S1 and that the spatial frequency component that the output image has is S2, S2=S1×F1×F2.

To provide the same sharpness independently of the output devices, the spatial frequency transfer rate F1 in the spatial frequency processing section 12 may be a transfer rate for correcting the spatial frequency transfer rate F2 of the image formation process, as described above. That is, the processing coefficients set in the spatial frequency processing section 12 may be designed so that the spatial frequency transfer rate F1 in the spatial frequency processing section 12 becomes equal to 1/F2.

If the relationship between the input and output contrasts, fout-in (X), is used, the input contrast value required for providing output contrast ±40.5, for example, can be found. Assume that the found input contrast value is ±D1. Since the AC patch image H1.1 is a patch image with DC=128, signal contrast value=±40.5, and spatial frequency=5 lp/mm, the AC component may be previously multiplied by D1/40.5 to output the AC patch image independently of the effect of the output device characteristics. The D1/40.5 is the target spatial frequency transfer characteristic of the correction system at DC=128, input contrast=±40.5, and spatial frequency=5 lp/mm. Likewise, the required input signal contrast values D2–D4 to produce output signal-contrast value ±40.5 are also found from the relationship fout-in (X) at DC=128, spatial frequency=2.5 lp/mm, 1.25 lp/mm, 0.625 lp/mm.

Figure 34:
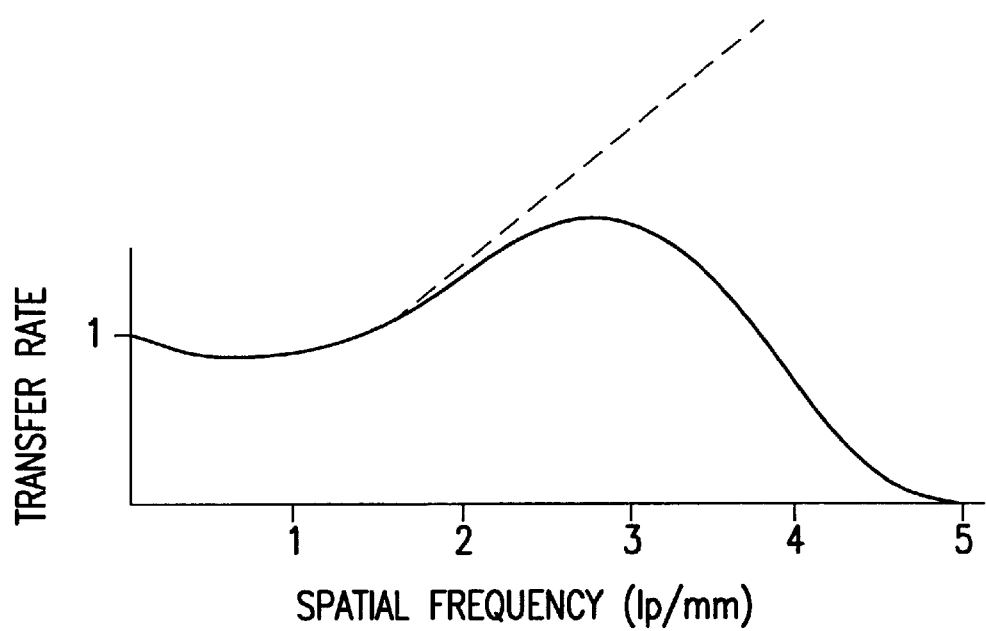
FIG. 34 is a graph to show an example of the spatial frequency transfer rates in the second example of the spatial frequency processing section designed based on the spatial frequency transfer characteristic found from each patch image in the AC patch image group.

FIG. 34 is a graph to show an example of the spatial frequency transfer rates in the second example of the spatial frequency processing section designed based on the spatial frequency transfer characteristic found from each patch image in the AC patch image group. When the values of Dn/40.5 at DC=128 and input contrast value=±40.5 found according to the above-described procedure are used as the transfer rates, which are related to the spatial frequencies on a graph, the relationship therebetween becomes as indicated by the broken line in FIG. 34, for example. This line indicates the target spatial frequency transfer characteristic in the vertical direction. As they are, noise is extremely emphasized in a high spatial frequency band. To suppress emphasis of the noise component, a color printer having a resolution of 10 dots/mm is set so that the transfer rate becomes 0 at 5 lp/mm, the Nyquist frequency. A graph of the spatial frequency transfer characteristic of the correction system thus actually designed is indicated by the solid line in FIG. 34.

Figure 35:
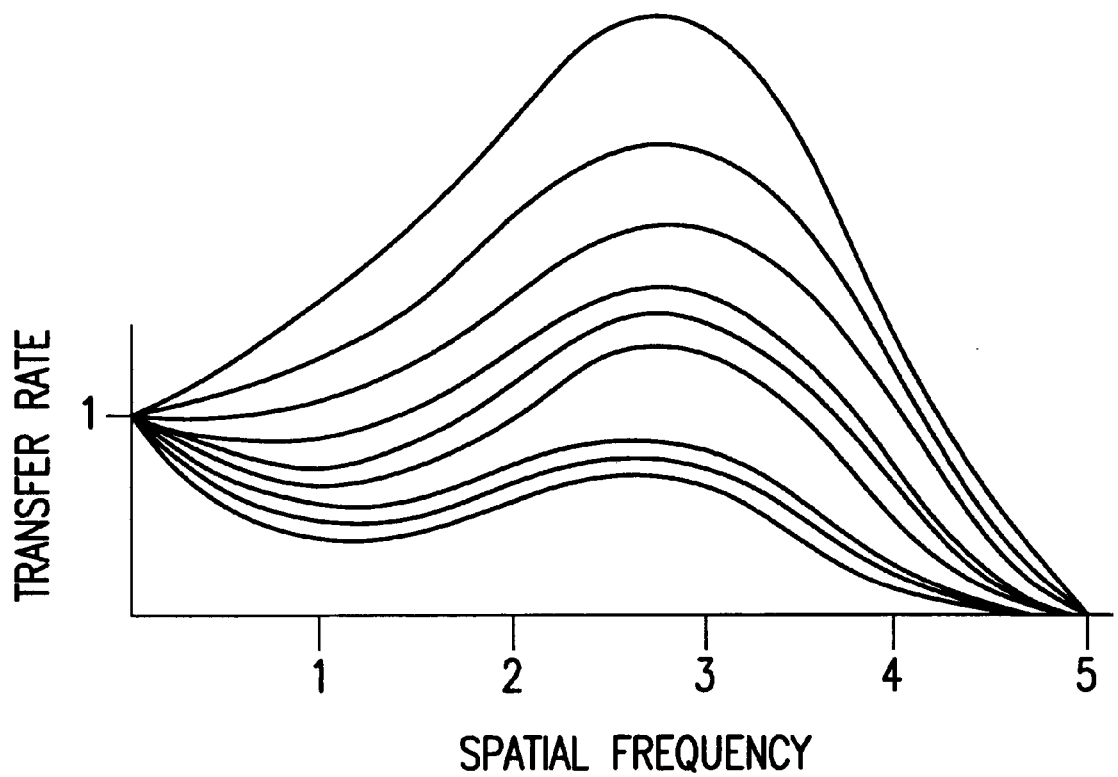
FIG. 35 is a graph to show target spatial frequency transfer characteristic examples in the vertical direction calculated in the second example of the spatial frequency processing section.

We have described how to find the design value of the target spatial frequency transfer characteristic in the vertical direction at DC=128 and input contrast value=±40.5. Likewise, the design value of the target spatial frequency transfer characteristic is also calculated at input contrast values=±20.5 and ±81.5. Likewise, the design value of the target spatial frequency transfer characteristic in the horizontal direction is also calculated. Further, the spatial frequency transfer characteristic of the correction system as shown in FIG. 34 is also calculated for each input contrast value at DC=64 and 192. FIG. 35 is a graph to show target spatial frequency transfer characteristic examples in the vertical direction calculated in the second example of the spatial frequency processing section. Each line in the figure represents the design value of the target spatial frequency transfer characteristic under a specific AC and DC component combination condition. Such processing is performed separately in the vertical and horizontal directions.

In the example, when an input contrast value found from fout-in (X) as shown in FIG. 33 is used, if the DC component value is large or small and the input contrast value is large, the maximum value of image signal may become an extremely large or small value or a minimum value. Generally, the range of the input signal values accepted at the output section 2 is limited. For example, for an 8-bit input printer, the input signal values are limited to integer values ranging from 0 to 255 and other input signal values cannot be input to the output section 2. If the input signal contains a value exceeding or falling below such a range, removal processing of improper values is performed at general printers, etc., before input. Truncation processing is performed as a widely used processing example. If truncation processing is performed, when the input signal value exceeds 255, it is set to 255; when the input signal value is minus, it is set to zero.

Figure 36A:
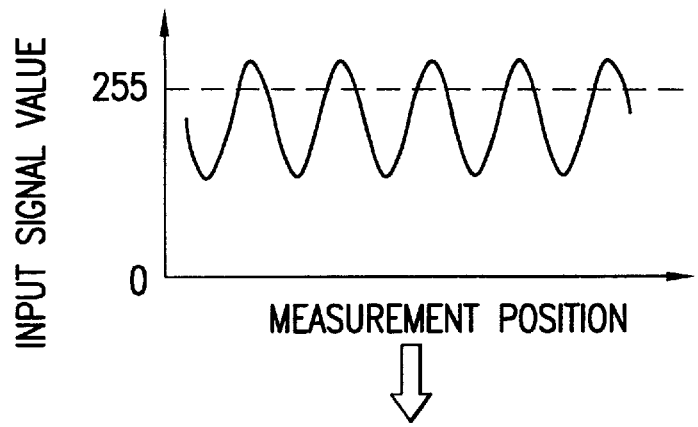
FIGS. 36A to 36C are illustration of an image output characteristic when input signal values exceed the limit range.
Figure 36B:
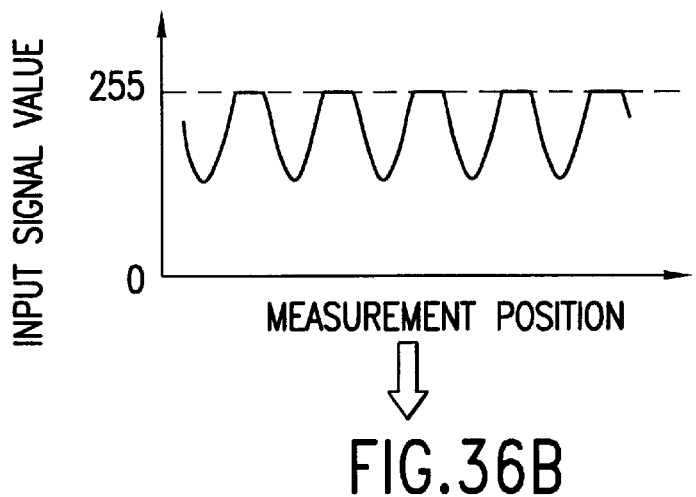
Figure 36C:
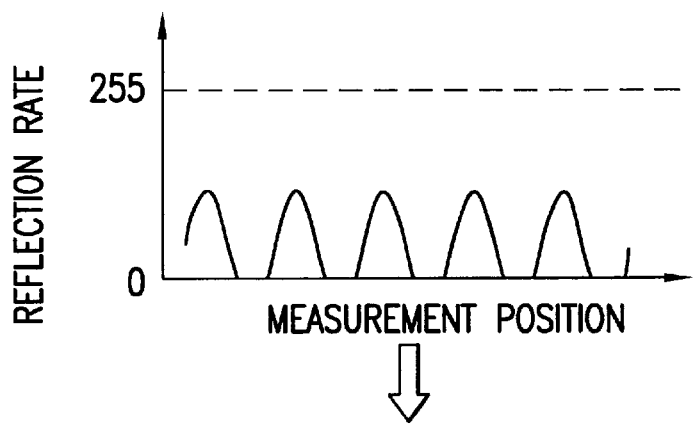
Figure 37A:
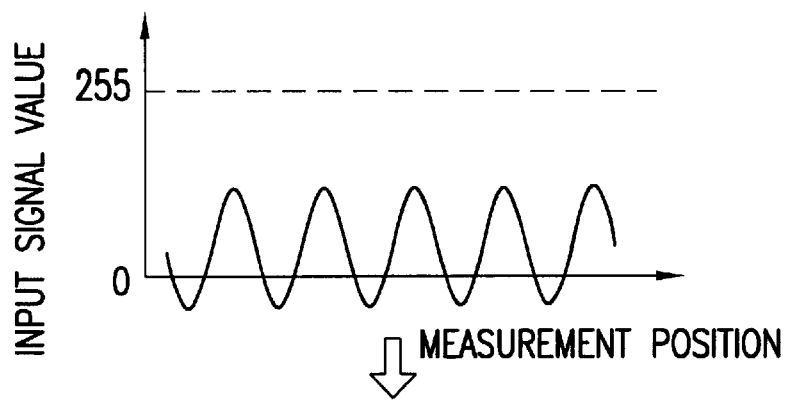
FIGS. 37A to 37C are illustration of an image output characteristic when input signal values fall below the limit range.
Figure 37B:
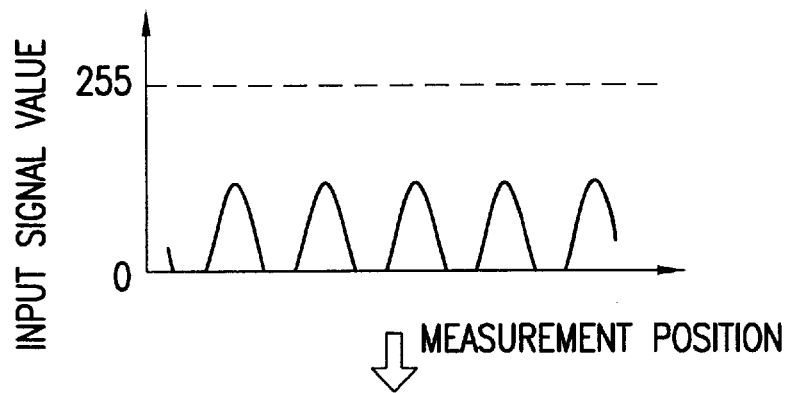
Figure 37C:
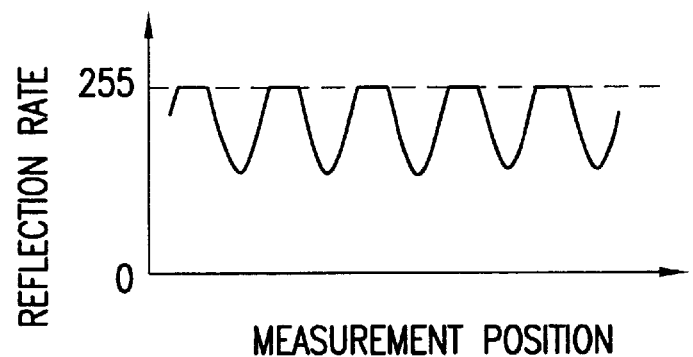

FIGS. 36A to 36C are illustration of an image output characteristic when the input signal values exceed the limit range. FIGS. 37A to 37C are illustration of an image output characteristic when the input signal values fall below the limit range. The figures assume that the input signal value limit range in the output section 2 is 0–255. For example, as shown in FIG. 36A, DC component and input contrast value are large and some input signal values exceed the limit range. If truncation processing, for example, is performed for the parts exceeding the limit range, the result becomes as shown in FIG. 36B and the resultant input signal values are fed into the output section 2, which then forms an image responsive to the input signal values as shown in FIG. 36B. The reflection rates of the formed image become as shown in FIG. 36C. Here, if the input signal value is large, the density becomes high, thus the reflection rate lowers. In the example, when the input signal value is 255, the reflection rate becomes 0.

Since the DC component is small and the input contrast value is large in the example shown in FIG. 37A, some input signal values fall below the limit range and become minus. If truncation processing is performed, the minus parts of the input signal values are converted into 0, as shown in FIG. 37B. The resultant input signal values as shown in FIG. 37B is fed into the output section 2 for forming an image. The reflection rates of the formed image become as shown in FIG. 37C.

As seen in FIGS. 36C and 37C, if input signal values contain parts exceeding or falling below the limit range of the output section 2, the reflection rate amplitude is limited and becomes small and a desired contrast is not provided in the actually output image. Further, the average value of local reflection rates of the output image also changes. This means that the colors of the output image differ from the colors expected from the input signals; such input signals are not appropriate.

Figure 38A:
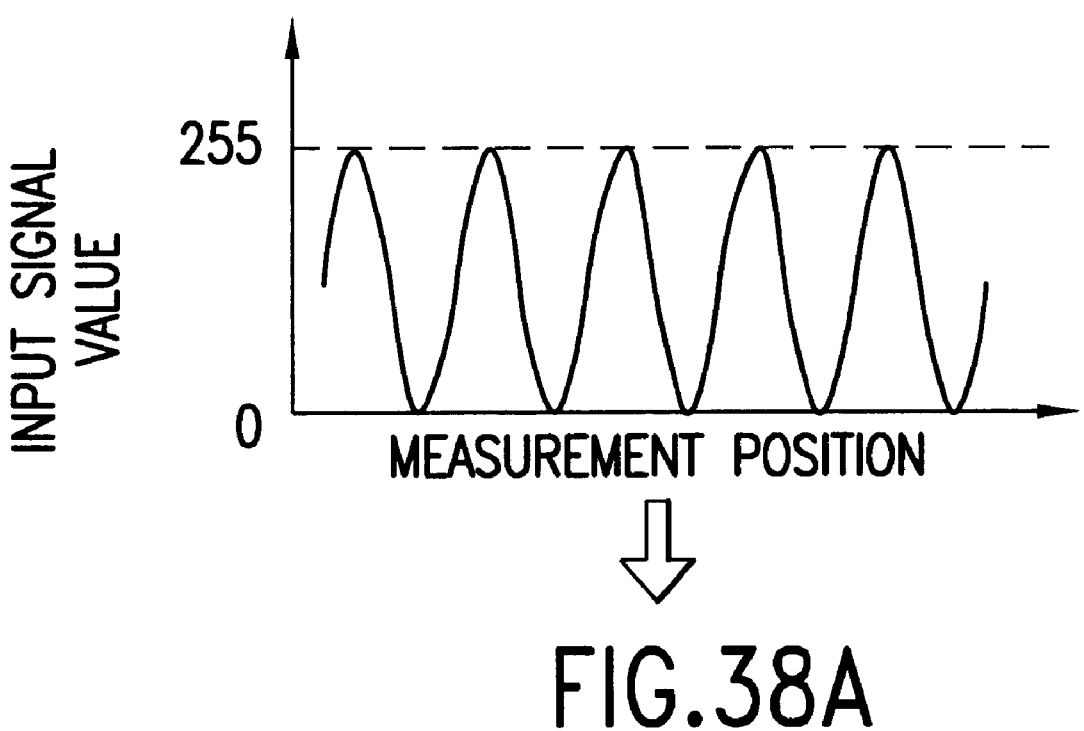
FIGS. 38A and 38B are illustration of an example wherein input signal values are not reflected on the reflection rates of an output image in an output section.
Figure 38B:
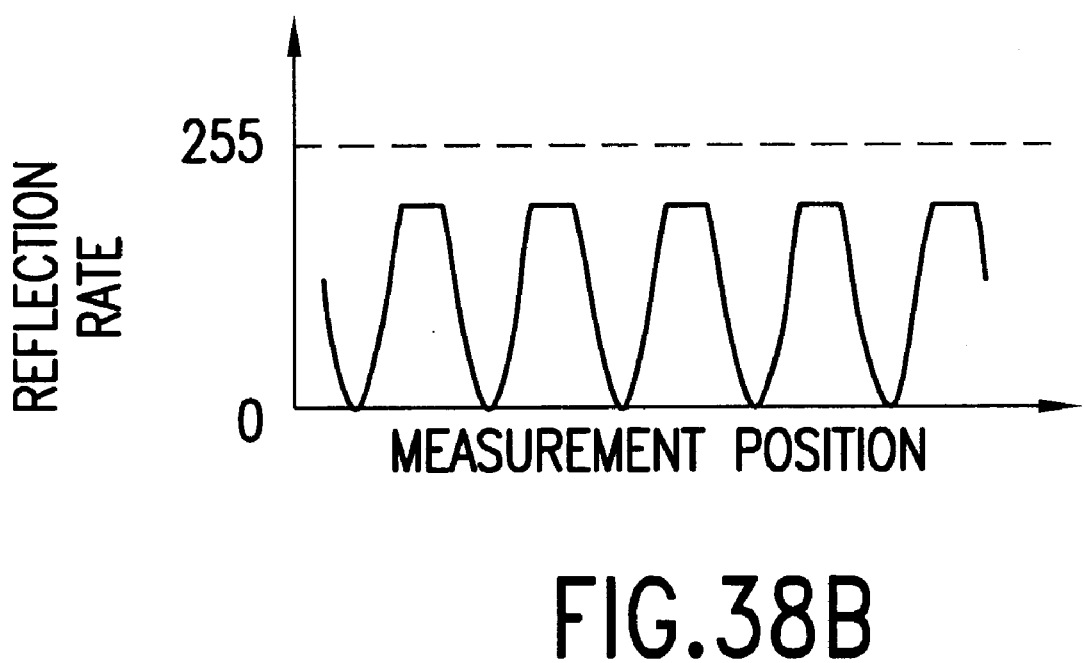

FIGS. 38A and 38B are illustration of an example wherein input signal values are not reflected on the reflection rates of an output image in the output section. In actual image output devices, a phenomenon may occur that a response to values close to the upper or lower limit of high-contrast, high-frequency input signals is not reflected on output. For example, when input signals in the permissible range as input signals as shown in FIG. 38A are fed into the output section 2, an image lighter than a given reflection rate cannot be output in pale color portions with small input signal and an image with the reflection rates as shown in FIG. 38B may be output. Such a phenomenon is observed on CRT displays, etc., for example. Particularly when high contrast is reproduced on the CRT display, it is acknowledged experimentally that the brightness of dark portions rises in contrast to FIG. 38B. Such a phenomenon is caused by the fact that the image output device cannot respond following high-contrast, high-frequency input signals. Such a phenomenon, like the phenomenon shown in FIGS. 36 and 37, changes the average value of the reflection rates of an output image, as shown in FIGS. 38A and 38B. Thus, the colors of the output image may differ from the expected colors. If such a phenomenon occurs, the range in which the input signals are reflected on output becomes the actual limit range.

Figure 39A:
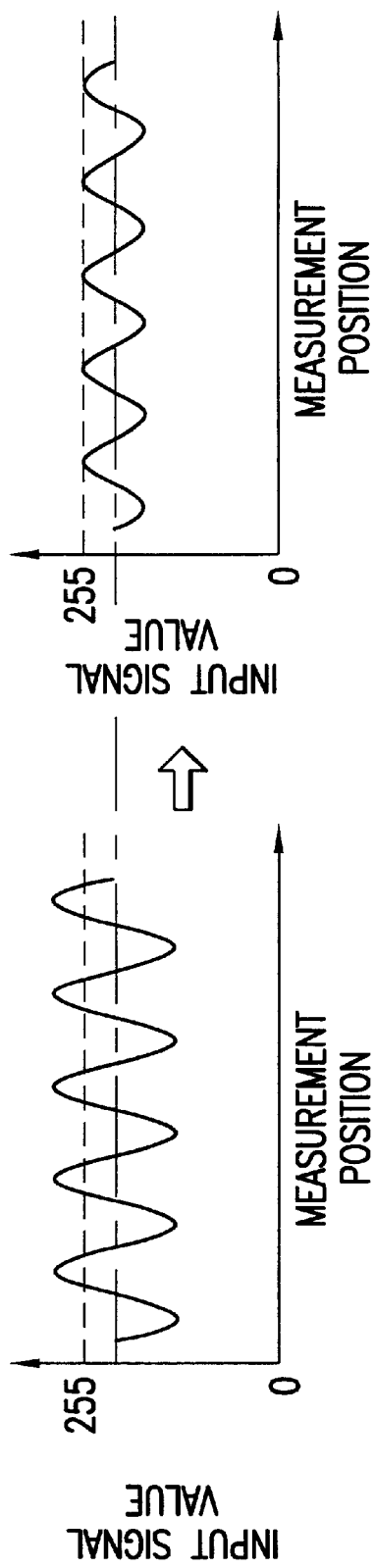
FIGS. 39A and 39B are conceptual diagrams of input signal value adjustment processing.
Figure 39B:
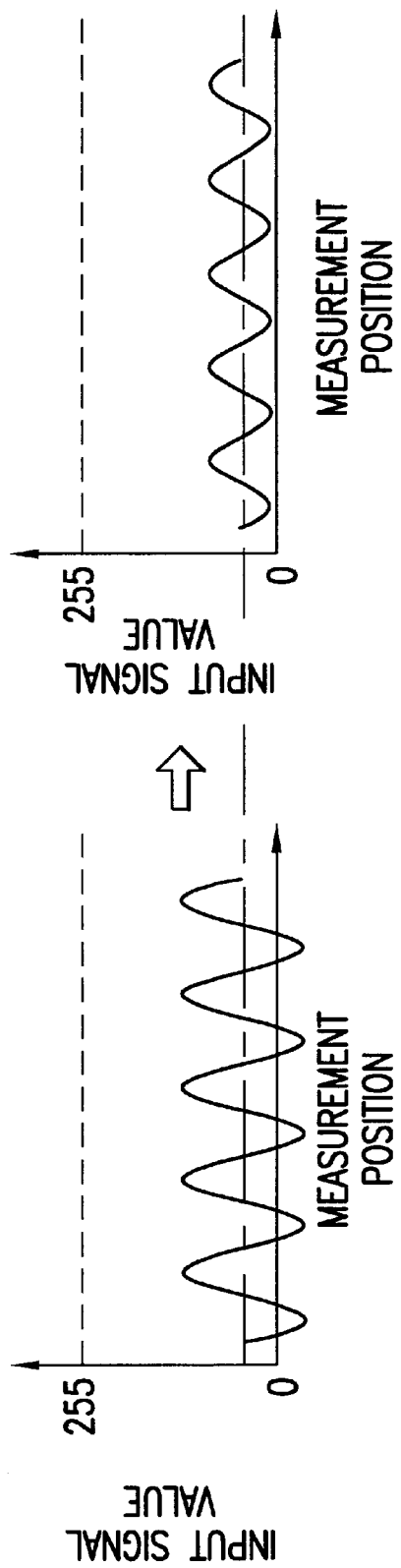

If the input signal values thus exceed or fall below the limit range, they need to be adjusted so that the reflection rate average value on the output image is maintained for preventing the output image colors from differing from the expected colors. FIGS. 39A and 39B are conceptual diagrams of input signal value adjustment processing. If the input signal values exceed the limit range, for example, as shown in FIG. 36A, the amplitude is changed so that the input signal values do not exceed the limit range and that the average value does not change, as shown in FIG. 39A. Likewise, if the input signal values fall below the limit range as shown in FIG. 37A, the amplitude may be changed so that the input signal values do not fall below the limit range and that the average value does not change, as shown in FIG. 39B. If input signal values that cannot be reflected on the output image exist as shown in FIG. 38A, the actual limit range may be considered for performing adjustment processing as shown in FIG. 39A or 39B. The embodiment assumes a color printer as the output section 2. However, such adjustment processing is performed, whereby image colors can be matched and sharpness can be held even for image display devices such as CRT displays and liquid crystal displays.

Figure 40:
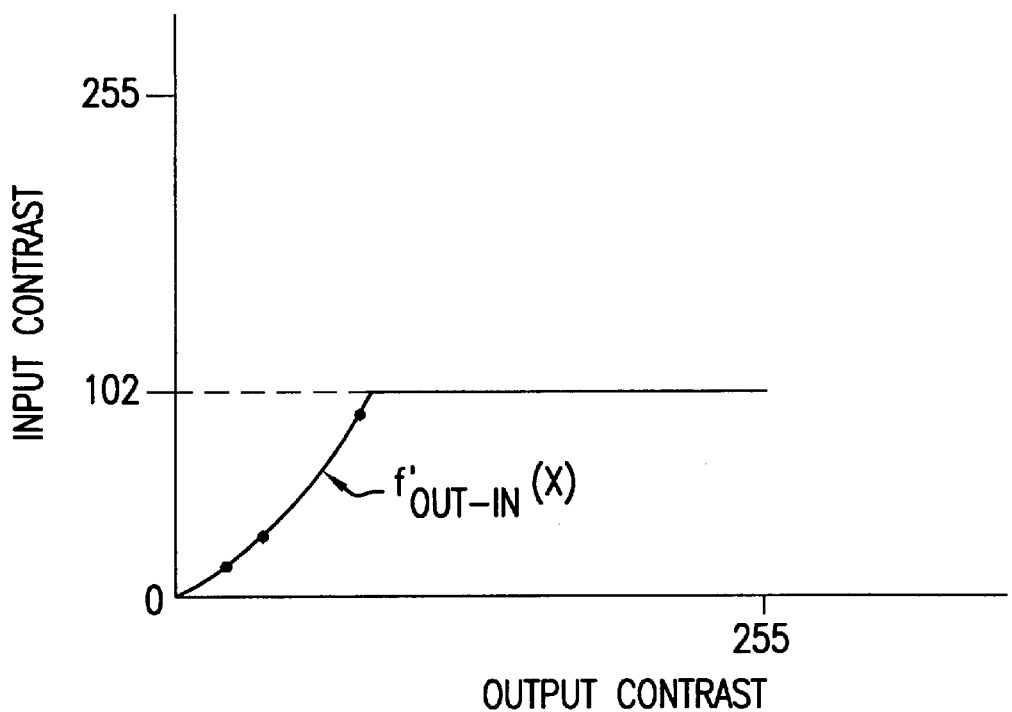
FIG. 40 is a graph to show an example of the relationship between input and output contrasts considering the input signal value limit range.

FIG. 40 is a graph to show an example of the relationship between input and output contrasts considering the input signal value limit range. As an example, the graph fout-in (X) indicating the relationship between input and output contrasts shown in FIG. 33 is corrected also considering the actual limit range in the output section 2. FIG. 33 assumes that the DC component value and the spatial frequency are constant (DC=128, spatial frequency=5 lp/mm). If the DC component value is made constant, when the amplitude, namely, contrast value is small, the input signal values fall within the limit range and therefore adjustment need not be made. However, if the contrast value becomes equal to or greater than one threshold value, some input signal values exceed or fall below the limit range. Thus, when the contrast value is equal to or greater than the threshold value, adjustment processing as shown in FIGS. 39A and 39B are performed for limiting the contrast value to a constant value. That is, if the output contrast value is made constant with the threshold value as a boundary in the adjustment processing, adjustment as shown in FIGS. 39A and 39B can be made. For example, f'out-in (X) shown in FIG. 40 is provided by performing such adjustment processing. If the f'out-in (X) is used to find an input contrast value from the output contrast value, the found input contrast value falls within the range from 0 to the threshold value.

Figure 41:
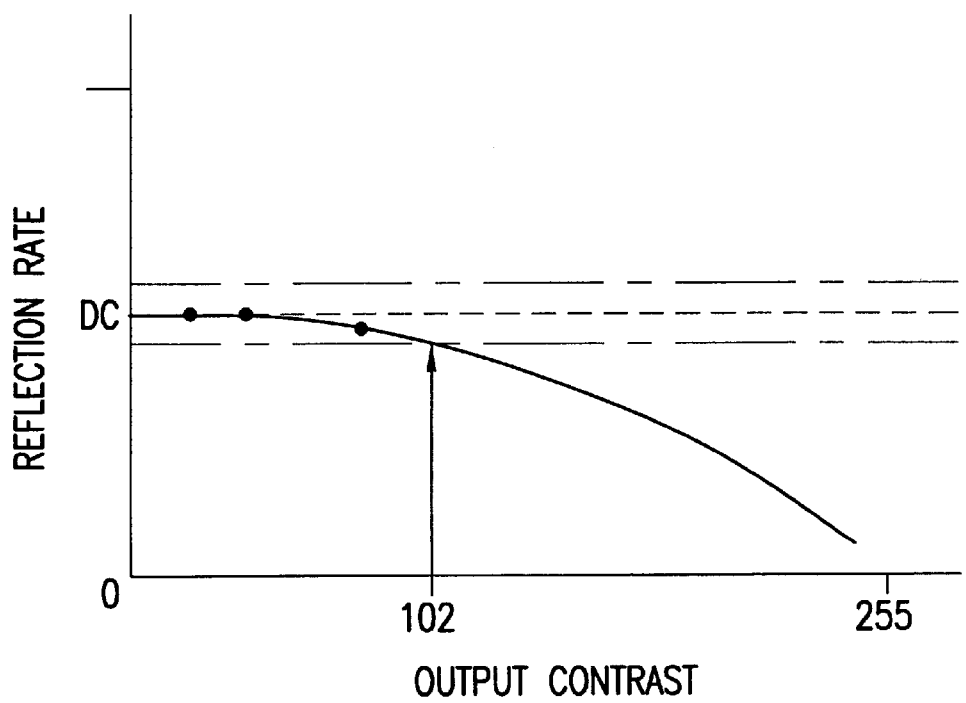
FIG. 41 is a graph to show an example of the actual average reflection rate of an output image with respect to input signal contrast values.

Next, an example of a method of finding the threshold value will be described. FIG. 41 is a graph to show an example of the actual average reflection rate of an output image with respect to input signal contrast values. In the figure, the broken line indicates the target average reflection rate; here, the line represents the average reflection rate of patch images with DC=128 measured at step S152 as an example. The alternate long and short dash line represents a 5% shift from the desired average reflection rate. A graph as shown in FIG. 41 is provided by plotting the average reflection rates of the images resulting from shaping the measurement data images of the AC patch images H1.1, H2.1, and H3.1 with DC=128 and spatial frequency=5 lp/mm found at step S154.

As the input contrast is increased, some input signals exceed or fall below the limit range and the desired average reflection rate changes, as described above. In the example shown in FIG. 41, when the input contrast increases, the average reflection rate lowers and an average tint changes. When the input contrast is 102, a 5% shift is made from the desired average reflection rate. If a shift is made exceeding the percentage, adjustment processing should be performed to prevent the average tint from furthermore changing. That is, the input contrast value may be used as a threshold value to correct the above-described fin-out (X). In FIG. 40, input contrast value=102 found from FIG. 41 is used as the threshold value to correct fin-out (X) shown in FIG. 33 for providing f'in-out (X). In the example, adjustment processing is performed so that the average reflection rate does not shift exceeding 5%, but the shift amount can be set as desired.

The relationship between the input and output contrasts when DC=128 and spatial frequency=5 lp/mm shown in FIG. 33, fin-out (X), is thus corrected so that the input contrast does not exceed the threshold value (=102), providing the relationship f'in-out (X). Likewise, the corrected relationship f'in-out (X) is found for each combination of DC components (=64, 128, and 192) and spatial frequencies (=5, 2.5, 1.25, and 0.625).

The target spatial frequency transfer characteristic in each AC component and each DC component may be calculated in a similar manner at step S162. For example, four relationships f'in-out (X) when spatial frequencies=5, 2.5, 1.25, and 0.625 with DC=64 are used, input contrast values D1–D4 when the output contrast is 40.5 are found from the graphs, and D1/40.5, D2/40.5, D3/40.5, and D4/40.5 may be used as the target spatial frequency transfer characteristics when DC=64 and signal contrast value ±40.5 as described above. When the target spatial frequency transfer characteristics for each spatial frequency thus found are graphed, a graph indicated by the broken line in FIG. 34 is produced if the limit range is not exceeded at all spatial frequencies.

If the contrast value is large, the adjustment processing has the effect. In the example, the pixel values of each AC patch image are designed to fall within the range of 0–255 as shown in FIGS. 26 and 27. However, for example, when DC=64 and signal contrast value=±81.5 or when DC=192 and signal contrast value=±81.5, the input signal values may exceed or fall below the limit range depending on the characteristics and specifications of the output section 2. The target spatial frequency transfer characteristic in a combination of DC component, signal contrast value, and spatial frequency where the input signal values may exceed or fall below the limit range becomes (threshold value/signal contrast value) because the input contrast value D found from the relationship f'in-out (X) becomes the threshold value found as shown in FIG. 41. As seen in comparison between the relationship fin-out (X) shown in FIG. 33 and the relationship f'in-out (X) shown in FIG. 40, if adjustment processing is performed, the input contrast value D obtained from the output contrast value lessens, thus the target spatial frequency transfer characteristic value also lessens.

Figure 42:
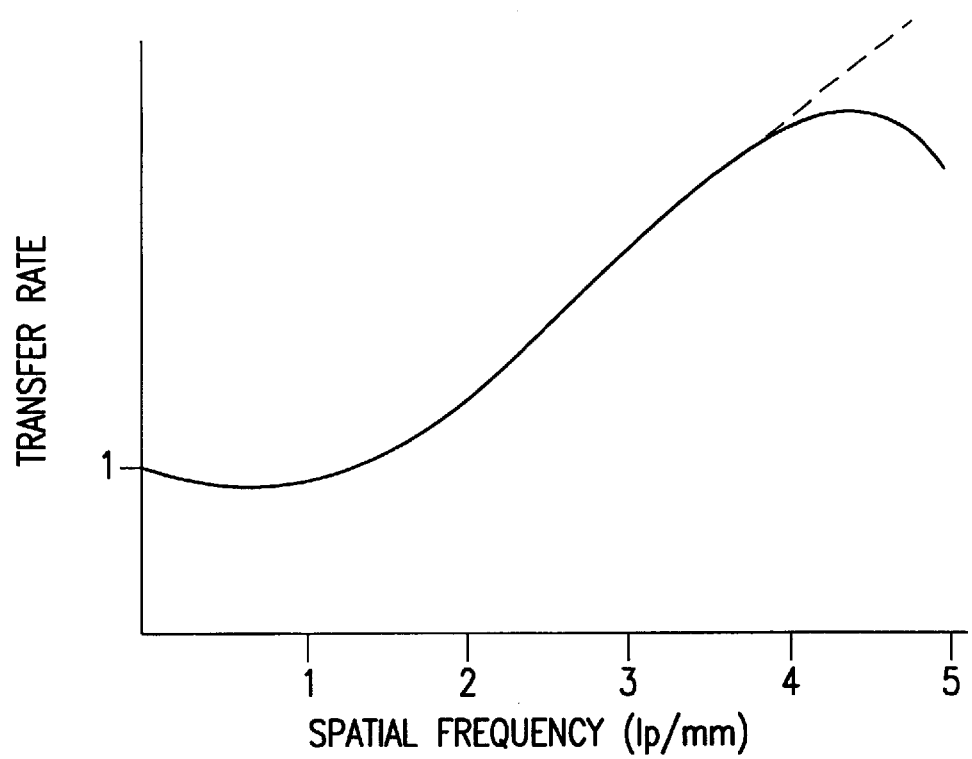
FIG. 42 is a graph to show another example of the spatial frequency transfer rates in the second example of the spatial frequency processing section.

FIG. 42 is a graph to show another example of the spatial frequency transfer rates in the second example of the spatial frequency processing section. In the figure, the broken line indicates the target spatial frequency transfer characteristic found using the relationship fin-out (X) between input and output contrast values not subjected to adjustment processing. The example shown in FIG. 42 assumes a case where as the spatial frequency becomes higher, a response to input signal values become hard to be reflected on output, and indicates use of the portions subjected to adjustment processing in the relationship f'in-out (X) when the spatial frequency is 5 lp/mm. As shown in FIG. 42, the relationship f'in-out (X) subjected to adjustment processing is used, whereby the spatial frequency characteristic value is suppressed in the portions subjected to adjustment processing. Thus, the spatial frequency characteristic does not disperse in the high spatial frequency portions and settles on a reasonable value.

In the target spatial frequency transfer characteristic indicated by the broken line in FIG. 34, noise is extremely emphasized in a high spatial frequency band, as described above. Thus, the target spatial frequency transfer characteristic is corrected to that as indicated by the solid line in FIG. 34. A similar correction may also be made for the target spatial frequency transfer characteristic, for example, as shown in FIG. 42, provided using the relationship f'in-out (X) subjected to adjustment processing. If the relationship f'in-out (X) subjected to adjustment processing is used, as shown in FIG. 42, the spatial frequency transfer rate in the high spatial frequency band lessens, so that noise is not extremely emphasized. Thus, the target spatial frequency transfer characteristic as shown in FIG. 42 may be used intact; correction processing of the target spatial frequency transfer characteristic can be omitted for speeding up the operation.

Such a target spatial frequency transfer characteristic is found for each DC and AC component combination and is furthermore found in vertical and horizontal directions. The description to follow assumes, as an example, that the target spatial frequency transfer characteristic has been corrected as indicated by the solid line in FIG. 34 and has been found for each DC and AC component combination and has been is furthermore found in vertical and horizontal directions, as shown in FIG. 35.

To realize the spatial frequency transfer characteristics of the spatial frequency processing section 12 thus designed, the processing coefficients of spatial frequency processing are calculated at steps S163, S164, and S165. To use the configuration shown in FIG. 22, for example, as the spatial frequency processing section 12, the filter coefficient of the basic correction section 111 is determined at step S163 and the filter coefficient of the auxiliary correction section 112 is determined at step S164. The conversion table of the two-dimensional look-up table 133 in FIG. 23 is determined at step S165.

At step S163, first the spatial frequency transfer characteristic of the basic correction section 111 is determined. It is provided by performing two-dimensional interpolation based on the average characteristics of the design values of the target spatial frequency transfer characteristics in the vertical and horizontal directions found from the AC patch images at step S162, for example. Next, inverse Fourier transform is applied to spatial frequency transfer characteristic of the basic correction section 111 and the inverse Fourier transform result is normalized so that the sum total becomes one, whereby the filter coefficient of the target spatial frequency transfer characteristic can be calculated. Various filter coefficient calculation methods are developed and any one of the methods may be used appropriately.

Figure 43:
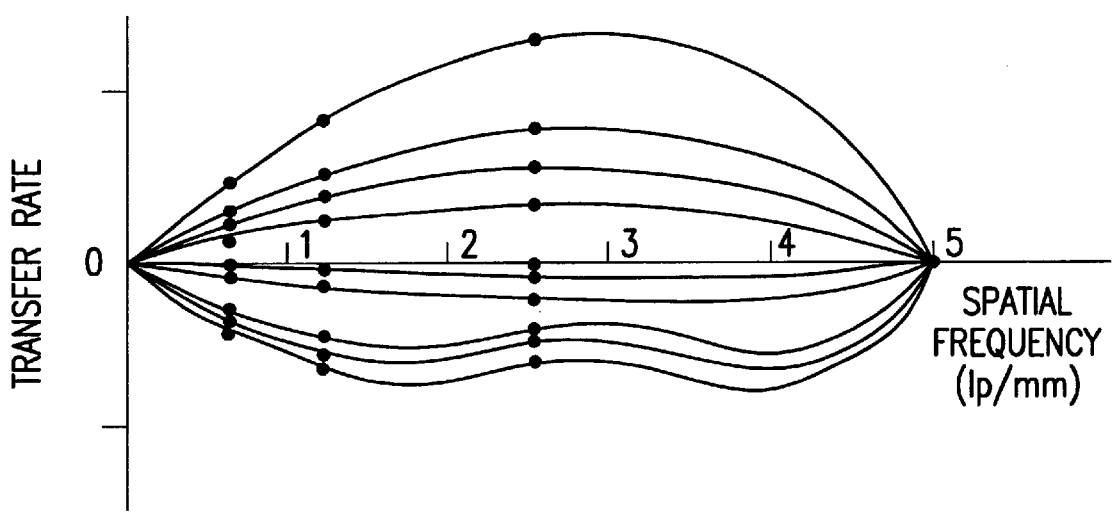
FIG. 43 is a graph to show an example of difference characteristics in the second example of the spatial frequency processing section.

At step S164, the spatial frequency transfer characteristic of the auxiliary correction section 112 is determined. First, the spatial frequency transfer characteristic of the basic correction section 111 set at step S163 is subtracted from the designed value of the spatial frequency transfer characteristic of the spatial frequency processing section 12 under each AC and DC component combination condition for calculating a difference characteristic under each AC and DC component combination condition. FIG. 43 is a graph to show an example of the difference characteristics in the second example of the spatial frequency processing section. For example, when the spatial frequency transfer characteristic of the basic correction section 111 set at step S163 is subtracted from the design values of the spatial frequency transfer characteristics in the vertical direction shown in FIG. 35 for finding a difference characteristic, the result becomes as shown in FIG. 43. Each black dot in the figure indicates a specific combination of AC and DC components and spatial frequency and corresponds to each patch image in the AC patch image group.

Figure 44:
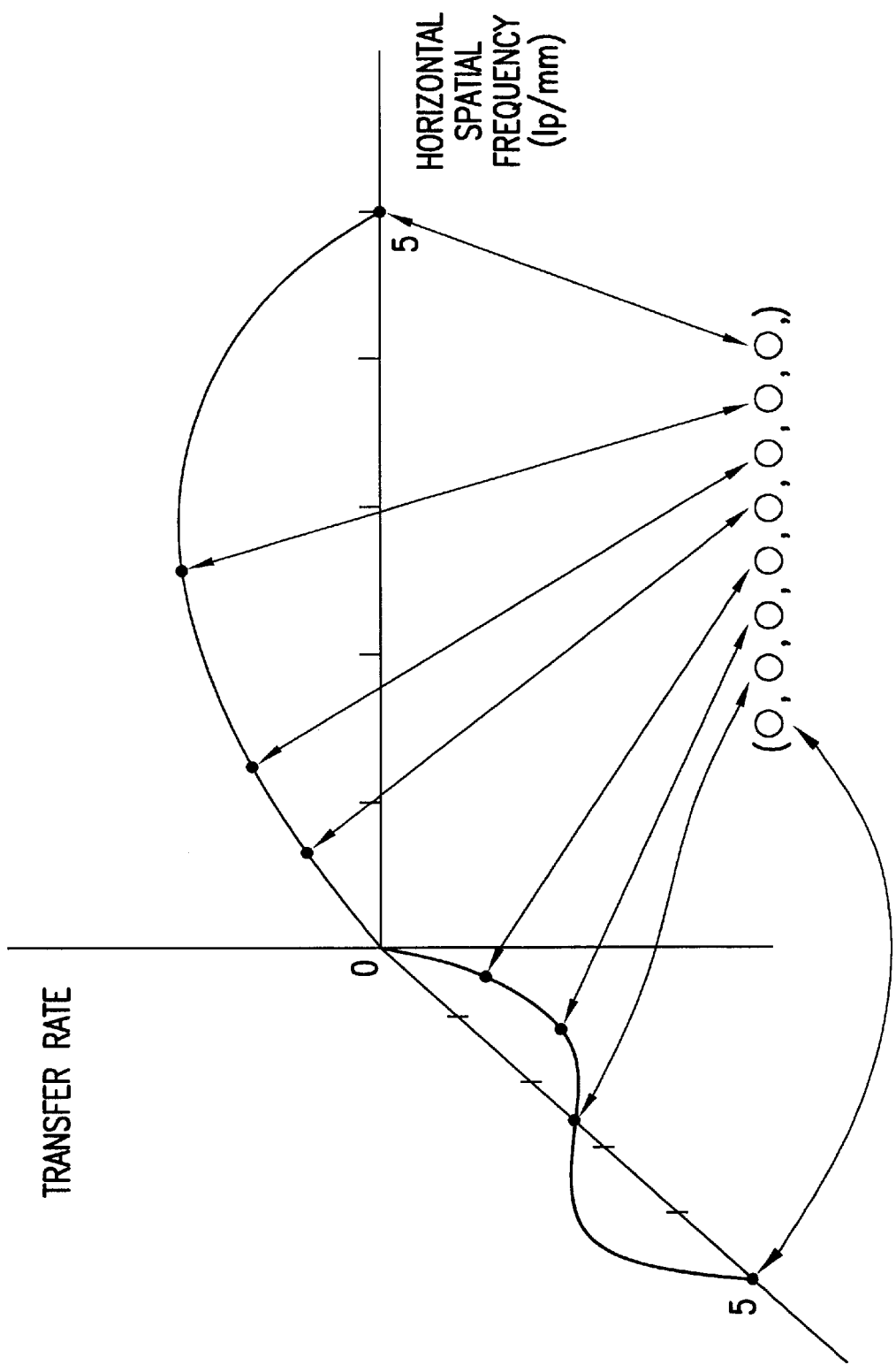
FIG. 44 is an illustration of the relationship between the spatial frequencies in the horizontal and vertical directions and the transfer rate.

One spatial frequency transfer characteristic representing the difference characteristics is found and the filter coefficient of the auxiliary correction section 112 is determined based on the found spatial frequency transfer characteristic. FIG. 44 is an illustration of the relationship between the spatial frequencies in the horizontal and vertical directions and the transfer rate. The target spatial frequency transfer characteristics when the spatial frequencies in the horizontal direction are 0.625, 1.25, 2.5, and 5 lp/mm and the spatial frequencies in the vertical direction are 0.625, 1.25, 2.5, and 5 lp/mm under each AC and DC component combination condition appear as curves on the vertical and horizontal spatial frequency axes in FIG. 44. With the values on the curves as dimensions, the spatial frequency transfer characteristic can be represented as one point in eight-dimensional space as shown in FIG. 44. In the example, nine points in the eight-dimensional space are found under each AC and DC component combination condition. At the time, a multiplication by a visual transfer function (VTF) of a human being may be executed for weighting in response to the spatial frequency. If the relationship in FIG. 44 is used, expansion to the spatial frequency transfer characteristic at horizontal spatial frequency 0.625, 1.25, 2.5, 5 lp/mm and vertical spatial frequency 0.625, 1.25, 2.5, 5 lp/mm can also be executed from one point in the eight-dimensional space.

Next, a line passing through the nearest points to the nine points in the eight-dimensional space found under each AC and DC component combination condition and passing through the origin is calculated. The line passing through the nearest points to the eight points refers to a line with the smallest sum of squares of the distance between each point and the line. A solution to the problem can be found by solving an equation. For example, a steepest descent method may be used to execute iterative calculation for finding a solution. A direction vector provided by normalizing the length of the found line to one is assumed to be one point in the eight-dimensional space and the relationship shown in FIG. 44 is used to expand to the spatial frequency transfer characteristics when the spatial frequencies in the horizontal and vertical directions are 0.625, 1.25, 2.5, and 5 lp/mm. The spatial frequency transfer characteristics thus found from the direction vector of the line undergo two-dimensional plane interpolation and inverse Fourier transform and the result is used as the filter coefficient of the auxiliary correction section 112.

However, the two-dimensional plane interpolation is executed with the spatial frequency transfer characteristics at horizontal and vertical spatial frequencies=0 as 0.

Figure 45:
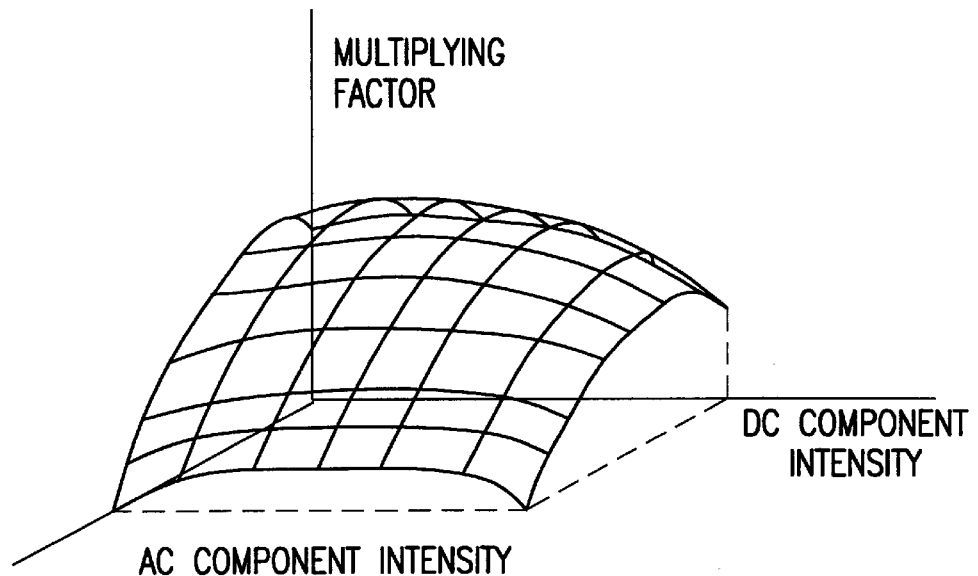
FIG. 45 is a graph to show a multiplying factor example under each condition for the spatial frequency transfer characteristic of the auxiliary correction section in the second example of the spatial frequency processing section.

At step S165, the spatial frequency transfer characteristic of the auxiliary correction section 112 calculated at step S164 is multiplied by a constant for approaching to the difference between the design value of the spatial frequency transfer characteristic of the spatial frequency processing section 12 under each AC and DC component combination condition and the spatial frequency transfer characteristic of the basic correction section 111 set at step S163. The word "nearest" means minimizing the sum of squares of the difference therebetween. The multiplying factor of the spatial frequency transfer characteristic of the auxiliary correction section 112 is found under each condition and further plane interpolation is executed. FIG. 45 is a graph to show a multiplying factor example under each condition for the spatial frequency transfer characteristic of the auxiliary correction section in the second example of the spatial frequency processing section. When the multiplying factor of the spatial frequency transfer characteristic of the auxiliary correction section 112 is found under each condition and plane interpolation is executed as described above and a three-dimensional graph with AC and DC components as axes is prepared, the result becomes as shown in FIG. 45. This three-dimensional graph may be used as the conversion table of the two-dimensional look-up table 133.

The filter coefficients of the basic correction section 111 and the auxiliary correction section 112 and the conversion table of the two-dimensional look-up table 133 are thus provided. The coefficients are set and spatial frequency processing is performed in the spatial frequency processing section 12. In the spatial frequency processing section 12, an AC component of the input image signal 121 is found by the AC component extractor 131 and a DC component is found by the DC component extractor 132. The two-dimensional look-up table 133 into which the graph shown in FIG. 45 is converted is subtracted from the found AC and DC components for producing a multiplying factor, namely, the auxiliary correction amplification rate signal 124. The auxiliary correction basic signal 123 provided by filtering of the auxiliary correction section 112 is multiplied by the auxiliary correction amplification rate signal 124, thereby generating the auxiliary correction signal 125. If only the vertical direction, for example, determined by the AC and DC components of the input image signal 121 is taken, the auxiliary correction signal 125 represents the correction amount according to an auxiliary characteristic close to the difference characteristic as shown in FIG. 43. The correction amount is added to the basic correction signal 122 by the addition section 115, generating the output image signal 126 after the correction. The spatial frequency processing is thus performed according to the processing coefficients set in response to the-output section 2, whereby an output image having a spatial frequency characteristic independent of the characteristics of the output section 2 can be provided.

Figure 46:
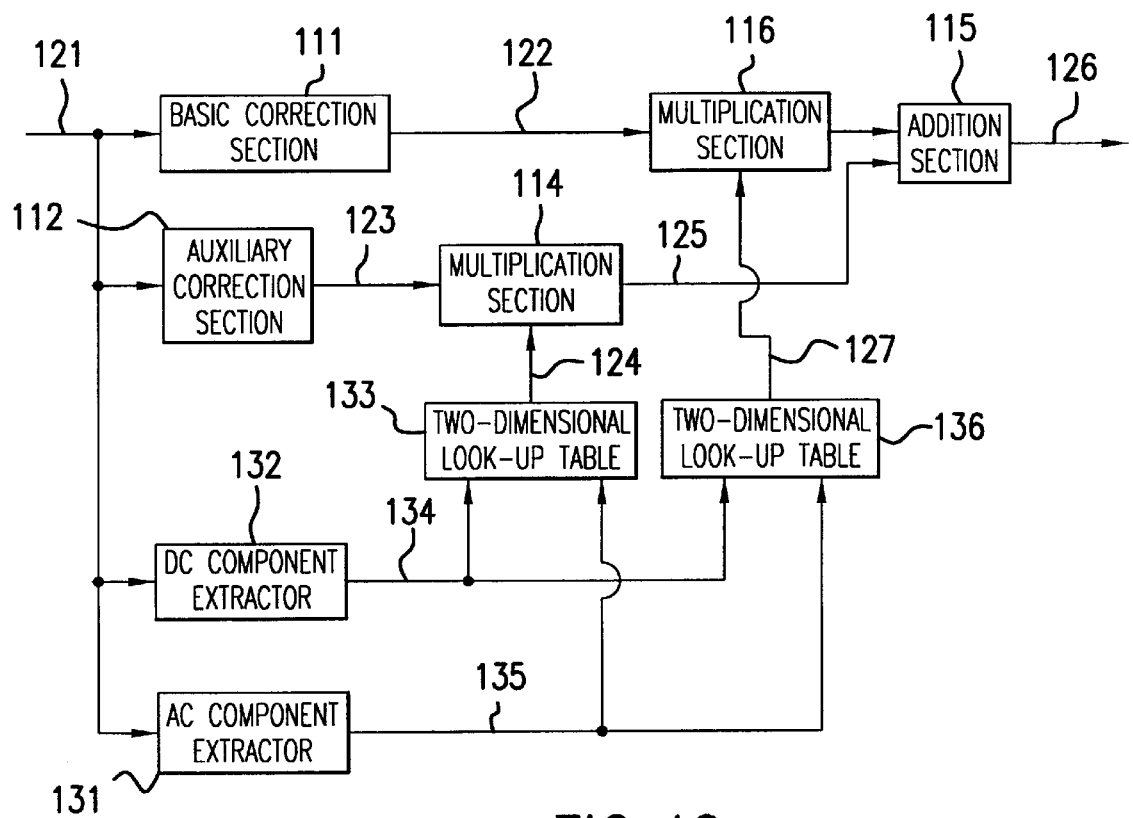
FIG. 46 is a block diagram to show a third configuration example of the spatial frequency processing section.

FIG. 46 is a block diagram to show a third configuration example of the spatial frequency processing section. Parts similar to those previously described with reference to FIGS. 22 and 23 are denoted by the same reference numerals in FIG. 46 and will not be described again. In FIG. 46, numeral 116 is a multiplication section, numeral 127 is a basic correction amplification rate signal, and numeral 136 is a two-dimensional look-up table. In the example, a basic correction signal 122 is also multiplied by an amplification rate.

The two-dimensional look-up table 136, which is a table like a two-dimensional look-up table 133, receives an AC component signal 135 input from a DC component extractor 132 and a DC component signal 134 input from an AC component extractor 131, generates the basic correction amount amplification rate signal 127, and outputs the signal to the multiplication section 116. The multiplication section 116 multiplies the basic correction signal 122 output from the basic correction section 11 by an amplification rate given by the basic correction amplification rate signal 127 output from the two-dimensional look-up table 136 and outputs the result. The addition section 115 adds the basic correction signal 122 multiplied by the amplification rate, output from the multiplication section 116 and an auxiliary correction signal 125 output from a multiplication section 114 together and outputs an output image signal 126.

Here, the two-dimensional look-up table 136 needs to be newly set. To find the filter coefficient of the basic correction section 111 from the design values of the target spatial frequency transfer characteristics, for example, as shown in FIG. 35 in the second example of the spatial frequency processing section, for example, a least square method, etc., is used to calculate the characteristic best representing the design values of the target spatial frequency transfer characteristics under all conditions and its multiplying factor. Based on the calculated characteristic, the filter coefficient of the basic correction section 111 is determined as described above. Proper interpolation processing, etc., is performed for the multiplying factor calculated for each condition and the result may be set in the two-dimensional look-up table 136.

To determine the filter coefficient of the auxiliary correction section 112, the spatial frequency characteristic of the basic correction section 111 multiplied by the multiplying factor for each condition set in the two-dimensional look-up table 136 as described above is subtracted from the design value of the target spatial frequency transfer characteristic under each AC and DC component combination condition, thereby producing a difference characteristic. Processing of determining the filter coefficient of the auxiliary correction section 112 and the contents of the two-dimensional look-up table 133 from the difference characteristic is similar to that in the second example of the spatial frequency processing section.

Thus, the basic correction signal 122 is also multiplied by an amplification rate, whereby further improvement in the correction precision can be expected.

Figure 47:
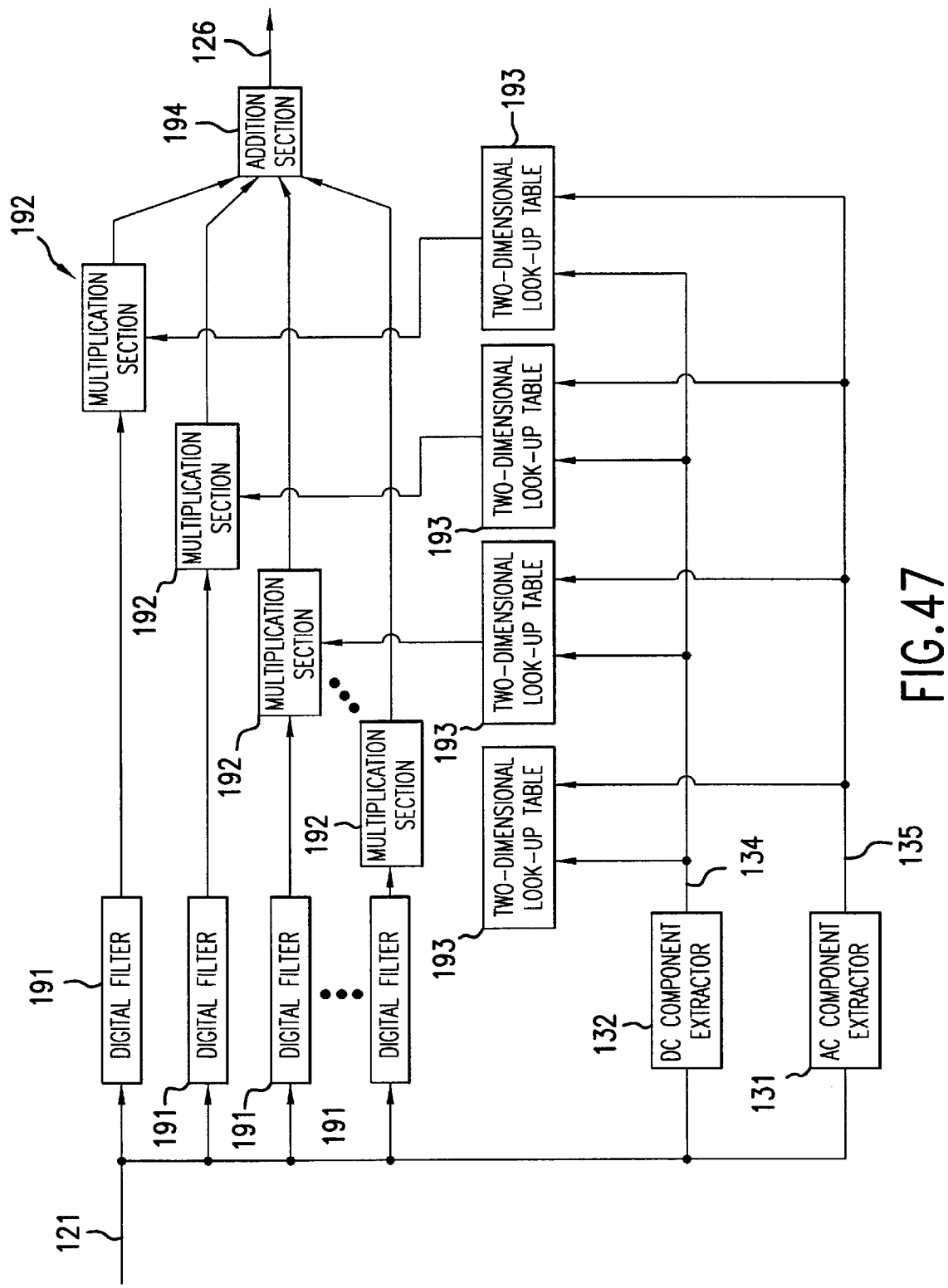
FIG. 47 is a block diagram to show a fourth configuration example of the spatial frequency processing section.

FIG. 47 is a block diagram to show a fourth configuration example of the spatial frequency processing section. Parts similar to those previously described with reference to FIGS. 22 and 23 are denoted by the same reference numerals in FIG. 47 and will not be described again. In FIG. 47, numeral 191 is a digital filter, numeral 192 is a multiplication section, numeral 193 is a two-dimensional look-up table, and numeral 194 is an addition section. In the example, the design values of the target spatial frequency transfer characteristic are divided for each spatial frequency band and a correction is made through the digital filter and according to an amplification rate for each spatial frequency band for providing the design values of the target spatial frequency transfer characteristic as a whole.

The digital filters 191 are provided in a one-to-one correspondence with the spatial frequency bands. They may use already existing digital filters for band separation. The two-dimensional look-up tables 193 are each similar to the two-dimensional look-up table shown in FIG. 23 and are provided in a one-to-one correspondence with the spatial frequency bands. Each table contains the amplification rate in the corresponding spatial frequency band for each AC and DC component combination. The multiplication sections 192 are provided in a one-to-one correspondence with the spatial frequency bands; each multiplication section multiplies output of the digital filter 191 for the corresponding spatial frequency band by output of the two-dimensional look-up table 193 for the corresponding spatial frequency band. The addition section 194 adds all outputs of the multiplication sections 192 and outputs the result as an output image signal 126.

Figure 48A:
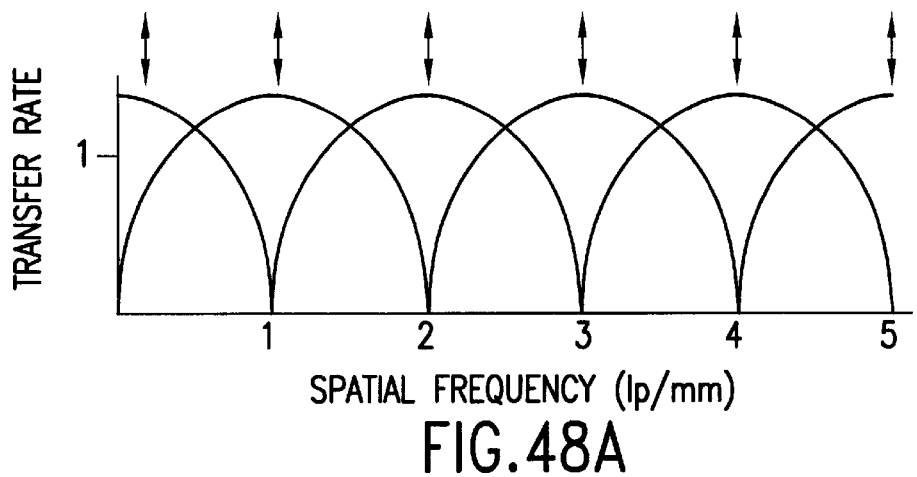
FIGS. 48A and 48B are illustration of realizing the target spatial frequency transfer characteristic by spatial frequency division in a fifth example of the spatial frequency processing section.
Figure 48B:
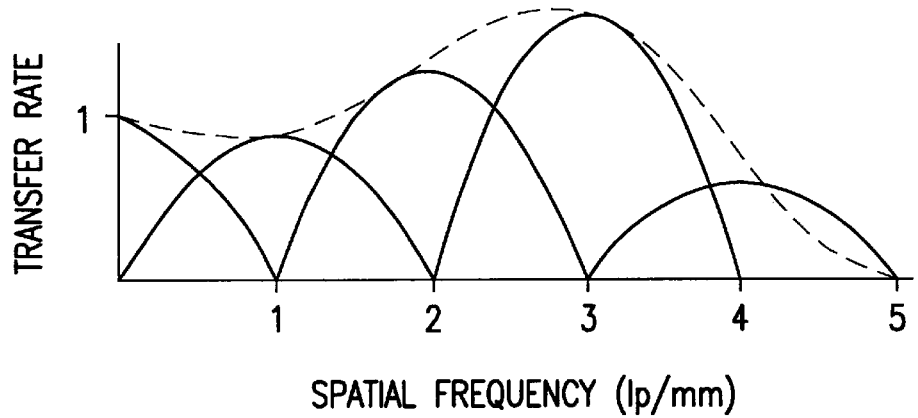

FIGS. 48A and 48B are illustration of realizing the target spatial frequency transfer characteristic by spatial frequency division in a fifth example of the spatial frequency processing section. The spatial frequency characteristics of the digital filters 191 have their respective characteristics as shown in FIG. 48A. The amplification rates provided from the two-dimensional look-up tables 193 cause the characteristics to be deformed in the arrow directions in the figure. For example, if the target spatial frequency transfer characteristic as shown in FIG. 34 is designed, the designed target spatial frequency transfer characteristic can be approximated as the sum of the transfer rates in the spatial frequency bands as shown in FIG. 48B. That is, each of the outputs of the digital filter 191 having a predetermined characteristic is multiplied by a predetermined amplification rate and all the results are added, whereby the target spatial frequency transfer characteristic can be provided as shown in FIG. 48B. Such a technique is realized by a method such as a wavelet.

In the example, the target spatial frequency transfer characteristic as shown in FIG. 34 is found in horizontal and vertical directions for each AC component and each DC component and a multiplying factor is calculated in response to the characteristic of the digital filter 191 in each spatial frequency band and may be set in the corresponding two-dimensional look-up table 193.

Figure 49:
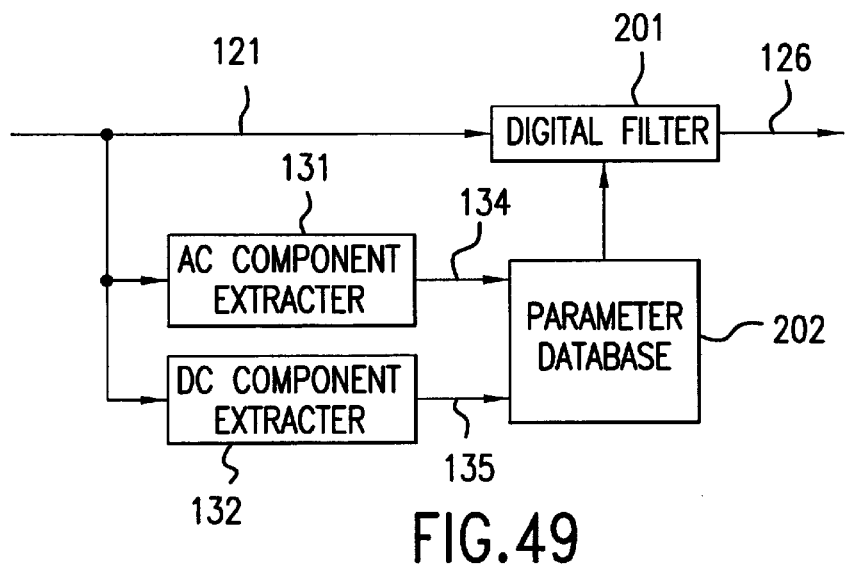
FIG. 49 is a block diagram to show a sixth configuration example of the spatial frequency processing section.

FIG. 49 is a block diagram to show a sixth configuration example of the spatial frequency processing section. Parts similar to those previously described with reference to FIGS. 22 and 23 are denoted by the same reference numerals in FIG. 49 and will not be described again. In FIG. 49, numeral 201 is a digital filter and numeral 202 is a parameter database. In the example, the operations of the basic correction section 111, the auxiliary correction section 112, the multiplication section 114, and the addition section 115 in FIG. 22 and the two-dimensional look-up table 133 shown in FIG. 23 in the amplification rate determination section 113 are performed through one digital filter 201. Since the spatial frequency transfer characteristic varies depending on each AC component and each DC component as described above, a fixed filter coefficient cannot cover. Thus, filter coefficients responsive to AC and DC component combinations are previously stored in the parameter database 202. The stored filter coefficients may be designed from the target spatial frequency transfer characteristics corresponding to the AC and DC component combinations.

A filter coefficient is fetched from the parameter database 202 according to the AC component extracted by an AC component extractor 131 and the DC component extracted by a DC component extractor 132. The fetched filter coefficient is set in the digital filter 201, correction processing is performed for an input image signal 121, and an output image signal 126 is generated and output.

According to the sixth example, processing of approximating the target spatial frequency transfer characteristic is not contained, so that a correction can be made with good accuracy.

The look-up tables 23 and 24 in the first example and the two-dimensional look-up tables in the second to fifth examples can also be replaced with a neural network. In this case, the look-up table preparation process may be realized as a learning process of the neural network.

In the examples described above, the spatial frequency processing is performed in the YMC space, as shown in FIG. 2. However, the invention is not limited to it; the spatial frequency processing may be performed for color images in any other color space, such as the L*a*b* color space. In this case, the image is output in a full color mode, the measurement values are converted into the L*a*b* color space, and the transfer characteristics of L*, a*, and b* may be calculated. The invention can be applied to not only color images, but also monotone images.

Figure 50:
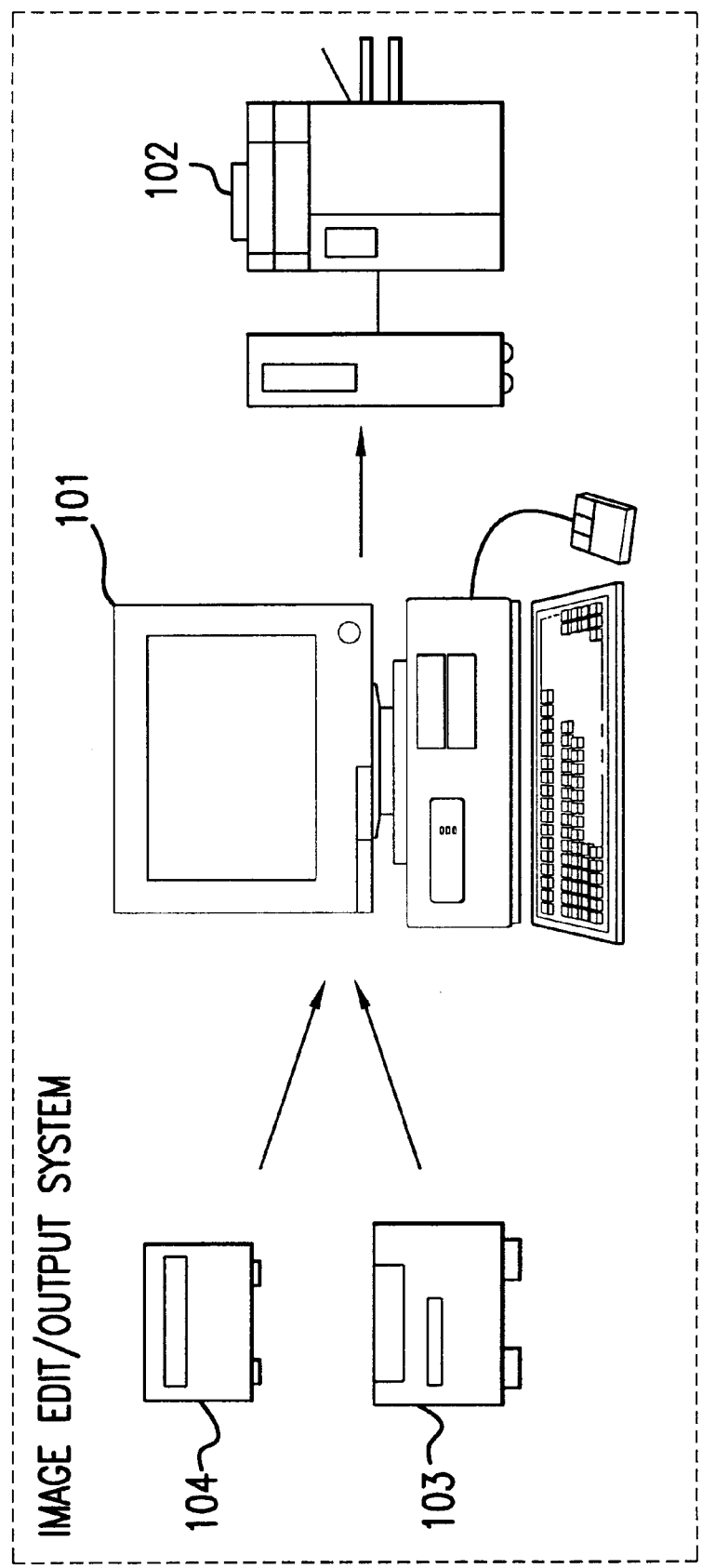
FIG. 50 is a block diagram to show an example of an image edit and output system to which the invention is applied.

FIG. 50 is a block diagram to show an example of an image edit and output system to which the invention is applied. In the figure, numeral 101 is a host computer, numeral 102 is a color printer, numeral 103 is an image database, and numeral 104 is a photo CD. In the present desktop color publishing field, for example, as shown in FIG. 50, an image edit and output system 10 made up of components such as the host computer 101, the color printer 102, the image database 103, and the photo CD 104 is used to perform image edit and output processing. In such a system, the components are connected by dedicated signal lines or through a network. In the host computer 101, image edit software, layout software, etc., is used to edit image data input from the image database 103 or the photo CD 104 or through an image scanner (not shown) or computer graphics images or text information prepared on the host computer 101, whereby digital image data is prepared and the prepared digital image data is transferred to the color printer 102 for providing an output image.

In such a system, it is wanted to reproduce the color image data obtained from the image database 103, the photo CD 104, etc., independently of the characteristics of the color printer 102. To do this, when the digital image data is transferred to the color printer 102, output processing responsive to the color printer 102 is performed for the digital color image. The process operation section 1 as shown in FIG. 2 can be applied as a configuration for performing the output processing.

For example, to install the process operation section 1 as shown in FIG. 2 in the host computer 101, the processing coefficients in the direct look-up table in the color space conversion section 11, those in the spatial frequency processing section 12 found in the invention, and those in the look-up table in the gradation conversion section 13 are previously held in an output device information holding section (not shown) in the host computer 101 as output device information for each output device. When the color printer 102 for outputting the digital image data is determined, the output device information corresponding to the determined color printer 102 is fetched and set in the color space conversion section 11, the spatial frequency processing section 12, and the gradation conversion section 13 and processing is performed, whereby an output image having a spatial frequency characteristic and a color characteristic independent of the output devices can be provided. If only one unit of the color printer 102 is fixedly connected to the host computer 101, selective use of the output device information is not required and the coefficients may be preset from the beginning for performing output processing.

In the system, the color image data supplied from the image database 13 or the photo CD 14 may be image data represented in the format independent of the input/output devices and preferably may be data represented in the format common to the components in the system or common to the systems.

The host computer 101 can be provided with the coefficient calculation section 4 and a measuring instrument corresponding to the measurement section 3 can be connected to the host computer 101 for performing processing as described above for finding the processing coefficients for spatial frequency processing. The host computer 101 can also be provided with the measurement section 3.

Alternatively, the coefficient calculation section 4 and the measurement section 3 are separated from the host computer 101 and output of the coefficient calculation section 4 may be input to the host computer 101. In this case, the processing coefficients for spatial frequency processing output by the coefficient calculation section 4 can be input directly to the host computer; in addition, the processing coefficients can also be copied into a storage unit in the host computer in the file format or delivered via a network.

The process operation section 1 can be installed in the color printer 102 as well as the host computer 101. For example, a color printer connected to a network, etc., accepts output requests from a number of host computers and outputs images. The host computer 101 making an output request may issue an output request without determining which printer to output. In such a case, the color printer 102 may perform output processing proper to the color printer 102. In this case, the coefficient calculation section 4 and the measurement section 3 are separated from the color printer 102 and the processing coefficients used for spatial frequency processing output by the coefficient calculation section 4 can be previously built in the color printer 102; the costs of the color printer 102 can be decreased as compared with the configuration wherein the coefficient calculation section 4 and the measurement section 3 are built in the color printer 102.

As seen from the description made so far, according to the invention, the processing coefficients for spatial frequency processing can be determined independently of intuition or experience and the determined processing coefficients are used to perform spatial frequency processing for image data, whereby output images of the same sharpness can be provided independently of the output device types without being affected by the spatial frequency transfer characteristics of the image output devices.

What is claimed is:

1. An image processing coefficient determination method of an image processing system comprising the steps of:

outputting test pattern image data having a plurality of image areas each containing one or more specific pairs of amplitude/average components at at least one spatial frequency, the plurality of image areas defining a plurality of different pairs of spatial frequency amplitude/average components over the at least one spatial frequency, by an image output device for preparing an output image, measuring at least one spatial frequency characteristic of the output image, and determining spatial frequency processing coefficients from a relationship between the at least one measured spatial frequency characteristic of the output image and at least one pair of spatial frequency amplitude/average components.

2. The image processing coefficient determination method of claim 1, wherein the at least one spatial frequency contained in each image area in the test pattern image data comprises:

a single spatial frequency component, and a single spatial frequency component and a harmonic component thereof.

3. The image processing coefficient determination method of claim 1, wherein the at least one spatial frequency contained in each image area in the test pattern image data comprises a plurality of spatial frequency components.

4. The image processing coefficient determination method of claim 1, wherein the plurality of areas define a plurality of different average components.

5. The image processing coefficient determination method of claim 1, wherein the spatial frequency processing coefficients are processing coefficients corresponding to pairs of amplitude/average components resulting in a different response to the same spatial frequency because of an average component difference.

6. The image processing coefficient determination method of claim 1, wherein
the spatial frequency processing coefficients are processing coefficients corresponding to pairs of amplitude/average components resulting in a different response to the same spatial frequency because of an amplitude component difference.

7. The image processing coefficient determination method of claim 1, wherein
said spatial frequency processing coefficient determining step determines a target spatial frequency transfer characteristic from a range of input values effectively allowed by said image output device as well as the relationship between the spatial frequency characteristic of the test pattern image data and the measurement result of the spatial frequency characteristic of the output image, and calculates the spatial frequency processing coefficient based on the target spatial frequency transfer characteristic.

8. An image processing coefficient calculation system comprising:
first recognition means for recognizing a spatial frequency characteristic of test pattern image data having a plurality of image areas each containing one or more specific pairs of amplitude/average components at at least one spatial frequency, the plurality of areas defining a plurality of different pairs of spatial frequency amplitude/average components over the at least one spatial frequency,
second recognition means for recognizing a spatial frequency characteristic of an output image provided by an image output device for outputting the test pattern image data, and
means for calculating spatial frequency processing coefficients from a relationship between the spatial frequency characteristic of the test pattern image data recognized by said first recognition means and the spatial frequency characteristic of the output image recognized by said second recognition means.

9. The image processing coefficient calculation system of claim 8, wherein
the at least one spatial frequency contained in each image area in the test pattern image data comprises:
a single spatial frequency component, and
a single spatial frequency component and a harmonic component thereof.

10. The image processing coefficient calculation system of claim 8, wherein the at least one spatial frequency contained in each image area in the test pattern image data comprises a plurality of spatial frequency components.

11. The image processing coefficient calculation system of claim 8, wherein
the plurality of areas define a plurality of different average components.

12. The image processing coefficient calculation system of claim 8, wherein
the spatial frequency processing coefficients correspond to pairs of amplitude/average components resulting in a different response to the same spatial frequency because of an average component difference.

13. The image processing coefficient calculation system of claim 8, wherein
the spatial frequency processing coefficients correspond to pairs of amplitude/average components resulting in a different response to the same spatial frequency because of an amplitude component difference.

14. The image processing coefficient calculation system of claim 8, wherein
said coefficient calculation means determines a target spatial frequency transfer characteristic from a range of input values effectively allowed by said image output device as well as the relationship between the spatial frequency characteristic of the test pattern image data recognized by said first recognition means and the spatial frequency characteristic of the output image recognized by said second recognition means, and calculates the spatial frequency processing coefficient based on the target spatial frequency transfer characteristic.

15. An image processing system comprising:
image output means for outputting image data,
means for calculating spatial frequency processing coefficients from a relationship between:
a spatial frequency characteristic of test pattern image data having a plurality of image areas each containing one or more specific pairs of amplitude/average components at at least one spatial frequency, the plurality of areas defining a plurality of different pairs of amplitude/average components over the at least one spatial frequency, and
a spatial frequency characteristic of an output image provided by said image output means for outputting the test pattern image data; and
process operation means for using the spatial frequency processing coefficients calculated by said coefficient calculation means to change a spatial frequency characteristic of input image data.

16. An image processing system comprising:
image output means for outputting image data,
means for holding test pattern image data having a plurality of image areas each containing one or more specific pairs of amplitude/average components at at least one spatial frequency, the plurality of areas defining a plurality of different pairs of amplitude/average components over the at least one spatial frequency,
means for measuring a spatial frequency characteristic of an output image provided by said image output means for outputting the test pattern image data held in said test pattern holding means,
means for calculating spatial frequency processing coefficients from a relationship between the at least one pair of amplitude/average components of the test pattern image data held in said test pattern holding means and spatial frequency characteristic information of the output image measured by said measurement means, and
process operation means for using the spatial frequency processing coefficients calculated by said coefficient calculation means to change a spatial frequency characteristic of input image data.

17. The image processing system of claim 15, wherein
the at least one spatial frequency contained in each image area in the test pattern image data comprises:
a single spatial frequency component, and
a single spatial frequency component and a harmonic component thereof.

18. The image processing system of claim 15, wherein the at least one spatial frequency contained in each image area in the test pattern image data comprises a plurality of spatial frequency components.

19. The image processing system of claim 15, wherein
the plurality of areas define a plurality of different average components.

20. The image processing system of claim 15, wherein
said coefficient calculation means determines a target spatial frequency transfer characteristic from a range of input values effectively allowed by said image output means as well as the relationship between the spatial frequency characteristic of the test pattern image data and that of the output image, and calculates the spatial frequency processing coefficient based on the target spatial frequency transfer characteristic.

21. The image processing system of claim 15, wherein said process operation means performs different spatial frequency characteristic change processing for the same spatial frequency because of an average component difference.

22. The image processing system of claim 15, wherein said process operation means performs different spatial frequency characteristic change processing for the same spatial frequency because of an amplitude component difference.

23. An image processing system comprising:
means for inputting an image processing signal containing image signal values of an attention pixel and peripheral pixels of the attention pixel,
processing means for changing the value of the attention pixel based on the image processing signal input to said input means and predetermined coefficients corresponding to pairs of amplitude/average components,
means for outputting an image of the image processing signal having the attention pixel value changed by said processing means, and
coefficient determination means for determining the predetermined coefficients for said processing means based on an image reproduction characteristic of said output means found from test pattern image data containing a plurality of areas each having one or more of the pairs of amplitude/average components, the plurality of areas defining a plurality of different pairs of spatial frequency amplitude/average components over the at least one spatial frequency,
wherein
said coefficient determination means comprises:
means for measuring actual amplitude components of a test pattern image prepared by said output means based on the test pattern image data,
means for comparing the actual amplitude components measured by said measurement means at least with the amplitude components of the test pattern image data, and
predetermined coefficient determination means for determining the predetermined coefficients for said processing means from the comparison result of said comparison means.

24. The image processing system of claim 23, wherein said coefficient determination means further determines the predetermined coefficients based on an image reproduction characteristic for each feature of the image processing signal in said output means, and wherein
said processing means changes a degree of changing of the attention pixel value for each feature of the image processing signal based on the predetermined coefficients.

25. The image processing system of claim 24, wherein the predetermined characteristic to be given for each feature of the image processing signal is provided for making the image reproduction characteristic of said output means an ideal characteristic not changing for each feature of the image processing signal.

26. The image processing system of claim 23, wherein the predetermined coefficients contain basic processing coefficients and auxiliary processing coefficients, and wherein
said coefficient determination means further includes;
basic processing coefficient determination means for determining the basic processing coefficients in order to give a predetermined characteristic to a spatial frequency characteristic of the image processing signal input to said output device, and
auxiliary processing coefficient determination means for determining the auxiliary processing coefficients to give a processing characteristic to be furthermore added to the spatial frequency characteristic of the image processing signal changing according to the basic processing coefficients determined by said basic processing coefficient determination means.

27. The image processing system of claim 26, wherein the auxiliary processing coefficients contain an auxiliary spatial frequency processing coefficient and an auxiliary gain coefficient, and wherein
said processing coefficient determination means comprises:
auxiliary spatial frequency processing coefficient determination means for determining the auxiliary spatial frequency processing coefficient to give a predetermined characteristic to the spatial frequency characteristic of the image processing signal, and
gain determination means for determining an auxiliary gain coefficient by which the image processing signal changed based on the auxiliary spatial frequency processing coefficient determined by said auxiliary spatial frequency processing coefficient determination means is to be multiplied.

28. The image processing system of claim 26, wherein the basic processing coefficients contain a basic spatial frequency processing coefficient and a basic gain coefficient, and wherein
said processing coefficient determination means comprises:
basic spatial frequency processing coefficient determination means for determining the basic spatial frequency processing coefficient to give a predetermined characteristic to the spatial frequency characteristic of the image processing signal, and
gain determination means for determining a basic gain coefficient by which the image processing signal changed based on the basic spatial frequency processing coefficient determined by said basic spatial frequency processing coefficient determination means is to be multiplied.

29. The image processing system of claim 27, wherein said gain determination means determines a gain corresponding to each characteristic of the image processing signal.

30. The image processing system of claim 29, wherein the characteristic of the image processing signal is a local amplitude of the image processing signal.

31. The image processing system of claim 29, wherein the characteristic of the image processing signal is a local average value of the image processing signal.

32. The image processing system of claim 23, wherein said predetermined coefficient determination means determines a target spatial frequency transfer characteristic from a range of input values effectively allowed by said image output means as well as the comparison result of said comparison means, and calculates the predetermined coefficient based on the target spatial frequency transfer characteristic.

33. An image processing system comprising:
means for inputting an image processing signal containing image signal values of an attention pixel and peripheral pixels of the attention pixel,
feature amount extraction means for finding a feature of the image processing signal from the image signal values of the attention pixel and peripheral pixels of the image processing signal input to said input means, processing means for changing the value of the attention pixel based on the image processing signal input to said input means, predetermined coefficients, and the feature found by said feature amount extraction means, and means for outputting an image of the image processing signal having the attention pixel value changed by said processing means, wherein the predetermined coefficients are determined by measuring actual spatial frequency components of a test pattern image prepared by said output means based on test pattern image data, and comparing the measured spatial frequency components of the test pattern image with the spatial frequency components of the test pattern image data.

34. The image processing system of claim 33, wherein the predetermined coefficients contain;

basic processing coefficients, and auxiliary processing coefficients, said basic processing coefficients being provided for giving a predetermined characteristic to a spatial frequency characteristic of the image processing signal input to said output device, and said auxiliary processing coefficients being provided for giving a processing characteristic to be furthermore added to the spatial frequency characteristic of the image processing signal changing according to the basic processing coefficients, and wherein said processing means comprises;

basic processing means for changing the value of the attention pixel of the image processing signal based on the basic processing coefficients, and auxiliary processing means for changing the value of the attention pixel based on the auxiliary processing coefficients, and generates an image processing signal fed into said output means based on the changed values of the attention pixel.

35. The image processing system of claim 34, wherein the auxiliary processing coefficients contain an auxiliary spatial frequency processing coefficient and an auxiliary gain coefficient, and wherein said auxiliary processing means changes the image processing signal based on the auxiliary spatial frequency processing coefficient, and further changes the image processing signal based on the feature found by said feature amount extraction means and the auxiliary gain coefficient.

36. The image processing system of claim 34, wherein the basic processing coefficients contain a basic spatial frequency processing coefficient and a basic gain coefficient, and wherein said basic processing means changes the image processing signal based on the basic spatial frequency processing coefficient, and further changes the image processing signal based on the feature found by said feature amount extraction means and the basic gain coefficient.

37. The image processing system of claim 33, wherein the predetermined coefficients are calculated based on a target spatial frequency transfer characteristic determined from a range of input values effectively allowed by said image output means as well as the comparison result between the actually measured spatial frequency components of the test pattern image and the spatial frequency components of the test pattern image data.

38. The image processing system of claim 33, wherein said feature amount extraction means extracts a local contrast of the image processing signal as the feature.

39. The image processing system of claim 33, wherein said feature amount extraction means extracts a local average value of the image processing signal as the feature.

40. An image processing system comprising:

means for inputting an image processing signal containing image signal values of an attention pixel and peripheral pixels of the attention pixel, feature amount extraction means for finding a feature of the image processing signal from the image signal values of the attention pixel and peripheral pixels of the image processing signal input to said input means, means for determining a gain for each of the spatial frequency components of the image processing signal based on the feature found by said feature amount extraction means, processing means for changing the value of the attention pixel based on the gain determined by said gain determination means for each of the spatial frequency components of the image processing signal input to said input means and changing the image processing signal based on the changed attention pixel values, and means for outputting an image of the image processing signal changed by said processing means, wherein the gain for each of the spatial frequency components of the image processing signal is determined by measuring actual spatial frequency components of a test pattern image prepared by said output means based on test pattern image data and comparing the measured spatial frequency components of the test pattern image with the spatial frequency components of the test pattern image data.

41. An image processing system comprising:

means for inputting an image processing signal containing image signal values of an attention pixel and peripheral pixels of the attention pixel, processing means for changing the value of the attention pixel based on the image processing signal input to said input means and predetermined coefficients, means for outputting an image of the image processing signal having the attention pixel value changed by said processing means, feature amount extraction means for finding a feature of the image processing signal from the image signal values of the attention pixel and peripheral pixels of the image processing signal input to said input means, and processing coefficient determination means for determining the predetermined coefficients for said processing means based on the feature found by said feature amount extraction means, wherein the predetermined coefficients are determined by measuring actual spatial frequency components of a test pattern image prepared by said output means based on test pattern image data, and comparing the measured spatial frequency components of the test pattern image with the spatial frequency components of the test pattern image data.

42. An image processing system comprising:

first input means for inputting an image processing signal containing values represented by a color coordinate system of an equal color space, color conversion means for converting the image processing signal input to said first input means into a color coordinate system of a second color space different from the color space and appropriate for control of output means, second input means for inputting the image processing signal containing image signal values of an attention pixel and peripheral pixels of the attention pixel undergoing the color conversion of said color conversion means, feature amount extraction means for finding a feature of the image processing signal from the image signal values of the attention pixel and peripheral pixels of the image processing signal input to said second input means, processing means for changing the value of the attention pixel based on the image processing signal input to said second input means, predetermined coefficients, and the feature found by said feature amount extraction means, and means for outputting an image of the image processing signal having the attention pixel value changed by said processing means, wherein the predetermined coefficients are determined by measuring actual spatial frequency components of a test pattern image and comparing the measured spatial frequency components of the test pattern image with spatial frequency components of data of the test pattern image.

43. The image processing system of claim 42, wherein the predetermined coefficients are calculated based on a target spatial frequency transfer characteristic determined from a range of input values effectively allowed by said image output means as well as the comparison result between the actually measured spatial frequency components of the test pattern image and the spatial frequency components of the test pattern image data.

44. An image processing method comprising the steps of:

outputting by an output means, test pattern image containing a plurality of areas each containing one or more specific pairs of amplitude/average components at at least one spatial frequency, the plurality of areas defining a plurality of different pairs of amplitude/average components over the at least one spatial frequency, measuring a spatial frequency characteristic of the output image, determining predetermined coefficients from a relationship between the pairs of amplitude/average components of the test pattern image data and the measurement result of the spatial frequency characteristic of the output image, changing a value of an input attention pixel based on an image processing signal containing image signal values of the input attention pixel and peripheral pixels of the attention pixel and the predetermined coefficients, and outputting an image of the image processing signal having the value changed.

45. An image processing method comprising the steps of:

outputting, by an output means, test pattern image containing a plurality of areas each containing one or more specific pairs of amplitude/average components at at least one spatial frequency, the plurality of areas defining a plurality of different pairs of spatial frequency amplitude/average components over the at least one spatial frequency, measuring a spatial frequency characteristic of the output image, determining predetermined coefficients from a relationship between the pairs of amplitude/average components of the test pattern image data and the measurement result of the spatial frequency characteristic of the output image, finding a characteristic of an image processing signal containing image signal values of an input attention pixel and peripheral pixels of the attention pixel, changing the value of the attention pixel based on the image processing signal, the characteristic of the image processing signal, and the predetermined coefficients, and outputting an image of the image processing signal having the attention pixel value changed.

46. The image processing method of claim 44, wherein said predetermined coefficient determination step determines a target spatial frequency transfer characteristic from a range of input values effectively allowed by said image output means as well as the relationship between the spatial frequency characteristic of the test pattern image data and the measurement result of the spatial frequency characteristic of the output image, and calculates the predetermined coefficients based on the target spatial frequency transfer characteristic.

47. A storage medium storing a program for causing a computer to execute the steps of:

outputting, by an output means, test pattern image containing a plurality of areas each containing one or more specific pairs of amplitude/average components at at least one spatial frequency, the plurality of areas defining a plurality of different pairs of amplitude/average components over the at least one spatial frequency, measuring a spatial frequency characteristic of the output image, and determining predetermined coefficients from a relationship between pairs of frequency spatial amplitude/average components of the test pattern image data and the measurement result of the spatial frequency characteristic of the output image, said storage medium being able to read by said computer.

48. The storage medium of claim 47, further storing a program for causing a computer to execute the additional steps of:

changing a value of an input attention pixel based on an image processing signal containing image signal values of the input attention pixel, and peripheral pixels of the attention pixel and the predetermined coefficients, and outputting an image of the image processing signal having the value changed, said storage medium being able to be read by said computer.

49. The storage medium of claim 47, further storing a program for causing a computer to execute the additional steps of:

finding a characteristic of an image processing signal containing image signal values of an input attention pixel and peripheral pixels of the attention pixel, changing the value of the attention pixel based on the image processing signal, the characteristic of the image processing signal, and the predetermined coefficients, and outputting an image of the image processing signal having the attention pixel value changed, said storage medium being able to be read by said computer.

* * * * *